(12) United States Patent
Boyce

(10) Patent No.: US 9,464,777 B2
(45) Date of Patent: Oct. 11, 2016

(54) LED LIGHT ASSEMBLIES

(71) Applicant: Red Hawk LLC, Baltimore, MD (US)

(72) Inventor: E. Gillet Boyce, Baltimore, MD (US)

(73) Assignee: RED HAWK LLC, Baltimore, MD (US)

( * ) Notice: Subject to any disclaimer, the term of this patent is extended or adjusted under 35 U.S.C. 154(b) by 0 days.

(21) Appl. No.: 14/218,624

(22) Filed: Mar. 18, 2014

(65) Prior Publication Data

US 2014/0268851 A1    Sep. 18, 2014

Related U.S. Application Data

(60) Provisional application No. 61/799,072, filed on Mar. 15, 2013.

(51) Int. Cl.
*F21V 29/00* (2015.01)
*F21S 8/10* (2006.01)

(52) U.S. Cl.
CPC .......... *F21S 48/215* (2013.01); *F21S 48/1154* (2013.01); *F21S 48/218* (2013.01); *F21S 48/328* (2013.01)

(58) Field of Classification Search
CPC ................................................... F21S 48/328
USPC .................................................. 362/294, 506
See application file for complete search history.

(56) References Cited

U.S. PATENT DOCUMENTS

| | | | |
|---|---|---|---|
| 5,632,551 A * | 5/1997 | Roney | B60Q 1/2696 257/E25.028 |
| 7,798,687 B2 * | 9/2010 | Lin | F21S 48/1208 362/487 |
| 7,914,162 B1 * | 3/2011 | Huang | B60L 1/14 219/220 |
| 2004/0085779 A1 * | 5/2004 | Pond | B60Q 1/04 362/516 |
| 2008/0247186 A1 * | 10/2008 | Watanabe | B60Q 1/0041 362/538 |
| 2008/0310162 A1 * | 12/2008 | Thomas | F21V 15/01 362/249.01 |
| 2009/0059594 A1 * | 3/2009 | Lin | F21K 9/00 362/294 |
| 2009/0180291 A1 * | 7/2009 | Tam | B60Q 1/2696 362/487 |
| 2010/0013366 A1 * | 1/2010 | Hare | F21S 48/1154 313/46 |
| 2011/0103059 A1 * | 5/2011 | Chen | F21V 5/007 362/249.02 |
| 2011/0222292 A1 * | 9/2011 | Kong | F21S 8/026 362/294 |
| 2012/0134167 A1 * | 5/2012 | Huang | B60Q 1/0041 362/519 |
| 2013/0044477 A1 * | 2/2013 | Lee | F21S 48/321 362/235 |
| 2013/0294070 A1 * | 11/2013 | Tsao | F21V 29/006 362/235 |
| 2013/0322084 A1 * | 12/2013 | Ebisawa | F21V 21/04 362/269 |
| 2014/0146544 A1 * | 5/2014 | Gebhard | F21V 5/04 362/311.02 |
| 2014/0268854 A1 * | 9/2014 | Wilkinson | F21V 13/04 362/520 |

* cited by examiner

*Primary Examiner* — Renee Chavez
*Assistant Examiner* — Eric T Eide
(74) *Attorney, Agent, or Firm* — Miles Stockbridge P.C.; David R. Schaffer

(57) ABSTRACT

Embodiments of the invention include head and tail lights with and without heat sinks and kits made therefrom for golf carts.

19 Claims, 61 Drawing Sheets

A-A

B-B

C-C

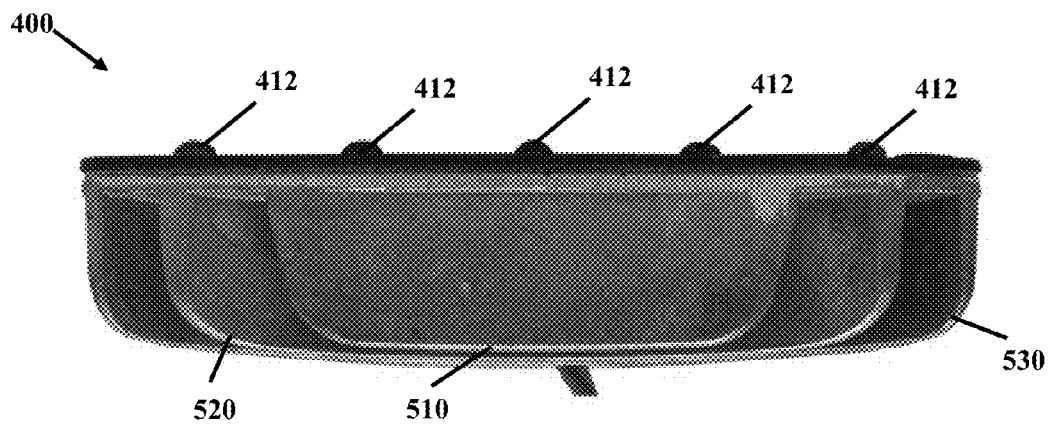
FIG. 43
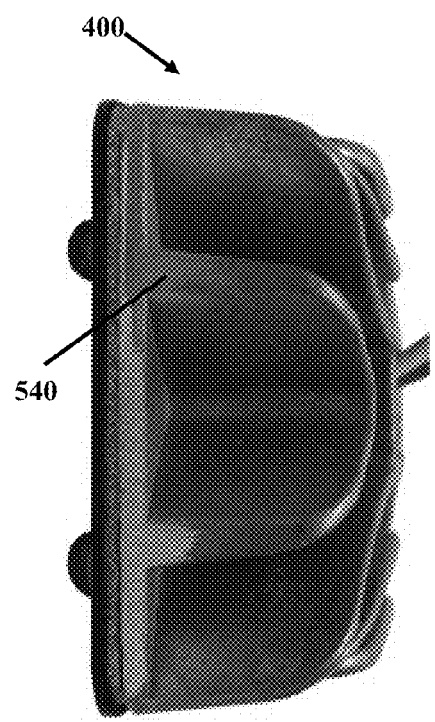 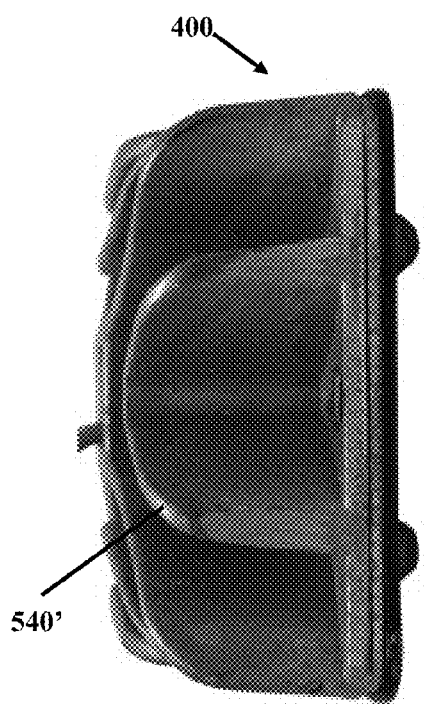
FIG. 44  FIG. 45

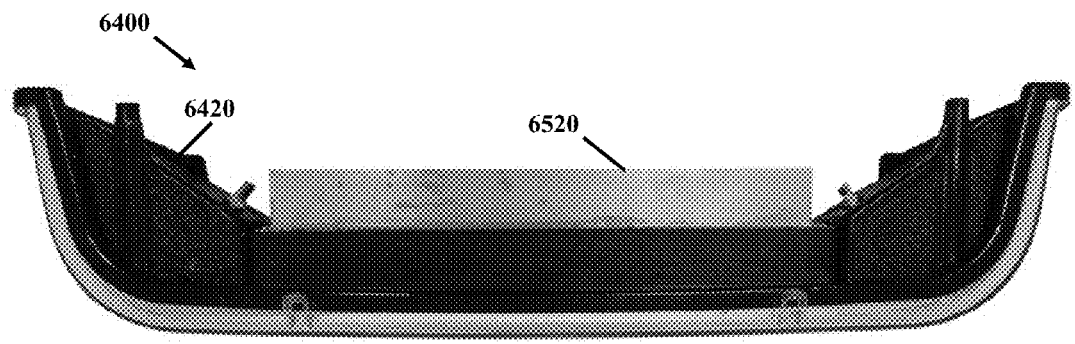
FIG. 66
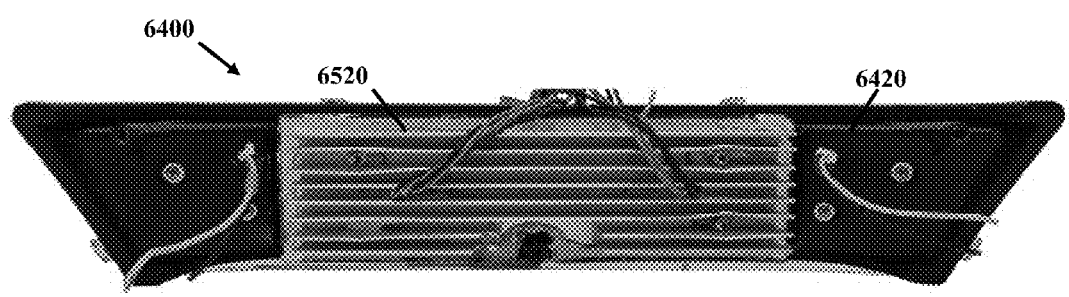
FIG. 67
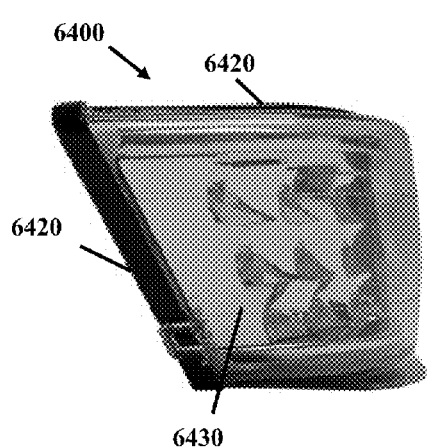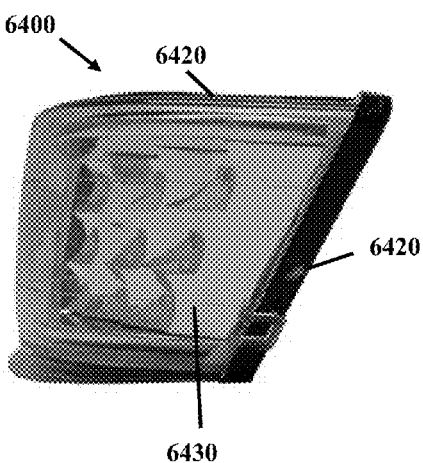
FIG. 68     FIG. 69

LED LIGHT ASSEMBLIES

TECHNICAL AREA

Light kits. More particularly head and tail lights with and without heat sinks and kits thereof for golf carts.

BRIEF DESCRIPTION OF THE DRAWINGS

Non-limiting and non-exhaustive embodiments of the present invention are described with reference to the following figures, wherein like reference numerals and/or indicia refer to like parts throughout the various views unless otherwise precisely specified.

FIG. 43 is a top view of the heat sink of FIG. 42, in accordance with another embodiment of the present invention.

FIG. 44 is a left side view of the heat sink of FIG. 42, in accordance with another embodiment of the present invention.

FIG. 45 is a right side view of the heat sink of FIG. 42, in accordance with another embodiment of the present invention.

FIG. 66 is a bottom view of the center front light housing assembly of FIG. 64 with the front light of FIG. 33 and a heat sink, in accordance with an embodiment of the present invention.

FIG. 67 is a back view of the center front light housing assembly of FIG. 64 with the front light of FIG. 33 and a heat sink, in accordance with an embodiment of the present invention.

FIG. 68 is a left side view of the center front light housing of FIG. 64 with the front light of FIG. 33 and a heat sink, in accordance with an embodiment of the present invention.

FIG. 69 is right side view of the center front light housing of FIG. 64 with the front light of FIG. 33 and a heat sink, in accordance with an embodiment of the present invention.

DETAILED DESCRIPTION

Figure 1:
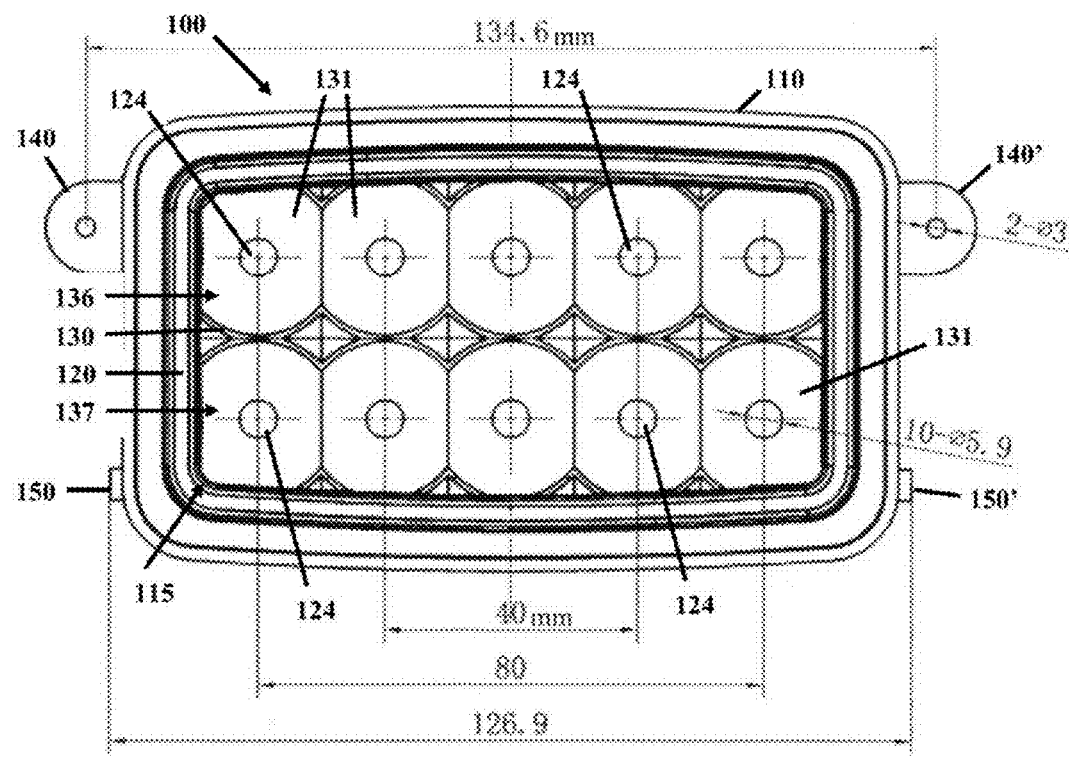
FIG. 1 is a front view of a front light with two rows of LED lights, in accordance with an embodiment of the present invention.

FIG. 1 is a front view of a front light with two rows of LED lights, in accordance with an embodiment of the present invention. In FIG. 1, a front light assembly 100 includes a substantially rectangular-shaped top portion 110, a multi-LED light portion 115, a lens cover 120, a curved reflective surface 130 with ten concave reflective surfaces 131 in two even rows 136, 137 of five reflective surfaces 131 each having an opening (not shown) formed at a bottom of the concave reflective surface and through which a light emitting diode (LED) 124 can be installed. The shape of the reflective surfaces 131, in general, is parabolic and can be seen in FIG. 26, although not all embodiments are limited to the parabolic shape. In FIG. 1, two "L"-shaped flanges 140, 140' are connected to and extend outwardly from opposite sides of the top portion 110 and are used to secure the front light to a housing (not shown here, but see, for example, FIG. 10). Two detents 150, 150' are also connected to and extend outwardly from opposite sides of the top portion 110 and are used to secure the front light to the housing.

Figure 2:
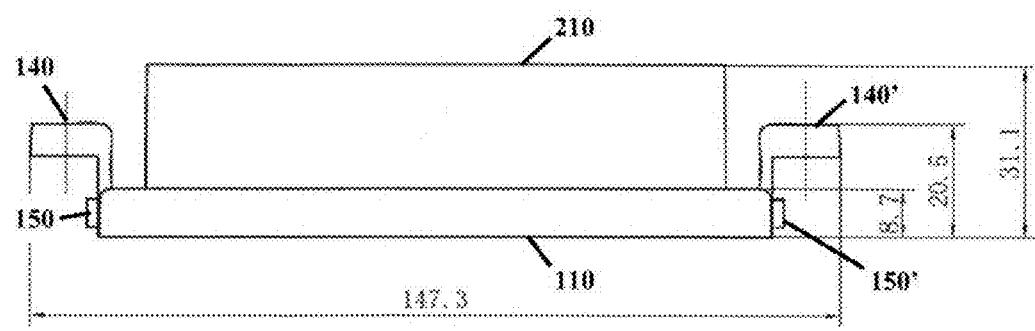
FIG. 2 is a top view of the front light with two rows of LED lights of FIG. 1, in accordance with an embodiment of the present invention.

FIG. 2 is a top view of the front light with two rows of LED lights of FIG. 1, in accordance with an embodiment of the present invention. In FIG. 2, a back portion 210, which surrounds and protects the curved, reflective surface 130 with ten concave reflective surfaces 131 shown in FIG. 1, is shown attached to and extending away from the top portion 110.

Figure 3:
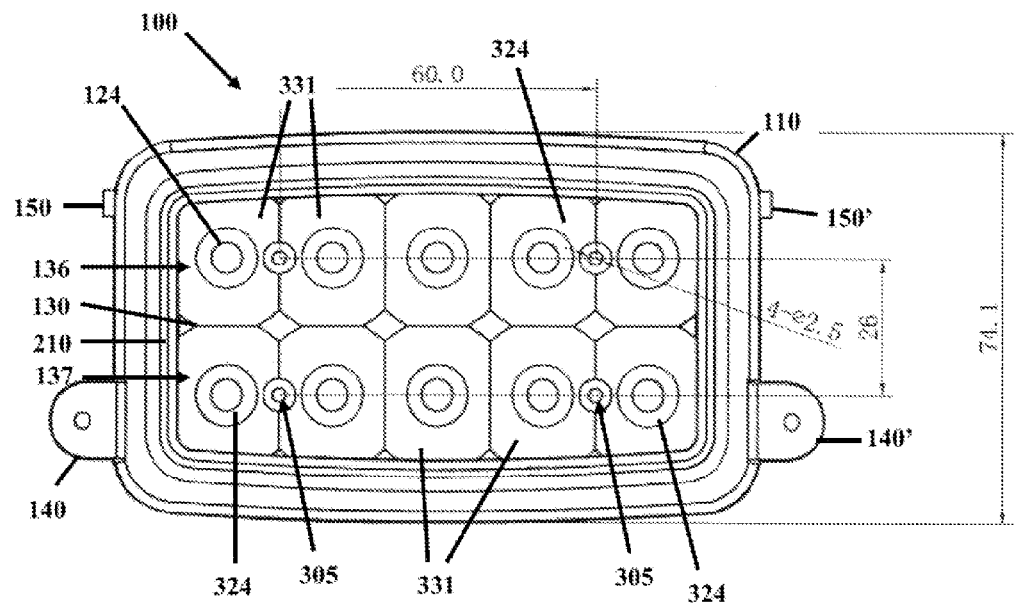
FIG. 3 is a rear view of the front light with two rows of LED lights of FIG. 1, in accordance with an embodiment of the present invention.

FIG. 3 is a rear view of the front light with two rows of LED lights of FIG. 1, in accordance with an embodiment of the present invention. In FIG. 3, a bottom of the curved, reflective surface 130 is shown including ten convex surfaces 331 of the ten concave reflective surfaces 131. A bottom 324 of each of the ten LED lights 124 is shown extending from an end of each of the convex surfaces 331. Four, internally threaded fastener posts 305 are positioned in a substantially rectangular relationship to each other and located substantially equidistantly between the outer two convex surfaces 331 at the beginning and end of each of the two rows.

Figure 4:
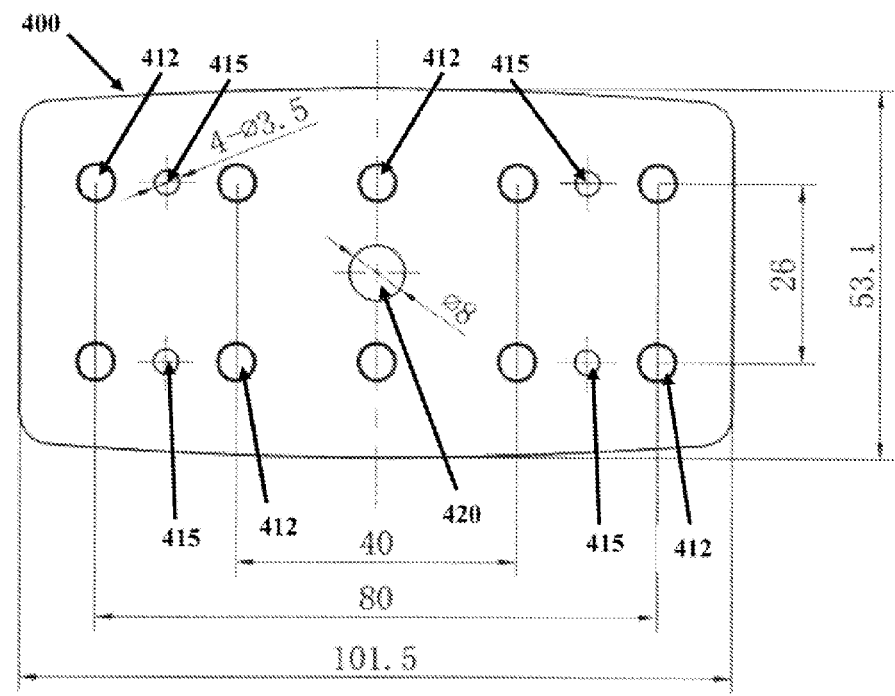
FIG. 4 is a rear view of a heat sink for use with the front light in FIG. 1, in accordance with an embodiment of the present invention.

FIG. 4 is a rear view of a heat sink for use with the front light in FIG. 1, in accordance with an embodiment of the present invention. In FIG. 4, a heat source side 410 of a heat sink 400 includes ten raised heat transfer elements 412 arranged in two even rows of heat transfer elements 412 with spacing equal and reciprocal to the LED light backs 324 in the openings in the ten concave reflective surfaces 131. The heat transfer elements 412 are in thermal contact (i.e., either direct or radiant) with the LED lights 124 and the shape of the heat transfer elements 412 can be for example, but not limited to, convex, concave, cylindrical, etc. Four fastener openings 415 are positioned in a substantially rectangular relationship to each other and positioned to align with the internally threaded fastener posts 305 the front light 100. A wire access opening 420 is formed in approximately a center of the heat sink 400 to provide a path for wiring for the LED lights 124.

Figure 5:
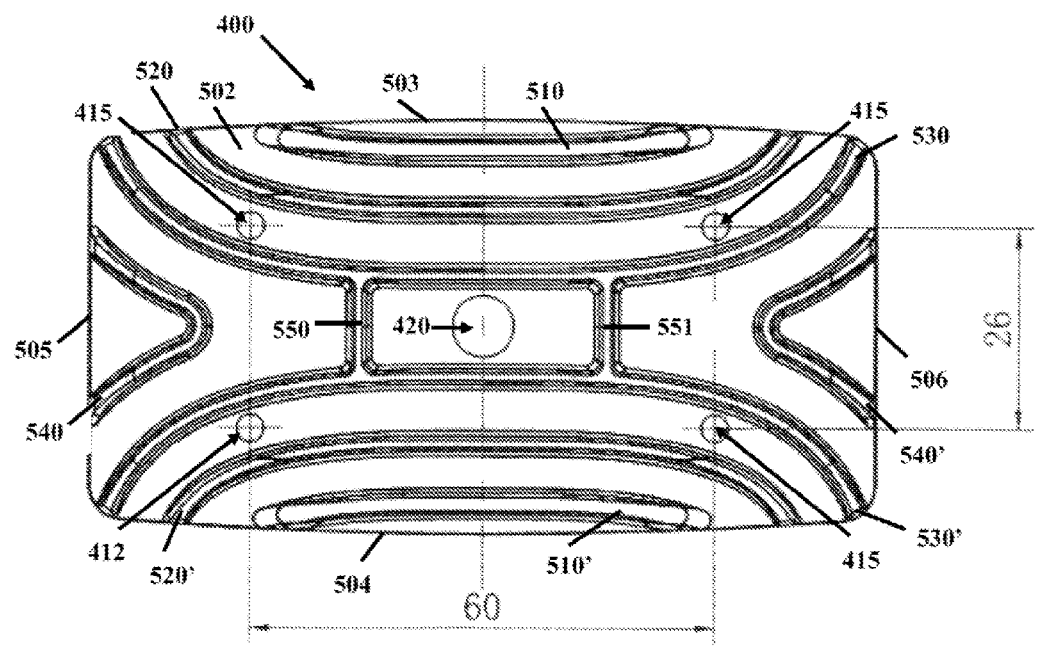
FIG. 5 is a front view of the heat sink for use with the front light in FIG. 1, in accordance with an embodiment of the present invention.

FIG. 5 is a front view of the heat sink for use with the front light in FIG. 1, in accordance with an embodiment of the present invention. In FIG. 5, a front 502 of the heat sink 400 showing two sets of oppositely arranged curved fins along a length of the heat sink 400, one set being arranged along a top wall 503 of the heat sink 400 and the other set being arranged along a bottom wall 504. The top set includes an outer curved fin 510, a middle curved fin 520 and an inner curved fin 530, all of which curve toward the top wall 503 and are centered on a vertical center line A. Similarly the bottom set includes an outer curved fin 510', a middle curved fin 520' and an inner curved fin 530', all of which curve downward toward the bottom wall 504 the top wall 503 and are centered on the vertical center line A. Two "V"-shaped fins 540, 540' are centered on respective and opposite left and right walls 505, 506. Between the to "V"-shaped fins are two center walls 550, 551 that extend between and are connected to the inner curved fins 530, 530' to form a substantially rectangular enclosure around the wire access opening 420.

Figure 6:
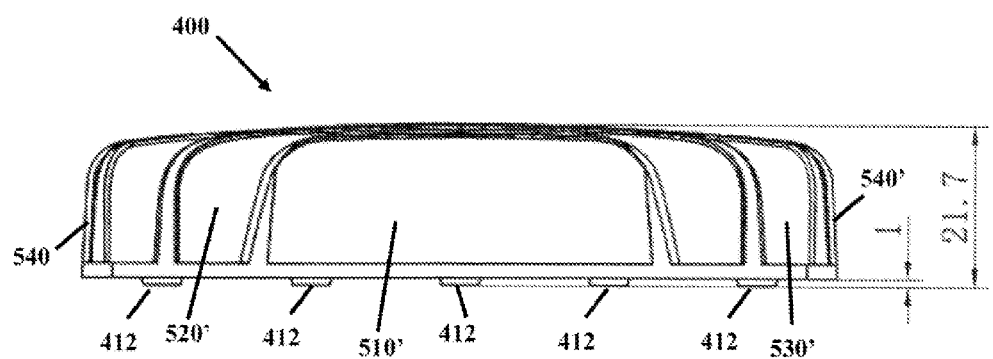
FIG. 6 is a bottom view of the heat sink in FIG. 5, in accordance with an embodiment of the present invention.

FIG. 6 is a bottom view of the heat sink in FIG. 5, in accordance with an embodiment of the present invention.

Figure 7:
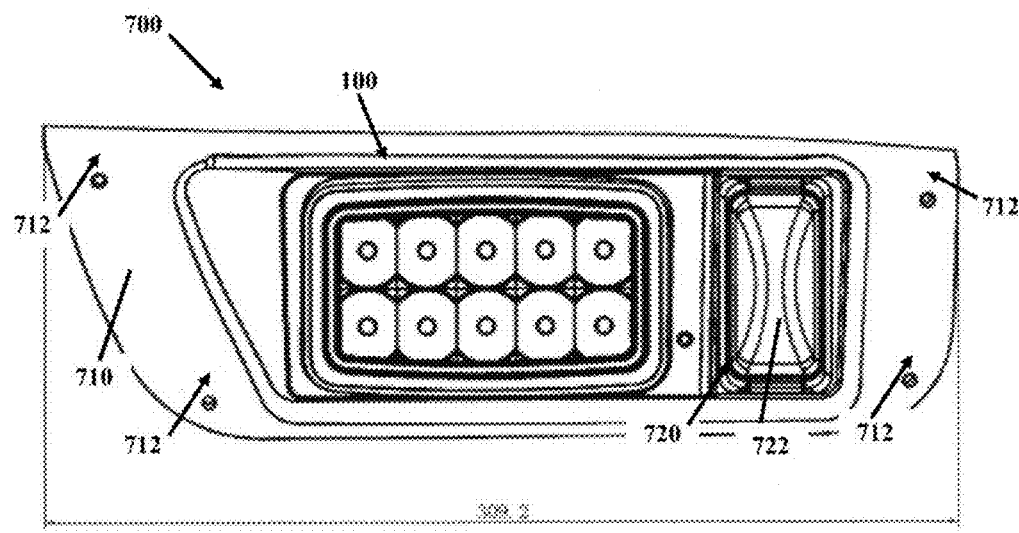
FIG. 7 is a front view of a driver side front light housing assembly with the front light of FIG. 1 and heat sink of FIG. 5, in accordance with an embodiment of the present invention.

FIG. 7 is a front view of a driver side front light housing assembly with the front light of FIG. 1 and the heat sink of FIG. 5, in accordance with an embodiment of the present invention. In FIG. 7, a driver side front light housing assembly 700 is shown with the front light 100 visible and installed on a driver side front light housing front surface 710. To the left of the front light 100 is a turn signal portion 720 covered by a colored turn signal cover 722, for example, an orange turn signal cover 722. Four fastener openings 712 are shown formed, two each, on left and right sides of the front surface 710.

Figure 8:
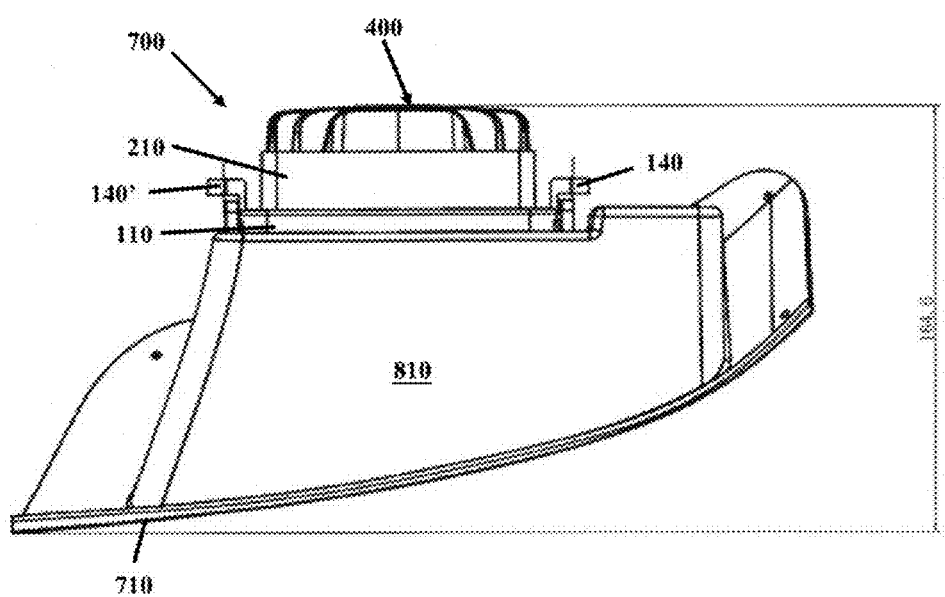
FIG. 8 is a top view of the driver side front light housing assembly of FIG. 7 with the front light of FIG. 1 and heat sink of FIG. 5, in accordance with an embodiment of the present invention.

FIG. 8 is a top view of the driver side front light housing assembly of FIG. 7 with the front light of FIG. 1 and heat sink of FIG. 5, in accordance with an embodiment of the present invention. In FIG. 8, the heat sink 400 is shown connected to the back portion 210 of the front light assembly 100 and a driver side front light housing top surface 810 is shown connected to and extending away from a back side of the driver side front light housing front surface 710. In general, the housing assembly 700 (as well as all of the other housing assemblies disclosed herein) can be formed or molded as a single piece, but it can also be made from independent pieces and glued, fastened or welded together.

Figure 9:
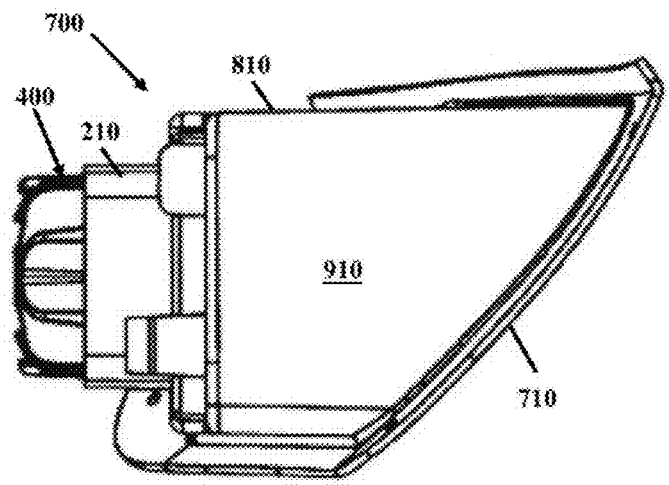
FIG. 9 is a side view of the driver side front light housing assembly of FIG. 7 with the front light of FIG. 1 and heat sink of FIG. 5, in accordance with an embodiment of the present invention.

FIG. 9 is a side view of the driver side front light housing assembly of FIG. 7 with the front light of FIG. 1 and heat sink of FIG. 5, in accordance with an embodiment of the present invention. In FIG. 9, a driver side front light housing left side surface 910 is shown connected to and extending away from the back side of the driver side front light housing front surface 710. In addition, a top edge of the left side surface 910 is connected to a left edge of the top surface 810. Not shown are a bottom surface, a back surface and a right side surface, which variously connect to each other and the top surface 810, the left side surface and the front surface 710 to form the housing assembly 700. While other embodiments of the housing assembly are disclosed herein, it is understood that except for differences in the shape of the housing assembly all are made and assembled using similar if not identical processes and procedures.

Figure 10:
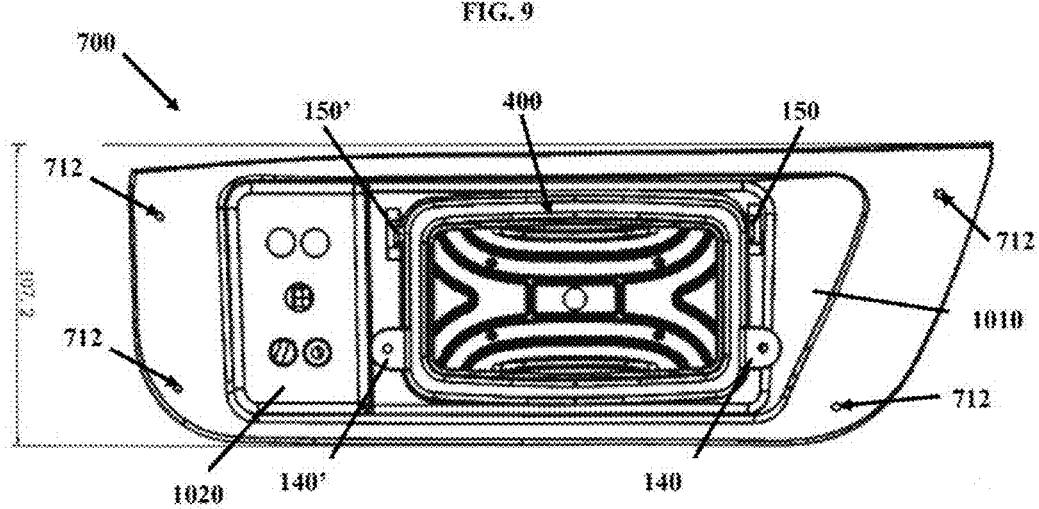
FIG. 10 is a rear view of the driver side front light housing assembly of FIG. 7 with the front light of FIG. 1 and heat sink of FIG. 5, in accordance with an embodiment of the present invention.

FIG. 10 is a rear view of the driver side front light housing assembly of FIG. 7 with the front light of FIG. 1 and heat sink of FIG. 5, in accordance with an embodiment of the present invention. In FIG. 10, a back side 1010 of the front wall 710 is shown with the light assembly 100 and a back surface 1020 of the turn signal portion 720 is shown with five openings formed therein.

Figure 11:
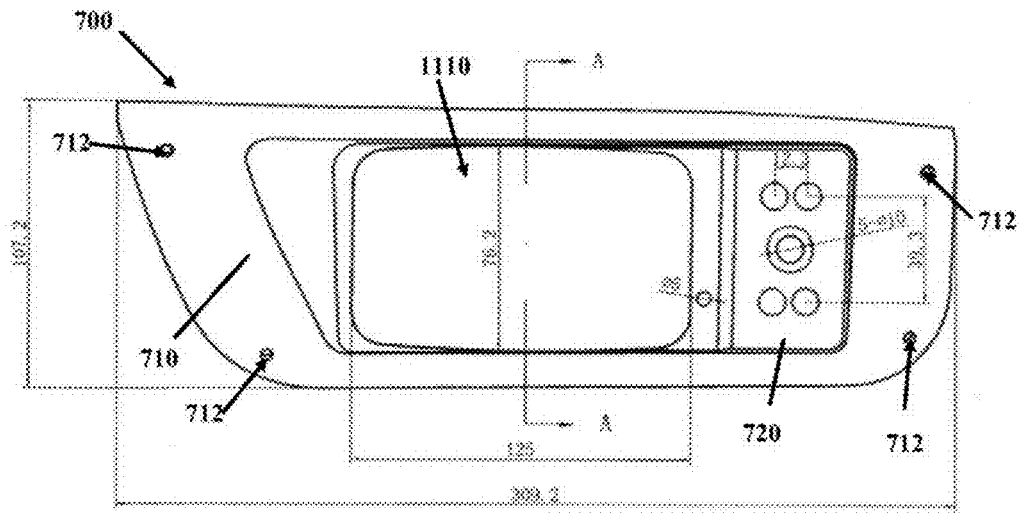
FIG. 11 is a front view of the driver side front light housing of FIG. 7 without the front light of FIG. 1 and without the heat sink of FIG. 5, in accordance with an embodiment of the present invention.

FIG. 11 is a front view of the driver side front light housing of FIG. 7 without the front light of FIG. 1 and without the heat sink of FIG. 5, in accordance with an embodiment of the present invention. In FIG. 11, the housing assembly 700 is shown without the front light assembly 100 installed in a front light opening 1110 formed in the back wall of and the turn signal cover 722 installed.

Figure 12:
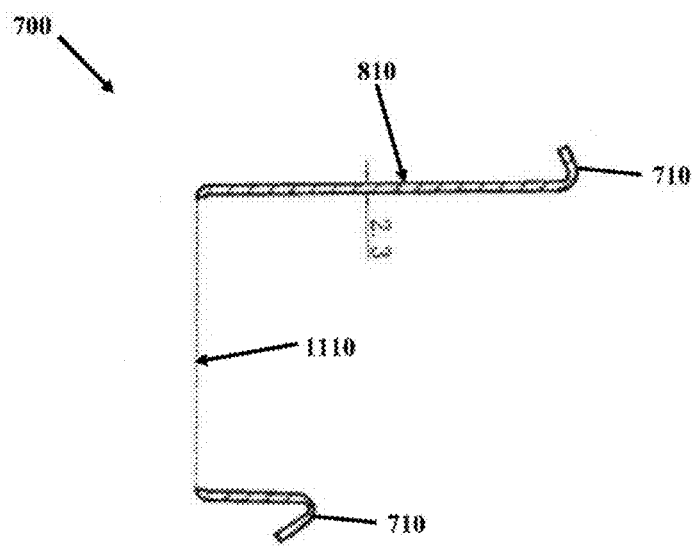
FIG. 12 is cross-sectional side view of the driver side front light housing of FIG. 11 along line A-A, in accordance with an embodiment of the present invention.

FIG. 12 is cross-sectional side view of the driver side front light housing of FIG. 11 along line A-A, in accordance with an embodiment of the present invention.

Figure 13:
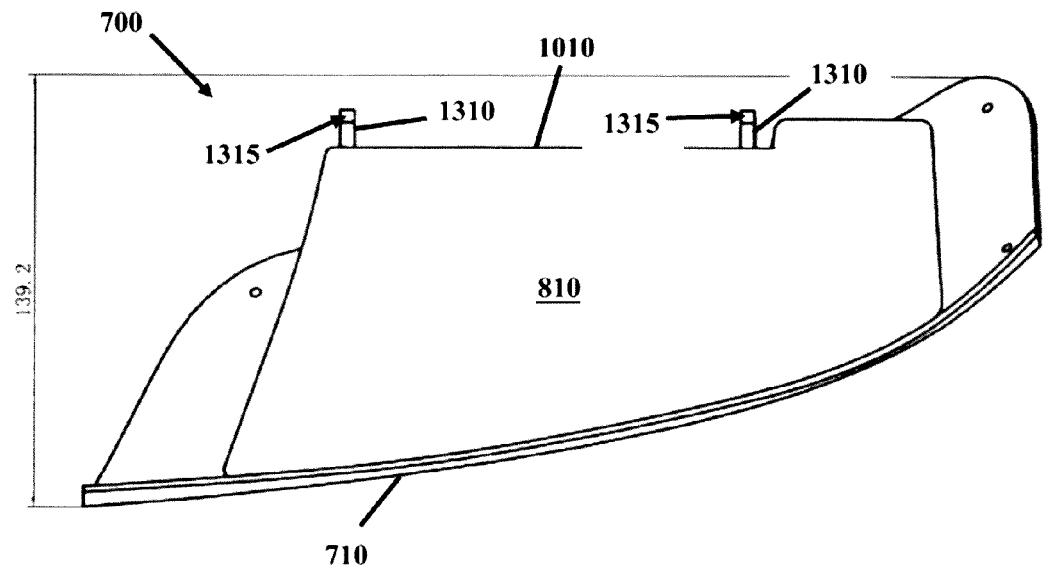
FIG. 13 is top view of the driver side front light housing of FIG. 11, in accordance with an embodiment of the present invention.

FIG. 13 is top view of the driver side front light housing of FIG. 11, in accordance with an embodiment of the present invention. In FIG. 13, two posts 1310, each with channels 1315 are attached to and extend away from the back side 1010 of the front surface 710. The channels 1315 are configured to receive detents 150, 150' of the top portion 110 of the light assembly 100.

Figure 14:
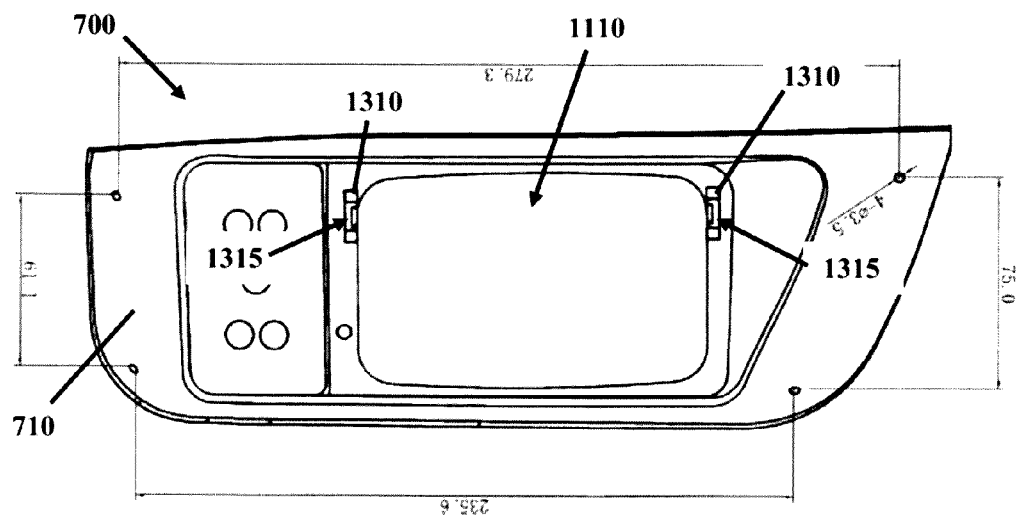
FIG. 14 is a back view of the driver side front light housing of FIG. 11, in accordance with an embodiment of the present invention.

FIG. 14 is a back view of the driver side front light housing of FIG. 11, in accordance with an embodiment of the present invention.

Figure 15:
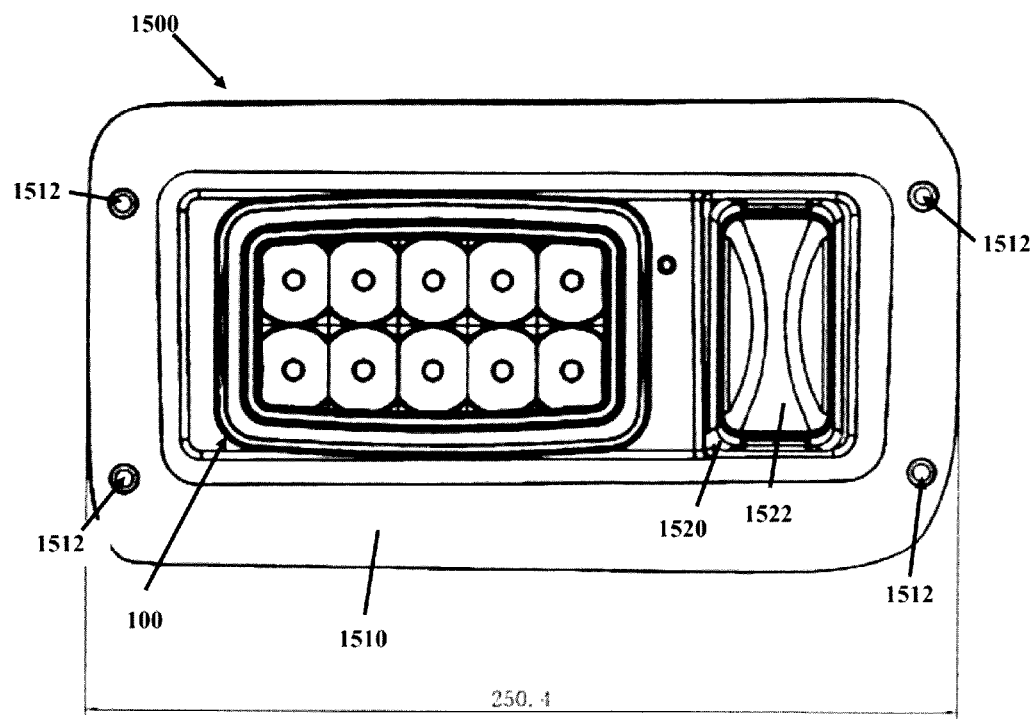
FIG. 15 is a front view of a driver side front light housing assembly with the front light of FIG. 1 and heat sink of FIG. 5, in accordance with another embodiment of the present invention.

FIG. 15 is a front view of an alternative driver side front light housing assembly with the front light of FIG. 1 and heat sink of FIG. 5, in accordance with another embodiment of the present invention. In FIG. 15, an alternative driver side front light housing assembly 1500 is shown with the front light 100 visible and installed on a driver side front light housing front surface 1510. To the right of the front light 100 is a turn signal portion 1520 covered by a turn signal cover 1522. Four fastener openings 1512 are shown formed, two each, on left and right sides of the front surface 1510.

Figure 16:
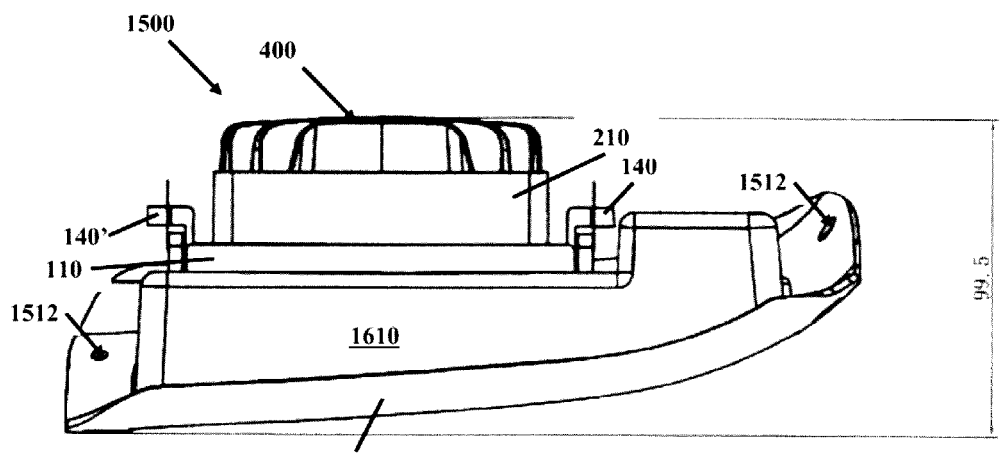
FIG. 16 is a top view of the driver side front light housing assembly of FIG. 15 with the front light of FIG. 1 and heat sink of FIG. 5, in accordance with another embodiment of the present invention.

FIG. 16 is a top view of the alternative driver side front light housing assembly of FIG. 15 with the front light of FIG. 1 and heat sink of FIG. 5, in accordance with another embodiment of the present invention. In FIG. 16, the heat sink 400 is shown connected to the back portion 210 of the front light assembly 100 and a driver side front light housing top surface 1610 is shown connected to and extending away from a back side of the driver side front light housing front surface 1510. In general, the housing assembly 1500 can be formed or molded as a single piece, but it can also be made from independent pieces and glued, fastened or welded together.

Figure 17:
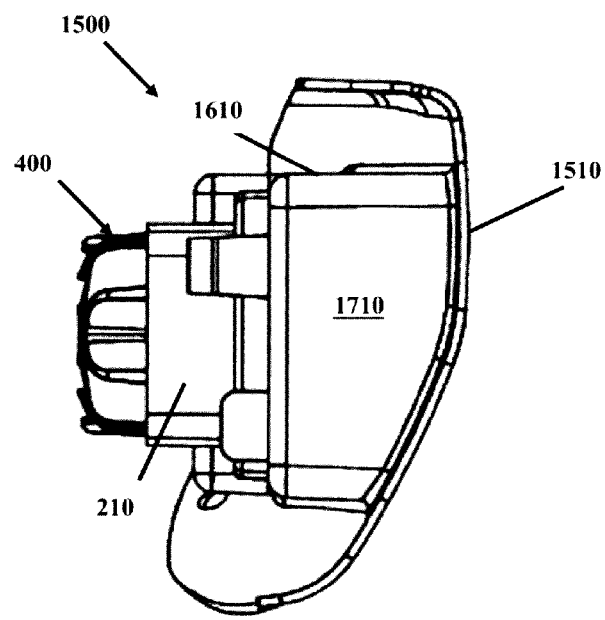
FIG. 17 is a side view of the driver side front light housing assembly of FIG. 15 with the front light of FIG. 1 and heat sink of FIG. 5, in accordance with another embodiment of the present invention.

FIG. 17 is a side view of the alternative driver side front light housing assembly of FIG. 15 with the front light of FIG. 1 and heat sink of FIG. 5, in accordance with another embodiment of the present invention. In FIG. 17, a driver side front light housing left side surface 1710 is shown connected to and extending away from the back side of the driver side front light housing front surface 1510. In addition, a top edge of the left side surface 1610 is connected to a left edge of the top surface 1610. Not shown are a bottom surface, a back surface and a right side surface, which variously connect to each other and the top surface 1610, the left side surface and the front surface 1510 to form the housing assembly 1500. While other embodiments of the housing assembly are disclosed herein, it is understood that except for differences in the shape of the housing assembly all are made and assembled using similar if not identical processes and procedures.

Figure 18:
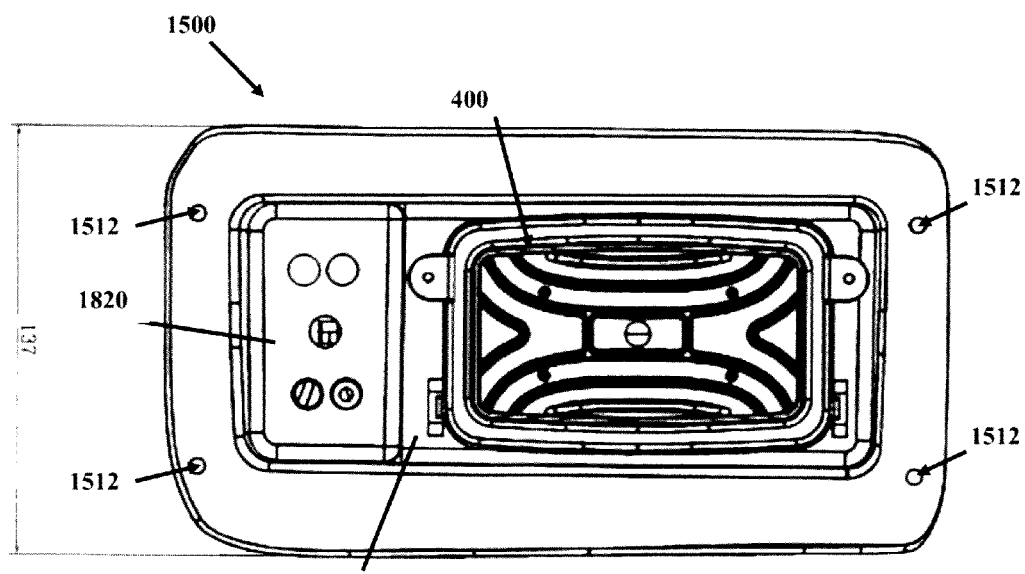
FIG. 18 is a back view of the driver side front light housing assembly of FIG. 15 with the front light of FIG. 1 and heat sink of FIG. 5, in accordance with another embodiment of the present invention.

FIG. 18 is a back view of the alternative driver side front light housing assembly of FIG. 15 with the front light of FIG. 1 and heat sink of FIG. 5, in accordance with another embodiment of the present invention. In FIG. 18, a back side 1810 of the front wall 1510 is shown with the light assembly 100 and a back surface 1820 of the turn signal portion 1520 is shown with five openings formed therein.

Figure 19:
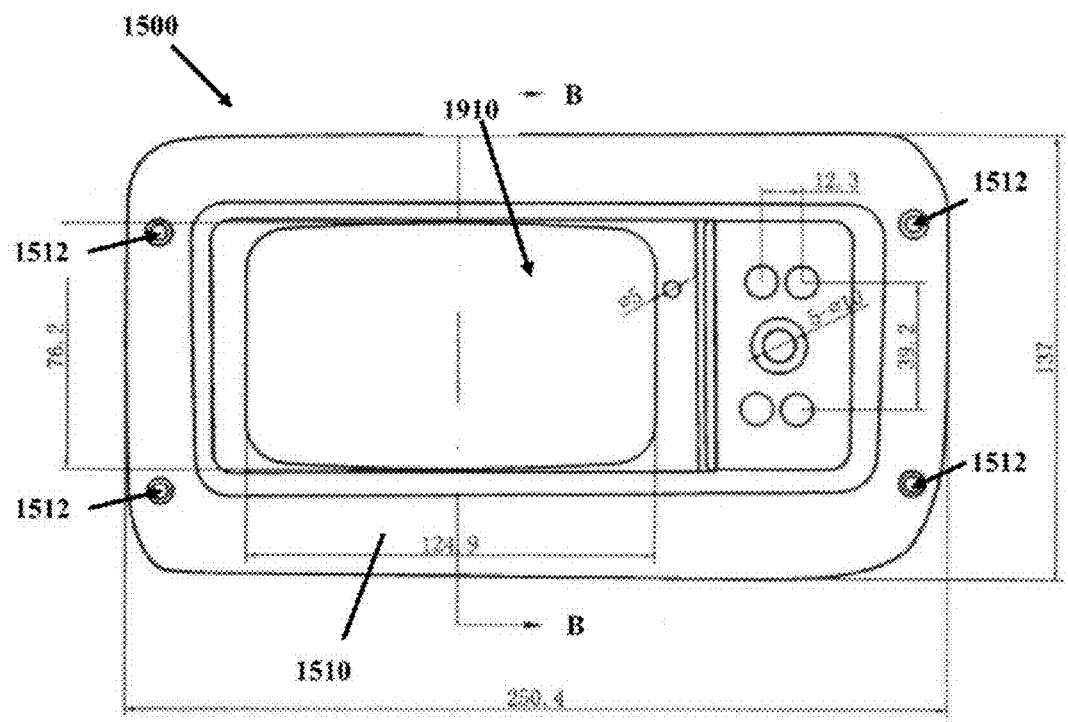
FIG. 19 is a front view of the driver side front light housing of FIG. 15 without the front light of FIG. 1 and without the heat sink of FIG. 5, in accordance with another embodiment of the present invention.

FIG. 19 is a front view of the alternative driver side front light housing of FIG. 15 without the front light of FIG. 1 and without the heat sink of FIG. 5, in accordance with another embodiment of the present invention.

Figure 20:
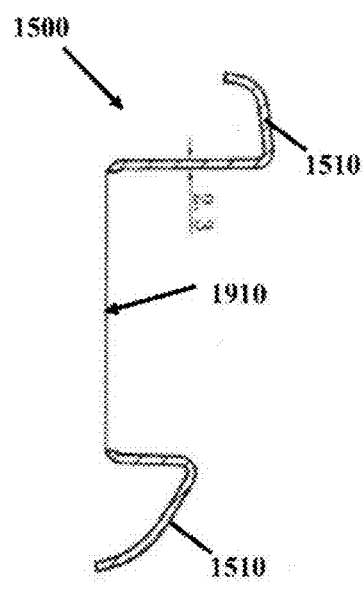
FIG. 20 is cross-sectional side view of the driver side front light housing of FIG. 19 along line B-B, in accordance with another embodiment of the present invention.

FIG. 20 is cross-sectional side view of the driver side front light housing of FIG. 19 along line B-B, in accordance with another embodiment of the present invention.

Figure 21:
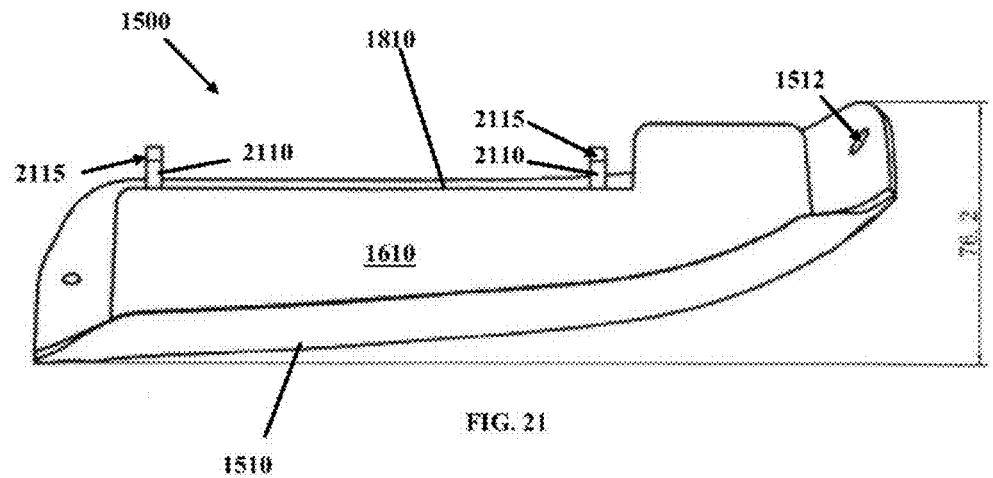
FIG. 21 is top view of the driver side front light housing of FIG. 19, in accordance with another embodiment of the present invention.

FIG. 21 is top view of the driver side front light housing of FIG. 19, in accordance with another embodiment of the present invention. In FIG. 21, two posts 2110, each with channels 2115 are attached to and extend away from the back side 1810 of the front surface 1510. The channels 2115 are configured to receive detents 150, 150' of the top portion 110 of the light assembly 100.

Figure 22:
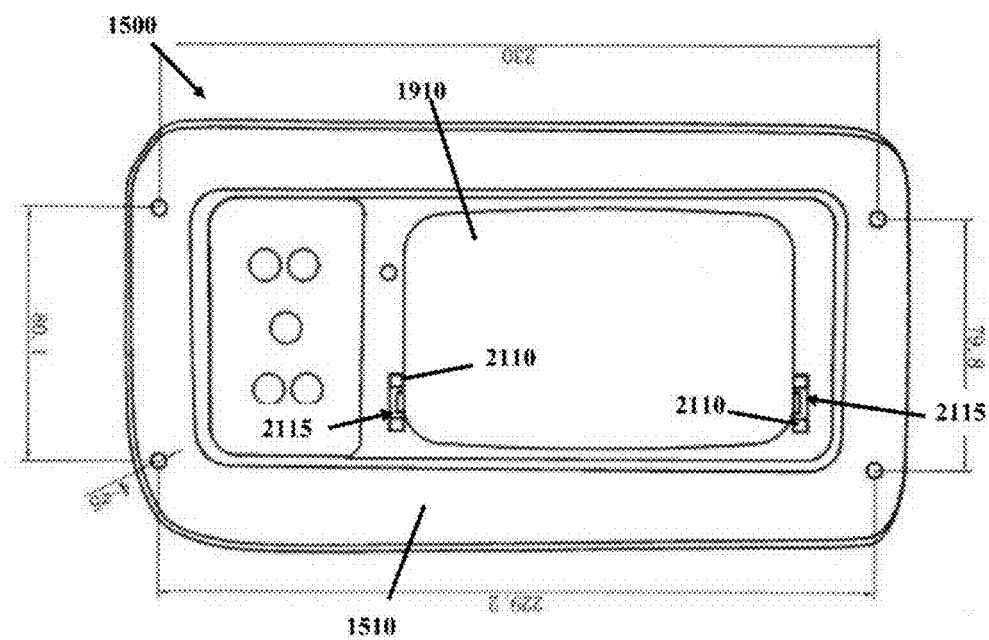
FIG. 22 is a back view of the driver side front light housing of FIG. 19, in accordance with another embodiment of the present invention.

FIG. 22 is a back view of the driver side front light housing of FIG. 19, in accordance with another embodiment of the present invention.

Figure 23:
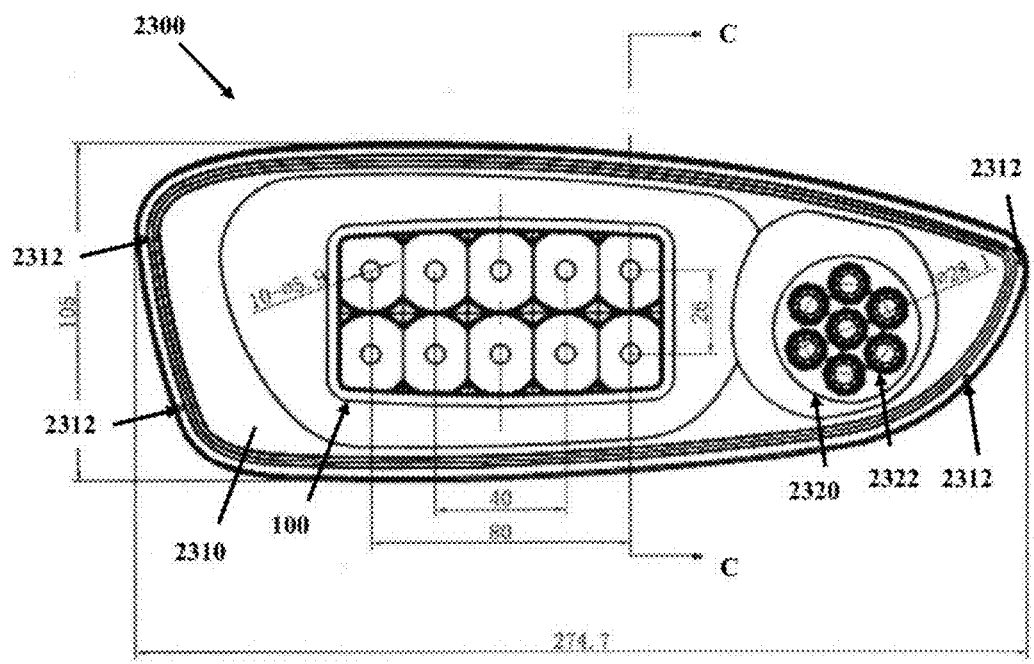
FIG. 23 is a front view of a driver side front light housing assembly with the front light of FIG. 1 and heat sink of FIG. 5, in accordance with another embodiment of the present invention.

FIG. 23 is a front view of yet another alternative driver side front light housing assembly with the front light of FIG. 1 and heat sink of FIG. 5, in accordance with another embodiment of the present invention. In FIG. 23, an alternative driver side front light housing assembly 2300 is shown with the front light 100 visible and installed on a driver side front light housing front surface 2310. To the left of the front light 100 is a turn signal portion 2320 including a circular grouping of LEDs 2322 in which six LEDS are arranged in substantially a circle around a seventh center LED. Four fastener openings 2312 are shown formed, two each, on left and right sides of the front surface 2310.

Figure 24:
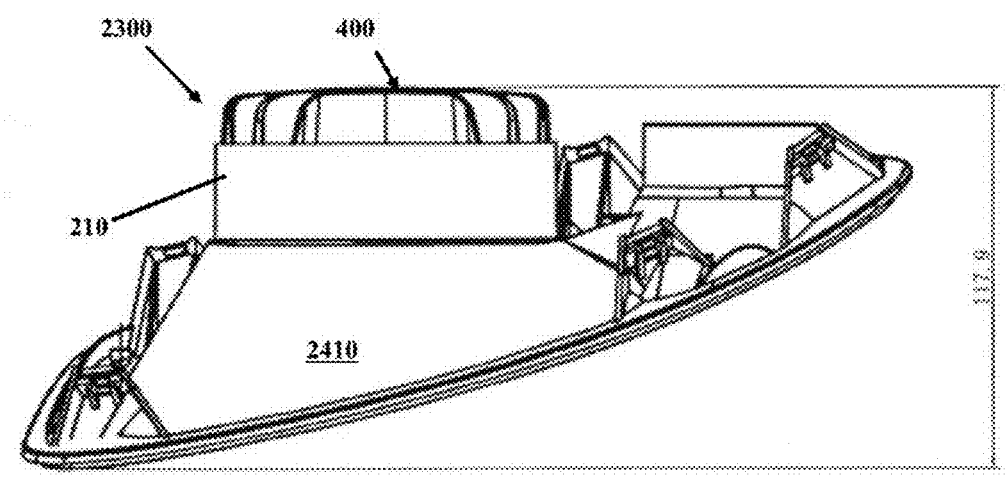
FIG. 24 is a top view of the driver side front light housing assembly of FIG. 23 with the front light of FIG. 1 and heat sink of FIG. 5, in accordance with another embodiment of the present invention.

FIG. 24 is a top view of the driver side front light housing assembly of FIG. 23 with the front light of FIG. 1 and heat sink of FIG. 5, in accordance with another embodiment of the present invention. In FIG. 24, the heat sink 400 is shown connected to the back portion 210 of the front light assembly 100 and a driver side front light housing top surface 2410 is shown connected to and extending away from a back side of the driver side front light housing front surface 2310. In general, the housing assembly 2300 can be formed or molded as a single piece, but it can also be made from independent pieces and glued, fastened or welded together.

Figure 25:
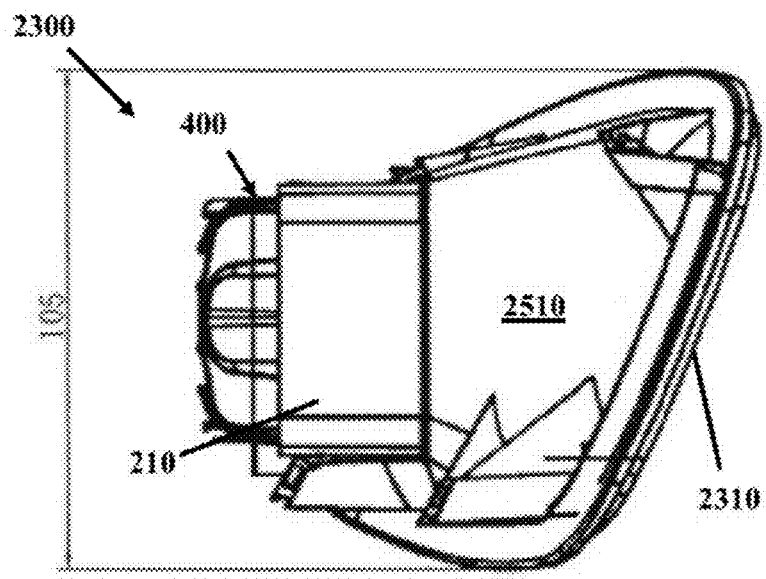
FIG. 25 is a side view of the driver side front light housing assembly of FIG. 23 with the front light of FIG. 1 and heat sink of FIG. 5, in accordance with another embodiment of the present invention.

FIG. 25 is a side view of the driver side front light housing assembly of FIG. 23 with the front light of FIG. 1 and heat sink of FIG. 5, in accordance with another embodiment of the present invention. In FIG. 25, a driver side front light housing left side surface 2510 is shown connected to and extending away from the back side of the driver side front light housing front surface 2510. In addition, a top edge of the left side surface 2410 is connected to a left edge of the top surface 2410. Not shown are a bottom surface, a back surface and a right side surface, which variously connect to each other and the top surface 2410, the left side surface and the front surface 2310 to form the housing assembly 2300. While other embodiments of the housing assembly are disclosed herein, it is understood that except for differences in the shape of the housing assembly all are made and assembled using similar if not identical processes and procedures.

Figure 26:
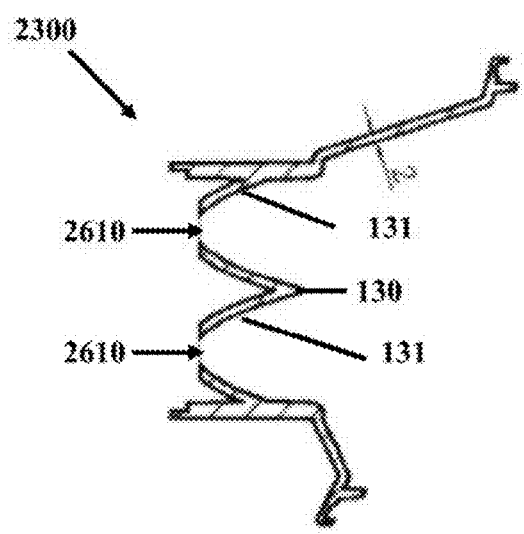
FIG. 26 is cross-sectional side view of the driver side front light housing of FIG. 26 along line B-B, in accordance with another embodiment of the present invention.

FIG. 26 is cross-sectional side view of the driver side front light housing of FIG. 25 along line C-C, in accordance with another embodiment of the present invention. In FIG. 26, the curved reflective surface 130 and two of its concave reflective surfaces 131 in two even rows are shown with each having an opening 2610 formed in a base of the concave reflective surface 131.

Figure 27:
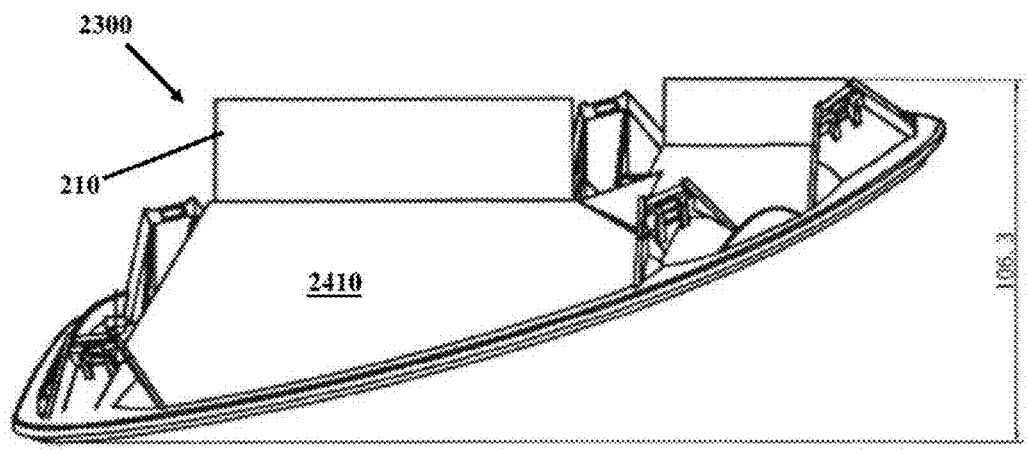
FIG. 27 is top view of the driver side front light housing of FIG. 26, in accordance with another embodiment of the present invention.

FIG. 27 is top view of the driver side front light housing of FIG. 23, in accordance with another embodiment of the present invention.

Figure 28:
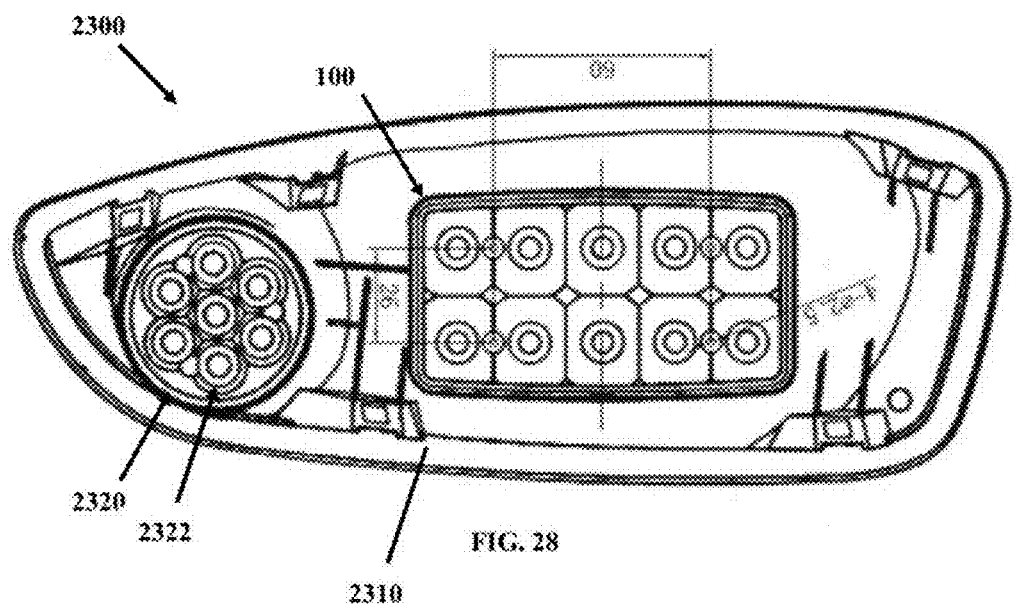
FIG. 28 is a back view of the driver side front light housing of FIG. 26, in accordance with another embodiment of the present invention.

FIG. 28 is a back view of the driver side front light housing of FIG. 23, in accordance with another embodiment of the present invention.

Figure 29:
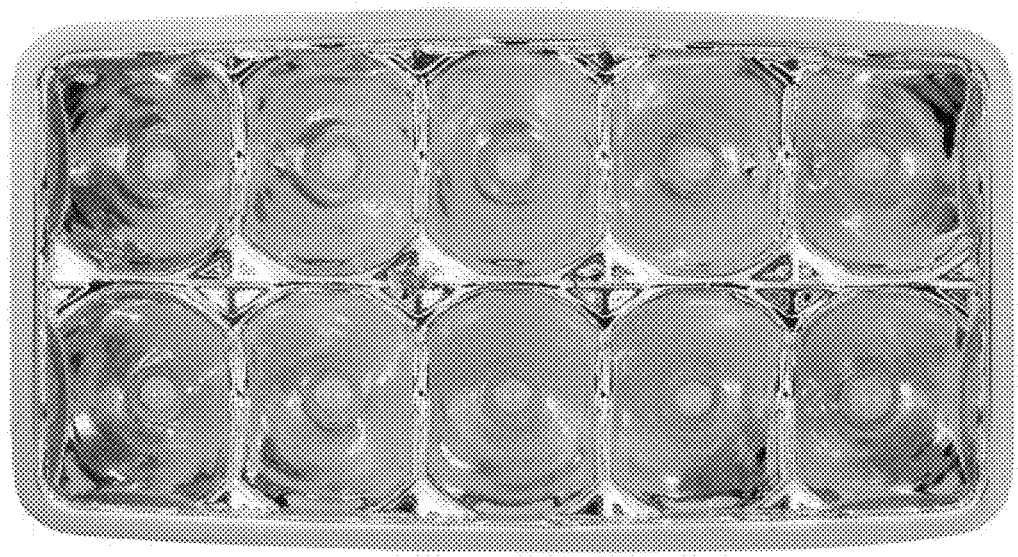
FIG. 29 is a front view of just the multi-LED light portion 115 of FIG. 1, in accordance with another embodiment of the present invention.

FIG. 29 is a front view of just the multi-LED light portion 115 of FIG. 1, in accordance with another embodiment of the present invention.

Figure 30A:
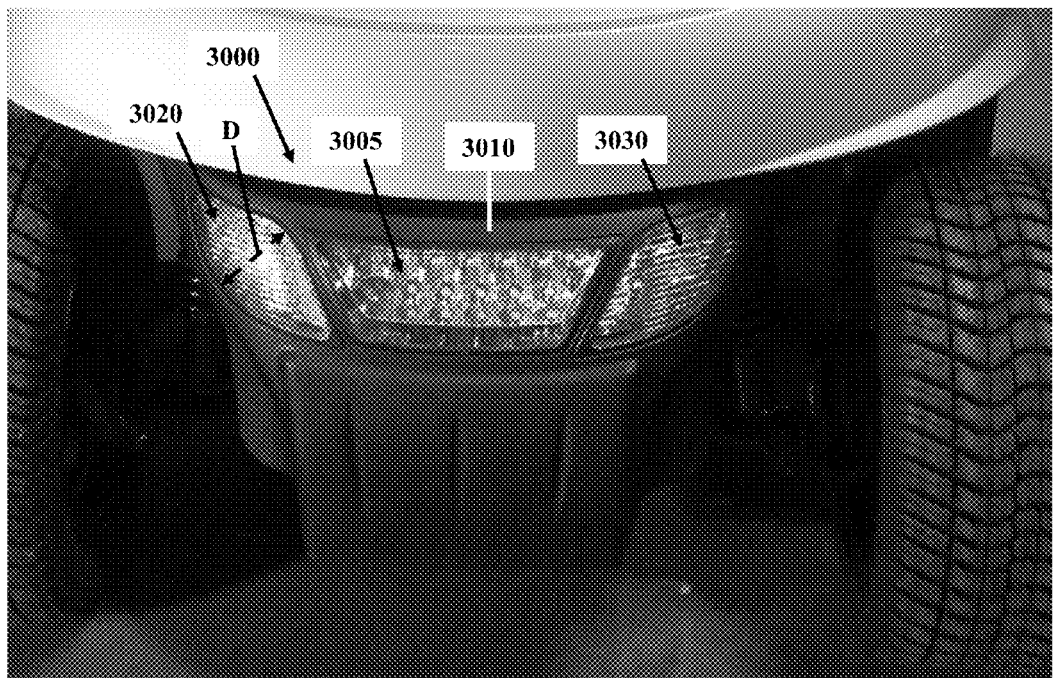
FIG. 30a shows three front light elements installed on a golf cart, in accordance with an embodiment of the present invention.

FIG. 30a shows a three element front light portion of a five piece kit installed on a golf cart, in accordance with an embodiment of the present invention. In FIG. 30, a three element front light kit 3000 includes a housing 3005 surrounding a center light element 3010, which has an inverted, substantially trapezoid shape with two rows of LED lights and two reversed (i.e., mirror images of each other), substantially rhomboid-shaped left and right light elements 3020, 3030, respectively. Each of the substantially rhomboid-shaped outer left and right light elements 3020, 3030 the corners opposite each other on a shortest diagonal D are substantially rounded corners. A top row includes seven LED lights 3012 that are offset from a bottom row 3014 with six LED lights.

Figure 30B:
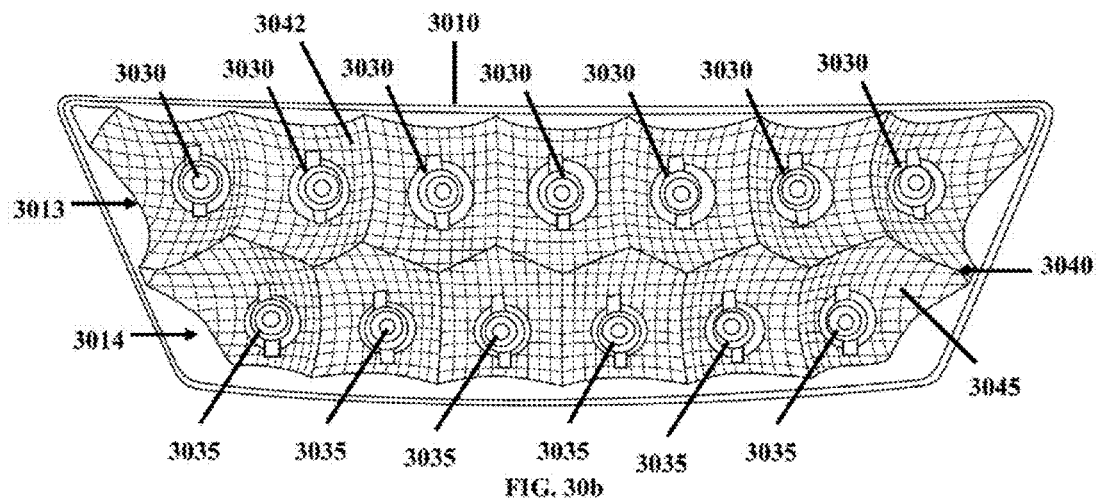
FIG. 30b is a detailed topographic drawing of the LED lights and reflector contours within a front headlight portion, in accordance with yet another embodiment of the present invention.

FIG. 30b is a detailed topographic drawing of the LED lights and reflector contours within a front headlight portion, in accordance with an embodiment of the present invention. In FIG. 30b, a unitary reflective surface 3040 includes a top row 3013 with seven separately configured reflective surfaces 3042 and seven LED lights 3030 that are offset from a bottom row 3014 with six separately configured reflective surfaces 3045 and six LED lights 3035.

Figure 30C:
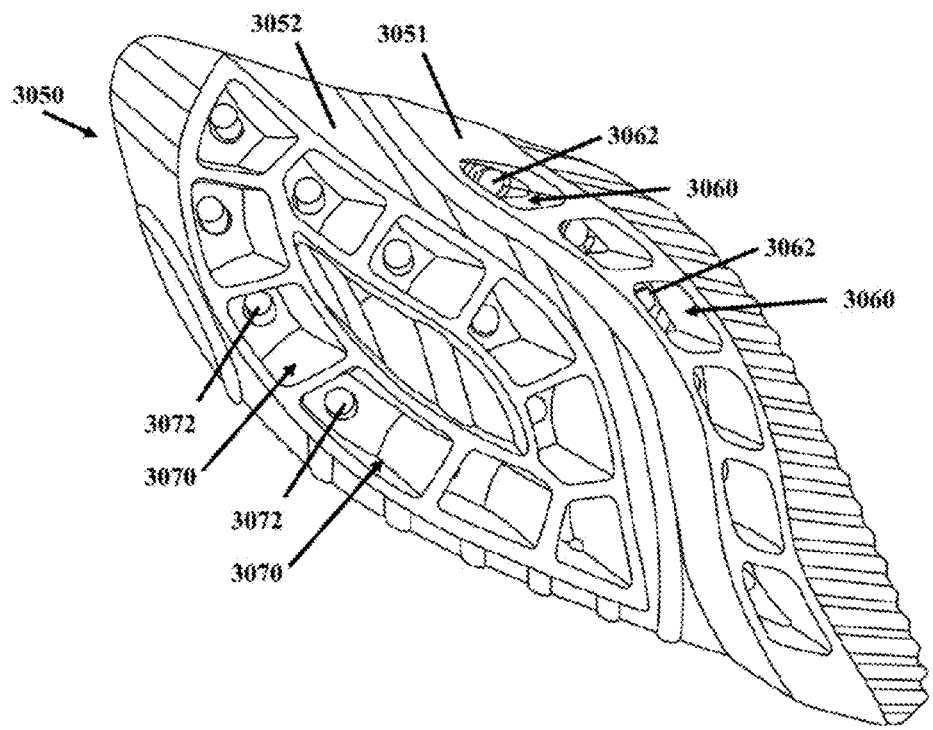
FIG. 30c is a detailed drawing of a passenger side marker LED light element that fits within the passenger side rhomboid-shaped light element, in accordance with yet another embodiment of the present invention.

FIG. 30c is a detailed drawing of a passenger side marker LED light element that fits within the passenger side rhomboid-shaped light element, in accordance with yet another embodiment of the present invention. In FIG. 30c, a passenger side marker LED light element 3050 includes two groups of LED lights, a first group including a first plurality of LED lights 3072 with each in a recess 3070 and all arranged in a substantially oval configuration on an outer side 3052 of the marker LED light element 3050, and a second group including a second plurality of LED lights 3062 with each in its own recess 3060 and arranged in curved line on an inner side 3051 of the marker LED light element 3050.

Figure 31A:
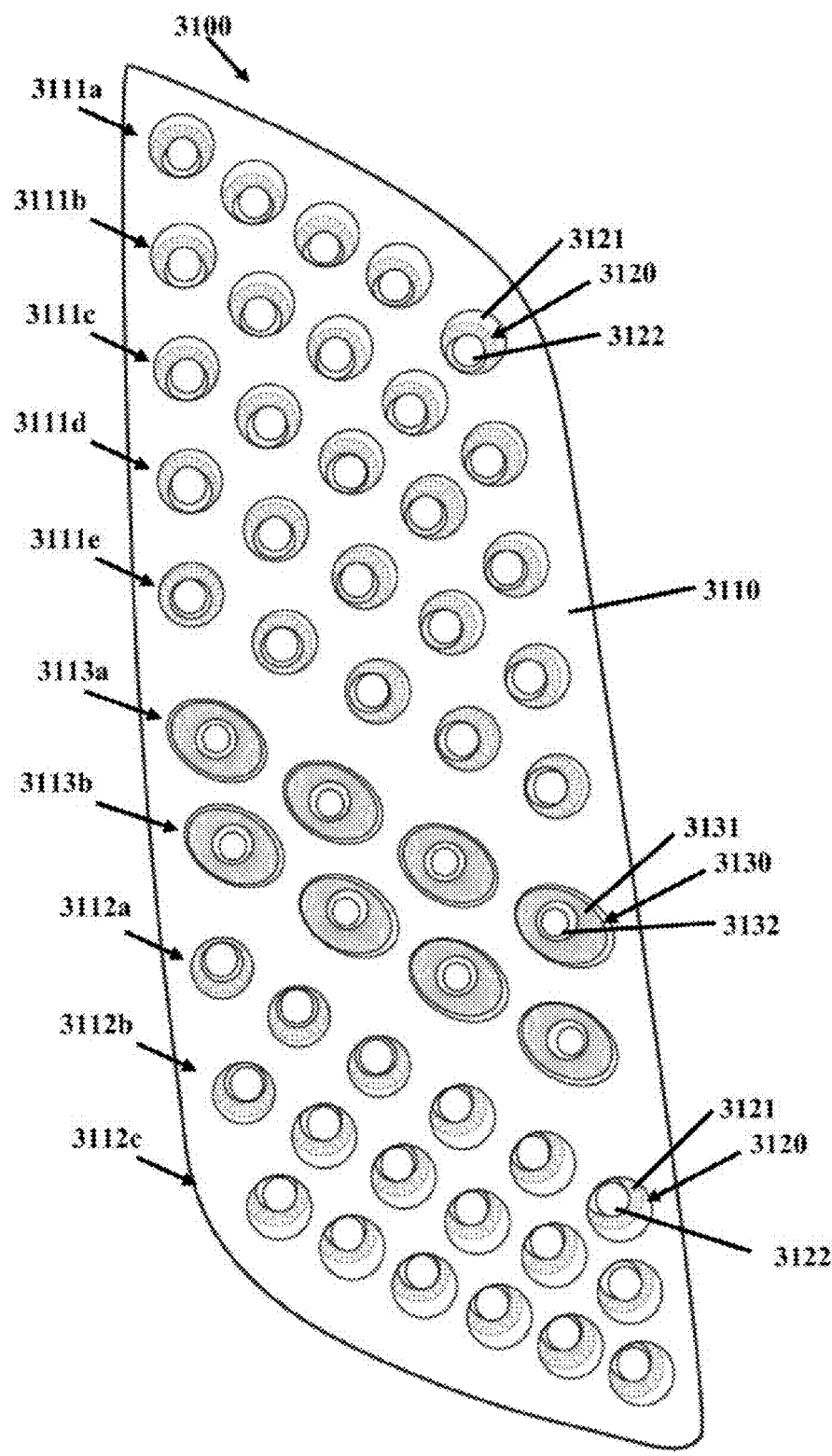
FIG. 31a shows a driver side, multi element rear light assembly without any colored insert covers, in accordance with an embodiment of the present invention.
Figure 31B:
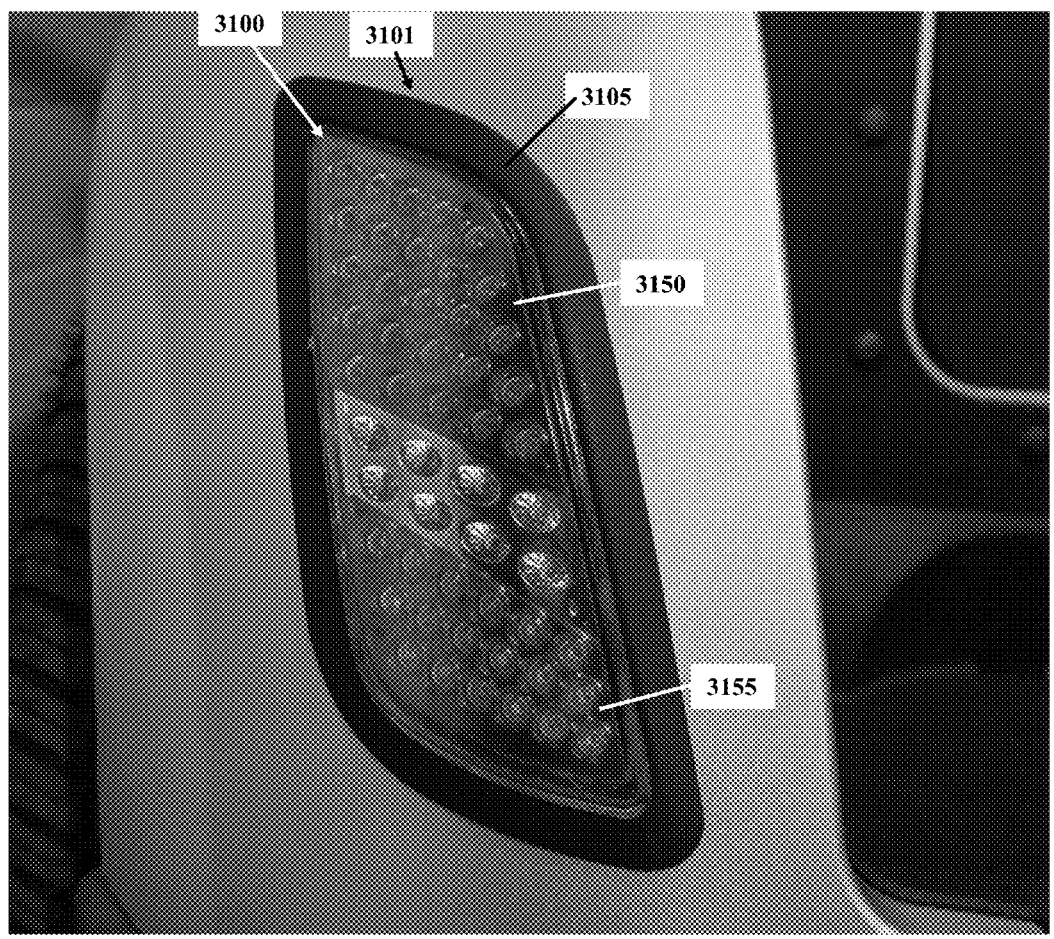
FIG. 31b shows the driver side, multi element rear light assembly of FIG. 31a with red colored insert covers at top and bottom ends of the rear light assembly, in accordance with another embodiment of the present invention.

FIG. 31a shows a driver side rear light element, in accordance with an embodiment of the present invention. In FIG. 31a, an elongated, substantially rhomboid-shaped tail light element 3100 includes five, five light element rows 3111a, 3111b, 3111c, 3111d, 3111e, which are aligned with and substantially parallel to a diagonally downwardly extending top edge of the light element 3100. At a bottom end of the light element 3100 are three, six light element rows 3112a, 3112b, 3112c that are on the same diagonal angle as the five, five light element rows 3111a, 3111b, 3111c, 3111d, 3111e. The five, five light element rows 3111a, 3111b, 3111c, 3111d, 3111e and the three, six light element rows 3112a, 3112b, 3112c are generally covered/surrounded with a colored lens (e.g., a red lens) and can all operate as tail lights, back-up lights, turn signal lights and brake lights. In between the three, six light element rows 3112a, 3112b, 3112c and the five, five light element rows 3111a, 3111b, 3111c are two, four light element rows 3113a, 3113b that are on the same diagonal angle as the other light element rows. In general, because the two, four light element rows are not generally covered/surrounded with a colored lens (e.g., a red lens), as seen in FIG. 31b, they can operate as back-up lights, turn signal lights and brake lights. However, the two, four light element rows can also operate as tail lights.

In FIG. 31a, the five, five light element rows 3111a, 3111b, 3111c, 3111d, 3111e and the three, six light element rows 3112a, 3112b, 3112c use a substantially identical and substantially circular LED light element 3120 with a reflective surface 3121 that has a faceted design around a bottom portion and adjacent an LED light 3122 and a smooth top portion. The two, four light element rows 3113a, 3113b use a substantially oval LED light element 3130 with a reflective surface 3131 that has a faceted design around a bottom portion and adjacent an LED light 3132 and a smooth top portion.

FIG. 31b shows the driver side, a multi element rear light assembly with the light element 3100 of FIG. 31a with red colored insert covers 3150, 3155 at top and bottom ends of the rear light assembly installed on a left rear bumper of a golf cart, in accordance with another embodiment of the present invention. In FIG. 31a, an elongated, substantially rhomboid-shaped tail light assembly 3101 includes a housing 3105 surrounding the light element 3100 with five, five light element rows 3111a, 3111b, 3111c, 3111d, 3111e, which are aligned with and substantially parallel to a diagonally downwardly extending top edge of the light element 3100 and the housing 3105. At a bottom end of the light element 3110 are three, six light element rows 3112a, 3112b, 3112c that are on the same diagonal angle as the five, five light element rows 3111a, 3111b, 3111c, 3111d, 3111e. The light five light element rows 3111a, 3111b, 3111c, 3111d, 3111e and the three, six light element rows 3112a, 3112b, 3112c can all operate as tail lights, back-up lights, turn signal lights and brake lights. In between the three, six light element rows 3112a, 3112b, 3112c and the five, five light element rows 3111a, 3111b, 3111c are two, four light element rows 3113a, 3113b that are on the same diagonal angle as the other light element rows. Two of the rhomboid-shaped multi element rear light assemblies 3101 complete the five-piece kit described above in relation to FIG. 30a.

Figure 32:
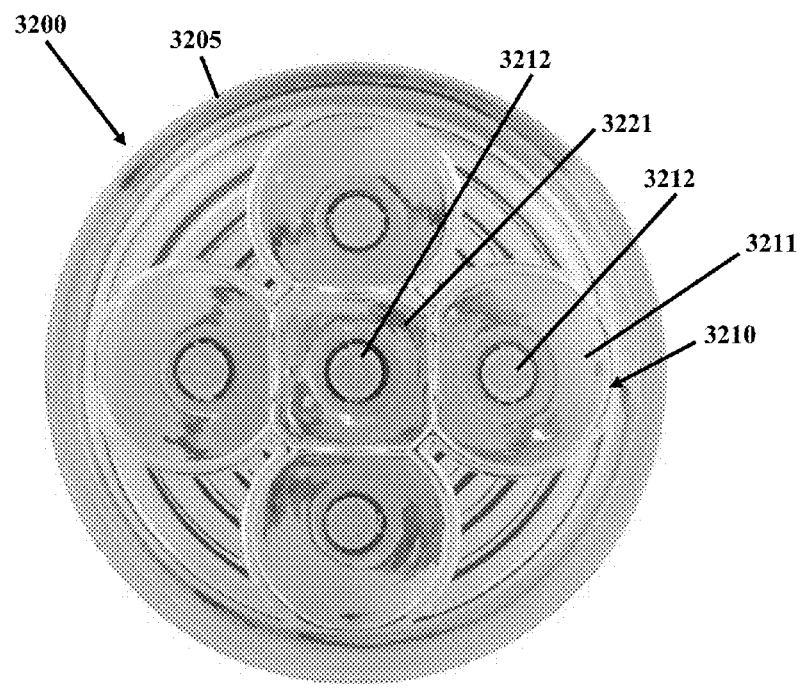
FIG. 32 shows a circular, five LED front light, in accordance with yet another embodiment of the present invention.

FIG. 32 shows a circular, five LED front light, in accordance with yet another embodiment of the present invention. In FIG. 32, a reflective element 3210 includes five substantially smooth concave reflective surfaces with four outer surfaces 3211 being substantially circular in shape and a center surface 3221 being substantially square in shape and all arranged in a "+" shape with an LED 3212 installed at a base of each concave reflective surface 3211, 3212.

Figure 33:
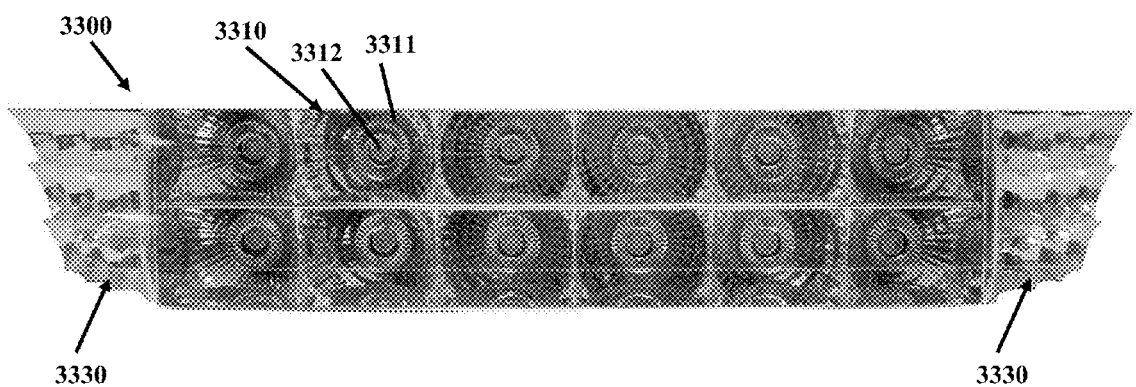
FIG. 33 shows a two row, ten LED front light, in accordance with yet another embodiment of the present invention.

FIG. 33 shows a two row, twelve LED front light, in accordance with yet another embodiment of the present invention. In FIG. 33, a reflective element 3310 includes two rows of six substantially circular concave reflective surfaces 3311 with an LED 3312 installed at a base of each concave reflective surface 3311. In the embodiment in FIG. 33, the reflective surfaces 3311 are shown to have multiple, differently oriented faceted rows to maximize the intensity and/or evenly dissipate/spread the reflected light from the LEDs 3312. At each end of the reflective element 3310 is a turn signal portion 3330.

Figure 34:
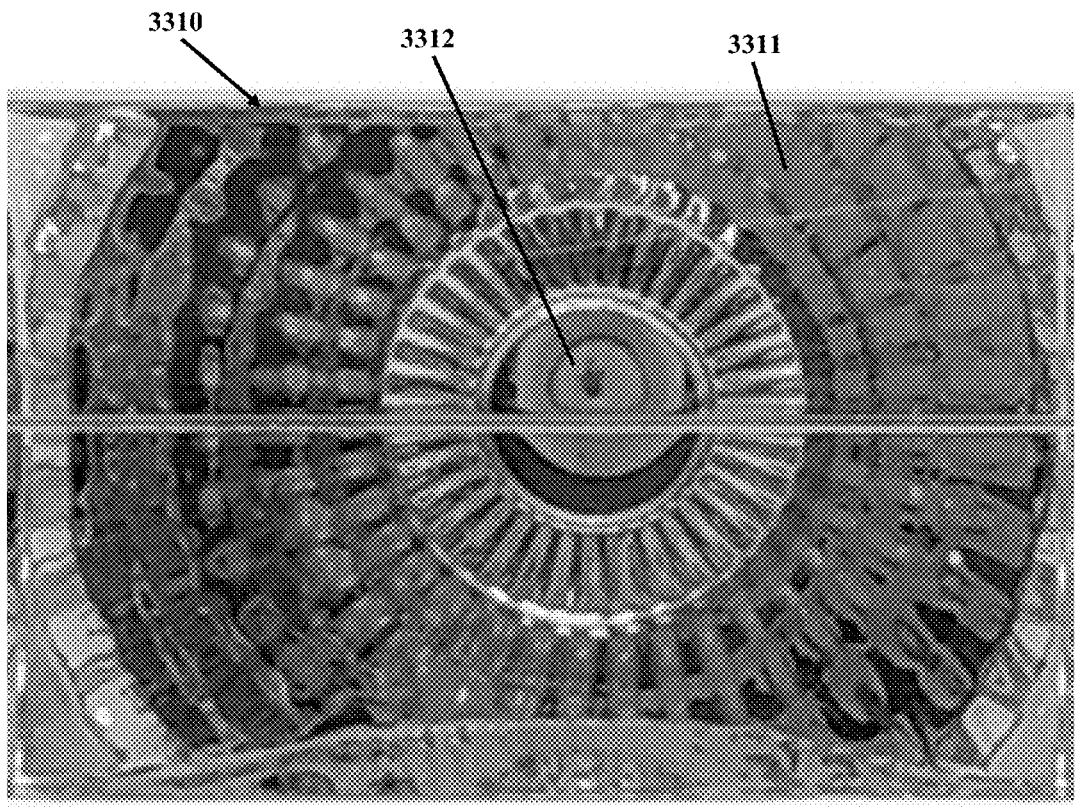
FIG. 34 shows a detailed, close-up of one of the LED lights from the ten element front light of FIG. 33, in accordance with yet another embodiment of the present invention.

FIG. 34 shows a detailed, close-up of one of the LED lights from the twelve element front light of FIG. 33, in accordance with yet another embodiment of the present invention. In FIG. 34, the multiple, differently oriented faceted rows of the concave reflective surface 3311 are seen more clearly.

Figure 35:
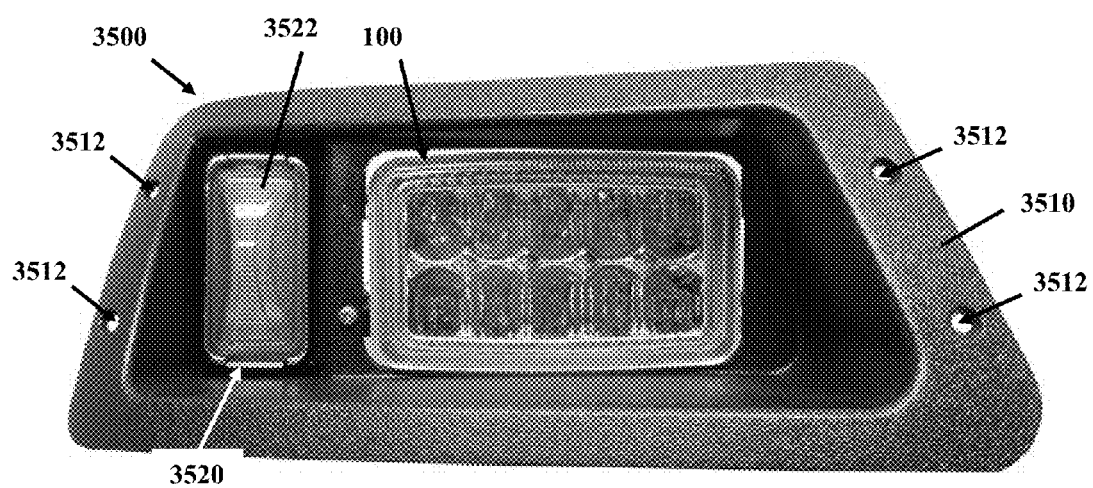
FIG. 35 is a front view of a passenger side front light housing assembly with the front light of FIG. 1 and heat sink of FIGS. 5 and 42 to 49, in accordance with another embodiment of the present invention.

FIG. 35 is a front view of a passenger side front light housing assembly with the front light of FIG. 1 and heat sink of FIGS. 5 and 42 to 49, in accordance with another embodiment of the present invention. In FIG. 35, a passenger side front light housing assembly 3500 is shown with the front light 100 visible and installed on a passenger side front light housing front surface 3510. To the left of the front light 100 is a turn signal portion 3520 covered by a turn signal cover 3522. Four fastener openings 3512 are shown formed, two each, on left and right sides of the front surface 3510.

Figure 36:
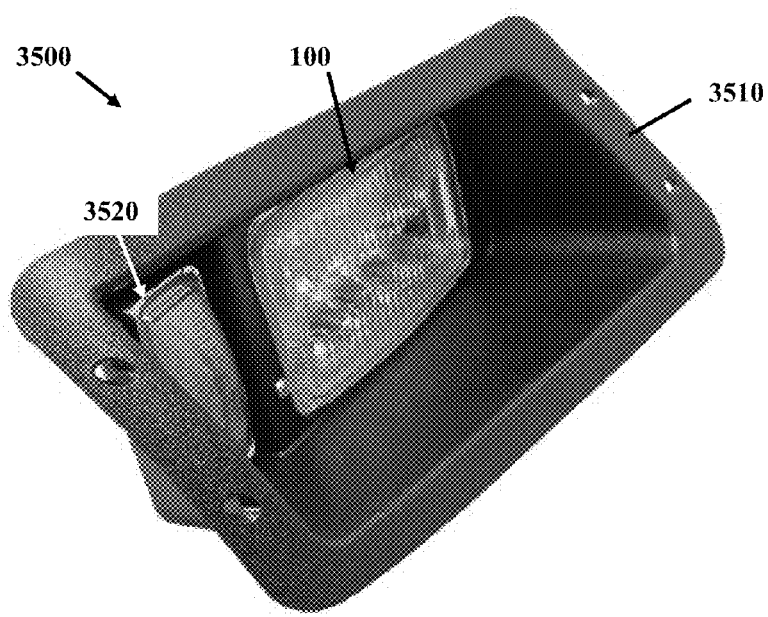
FIG. 36 is an isometric, front-left top view of the passenger side front light housing assembly of FIG. 35 with the front light of FIG. 1 and heat sink of FIGS. 5 and 42 to 49, in accordance with another embodiment of the present invention.

FIG. 36 is an isometric, front-left top view of the passenger side front light housing assembly of FIG. 35 with the front light of FIG. 1 and heat sink of FIGS. 5 and 42 to 49, in accordance with another embodiment of the present invention.

Figure 37:
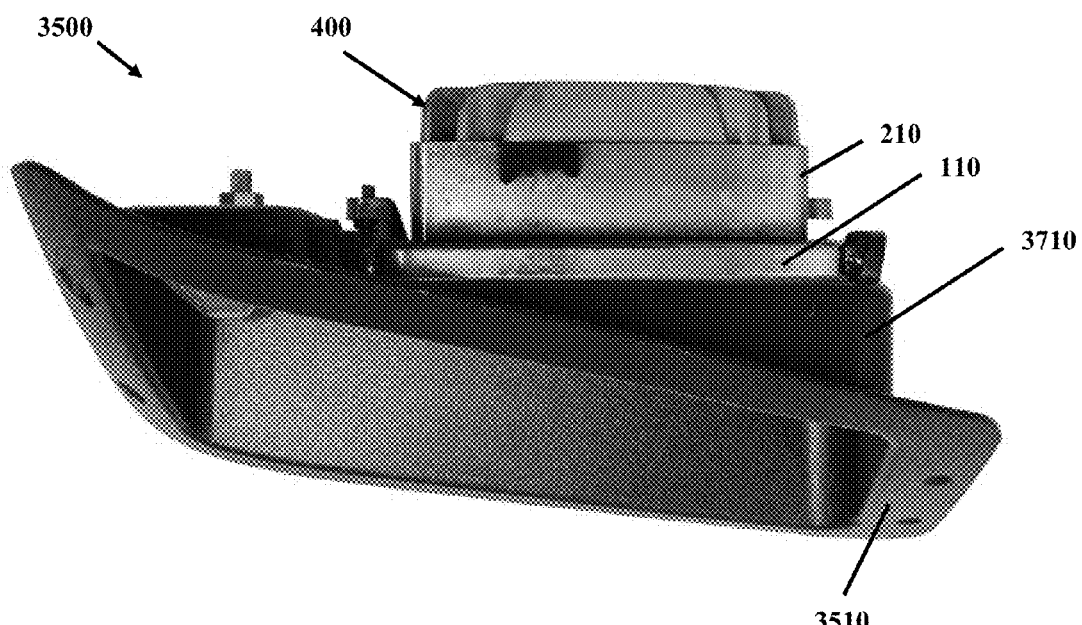
FIG. 37 is a bottom view of the passenger side front light housing assembly of FIG. 35 with the front light of FIG. 1 and heat sink of FIGS. 5 and 42 to 49, in accordance with an embodiment of the present invention.

FIG. 37 is a bottom view of the passenger side front light housing assembly of FIG. 35 with the front light of FIG. 1 and heat sink of FIGS. 5 and 42 to 49, in accordance with an embodiment of the present invention. In FIG. 37, the heat sink 400 is shown connected to the back portion 210 of the front light assembly 100 and a passenger side front light housing top surface 3710 is shown connected to and extending away from a back side of the passenger side front light housing front surface 3510. In general, the housing assembly 3500 can be formed or molded as a single piece, but it can also be made from independent pieces and glued, fastened or welded together.

Figure 38:
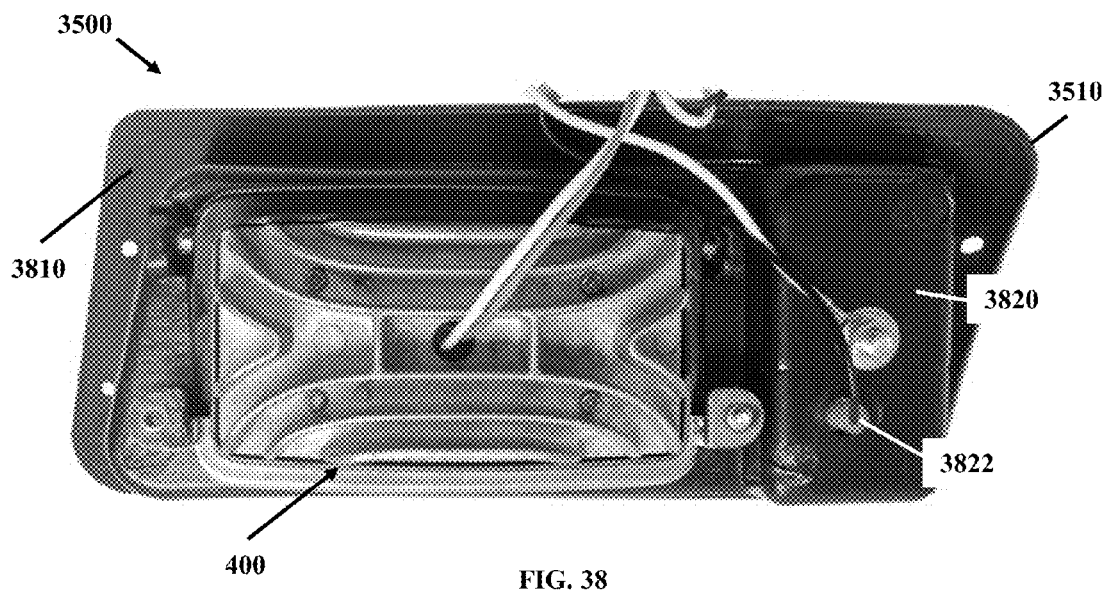
FIG. 38 is a back view of the passenger side front light housing assembly of FIG. 35 with the front light of FIG. 1 and heat sink of FIGS. 5 and 42 to 49, in accordance with an embodiment of the present invention.

FIG. 38 is a back view of the passenger side front light housing assembly of FIG. 35 with the front light of FIG. 1 and heat sink of FIGS. 5 and 42 to 49, in accordance with an embodiment of the present invention. In FIG. 38, a back side 3810 of the front wall 3510 is shown with the light assembly 100 and a back surface 3820 of the turn signal portion 3520 is shown with a LED light 3822 installed into the turn signal portion 3520.

Figure 39:
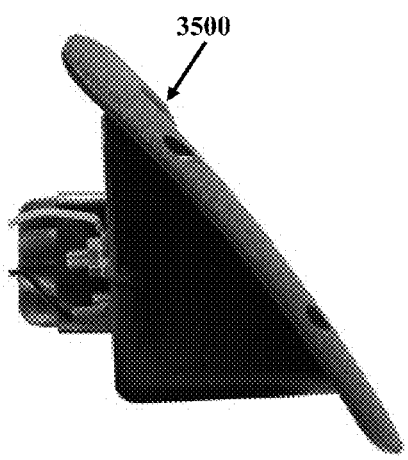
FIG. 39 is a left side view of the passenger side front light housing of FIG. 35 with the front light of FIG. 1 and heat sink of FIGS. 5 and 42 to 49, in accordance with an embodiment of the present invention.

FIG. 39 is a left side view of the passenger side front light housing of FIG. 35 with the front light of FIG. 1 and heat sink of FIGS. 5 and 42 to 49, in accordance with an embodiment of the present invention.

Figure 40:
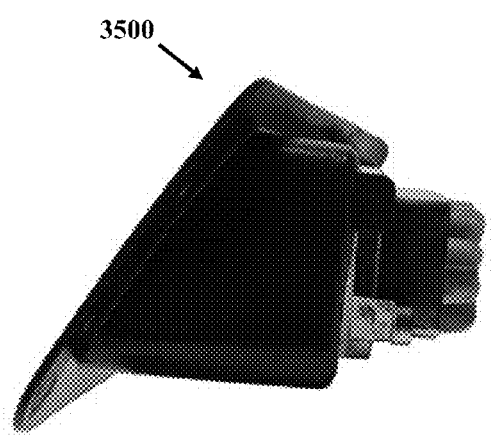
FIG. 40 is right side view of the passenger side front light housing of FIG. 35 with the front light of FIG. 1 and heat sink of FIGS. 5 and 42 to 49, in accordance with an embodiment of the present invention.

FIG. 40 is right side view of the passenger side front light housing of FIG. 35 with the front light of FIG. 1 and heat sink of FIGS. 5 and 42 to 49, in accordance with an embodiment of the present invention.

Figure 41:
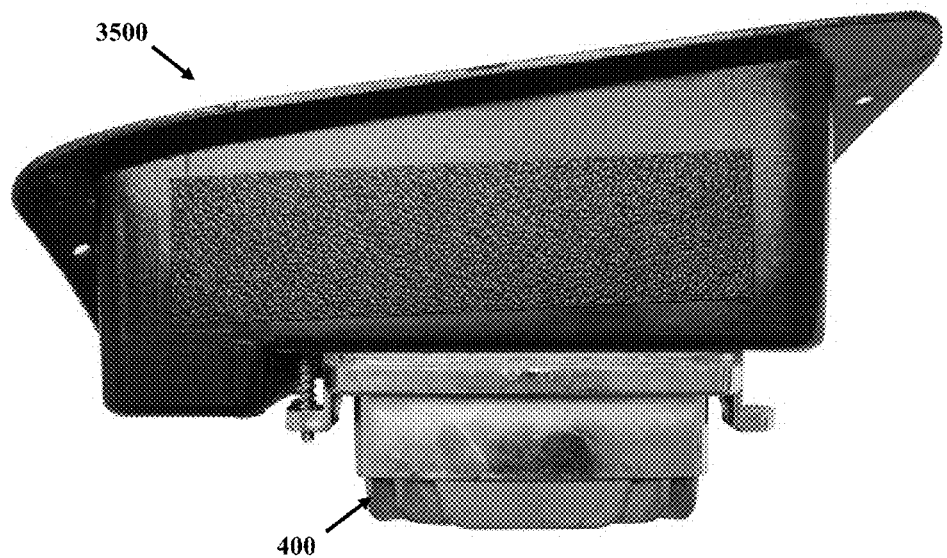
FIG. 41 is bottom view of the passenger side front light housing of FIG. 35 with the front light of FIG. 1 and heat sink of FIGS. 5 and 42 to 49, in accordance with an embodiment of the present invention.

FIG. 41 is bottom view of the passenger side front light housing of FIG. 35 with the front light of FIG. 1 and heat sink of FIGS. 5 and 42 to 49, in accordance with an embodiment of the present invention.

Figure 42:
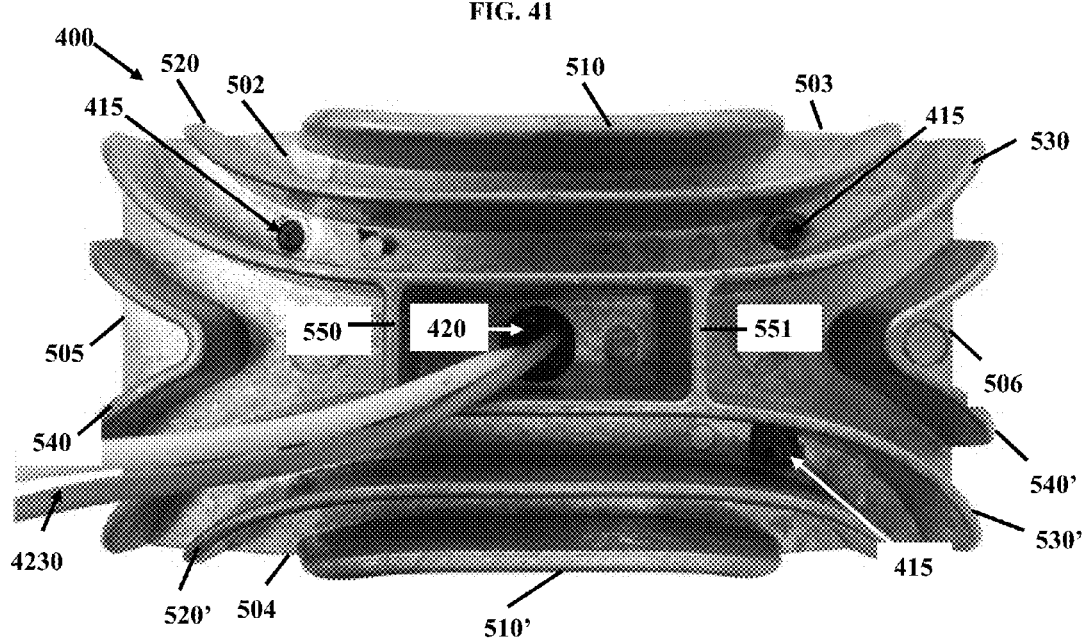
FIG. 42 is a front view of a heat sink, in accordance with another embodiment of the present invention.

FIG. 42 is a front view of the heat sink 400 of FIG. 5, in accordance with another embodiment of the present invention.

FIG. 43 is a top view of the heat sink of FIG. 42, in accordance with another embodiment of the present invention.

FIG. 44 is a left side view of the heat sink of FIG. 42, in accordance with another embodiment of the present invention.

FIG. 45 is a right side view of the heat sink of FIG. 42, in accordance with another embodiment of the present invention.

Figure 46:
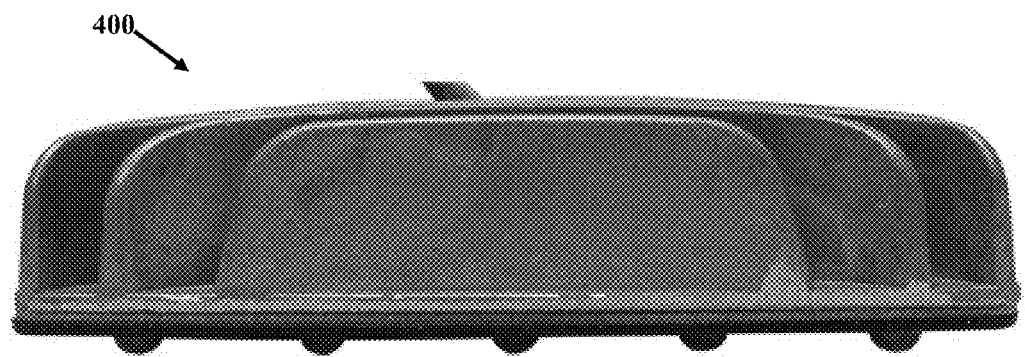
FIG. 46 is a bottom view of the heat sink of FIG. 42, in accordance with another embodiment of the present invention.

FIG. 46 is a bottom view of the heat sink of FIG. 42, in accordance with another embodiment of the present invention.

Figure 47:
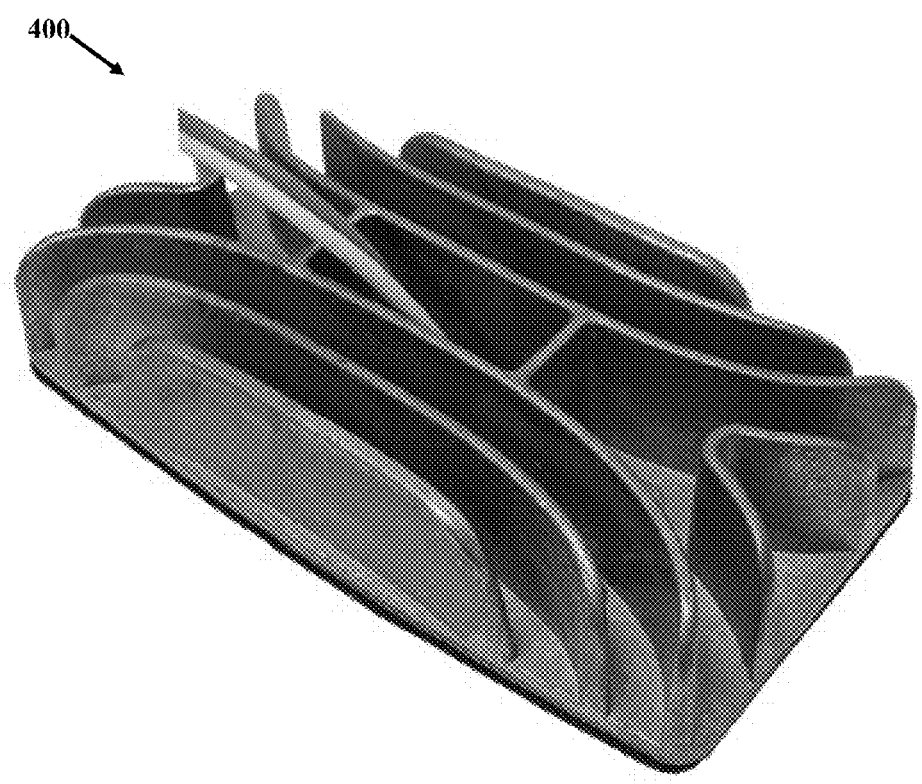
FIG. 47 is an isometric front view of the heat sink of FIG. 42, in accordance with another embodiment of the present invention.

FIG. 47 is an isometric front view of the heat sink of FIG. 42, in accordance with another embodiment of the present invention.

Figure 48:
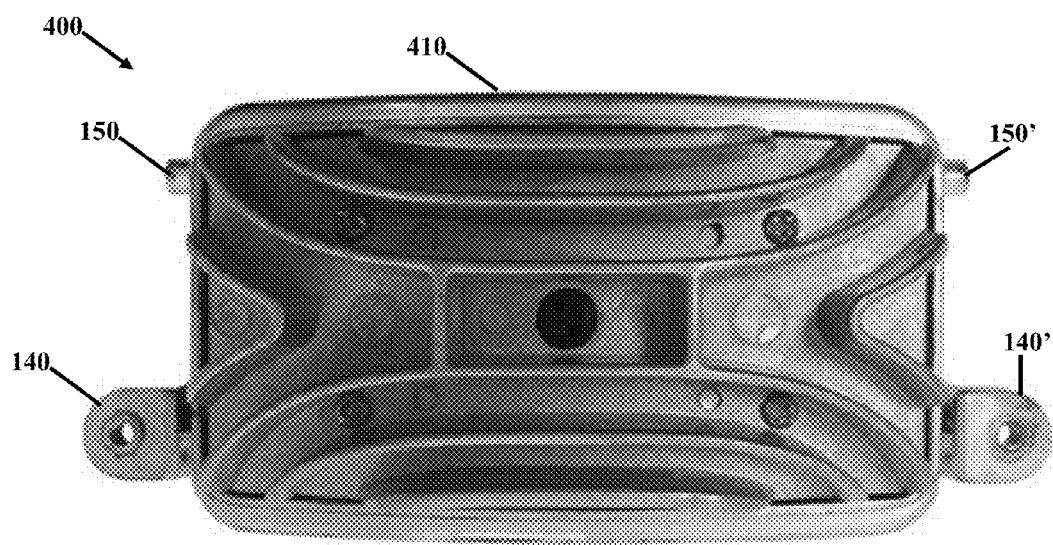
FIG. 48 is a front view of the heat sink of FIG. 42 with a base plate, in accordance with another embodiment of the present invention.

FIG. 48 is a front view of the heat sink of FIG. 42 with a base plate, in accordance with another embodiment of the present invention.

Figure 49:
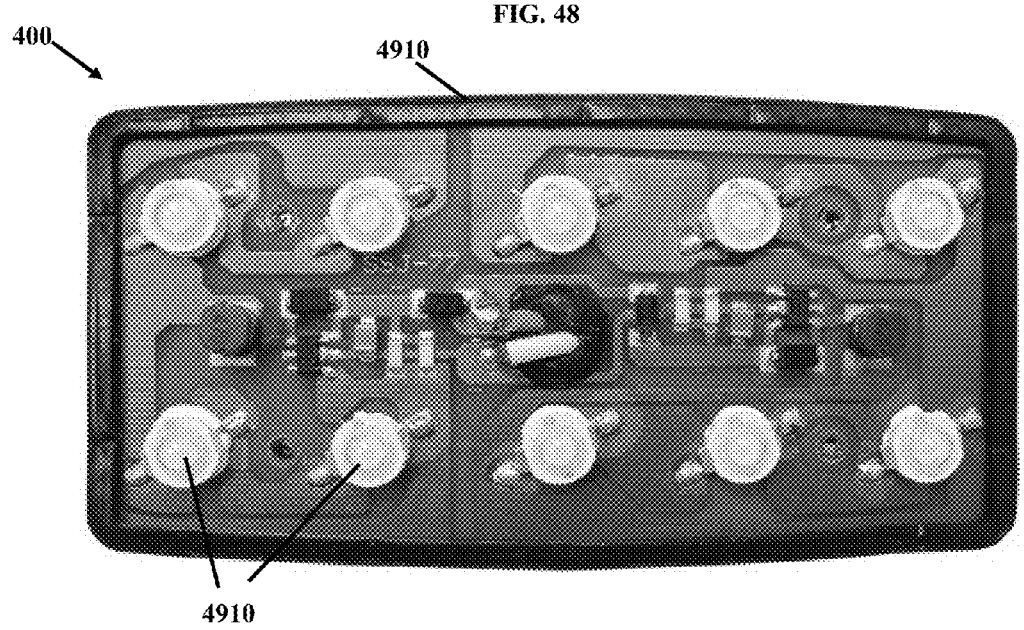
FIG. 49 is a back view of the heat sink of FIG. 42 with an LED circuit board with LED lights installed, in accordance with another embodiment of the present invention.

FIG. 49 is a back view of the heat sink of FIG. 42 with an LED circuit board with LED lights installed, in accordance with another embodiment of the present invention. In FIG. 49, an LED circuit board 4910 is shown populated with LEDs 4912 and their related circuitry.

Figure 50:
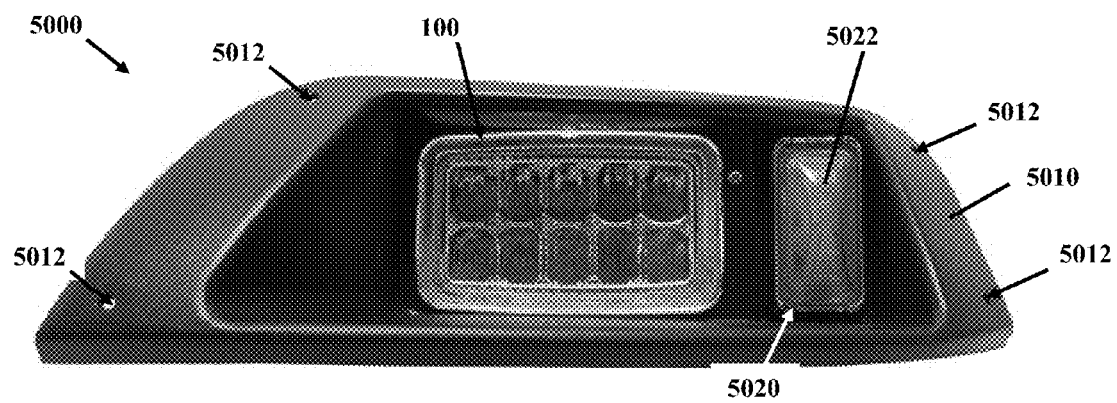
FIG. 50 is a front view of a driver side front light housing assembly with the front light of FIG. 1 and heat sink of FIGS. 5 and 42 to 49, in accordance with another embodiment of the present invention.

FIG. 50 is a front view of a driver side front light housing assembly with the front light of FIG. 1 and heat sink of FIGS. 5 and 42 to 49, in accordance with another embodiment of the present invention. In FIG. 50, a driver side front light housing assembly 5000 is shown with the front light 100 visible and installed on a passenger side front light housing front surface 5010. To the right of the front light 100 is a turn signal portion 5020 covered by a turn signal cover 5022. Four fastener openings 5012 are shown formed, two each, on left and right sides of the front surface 5010.

Figure 51:
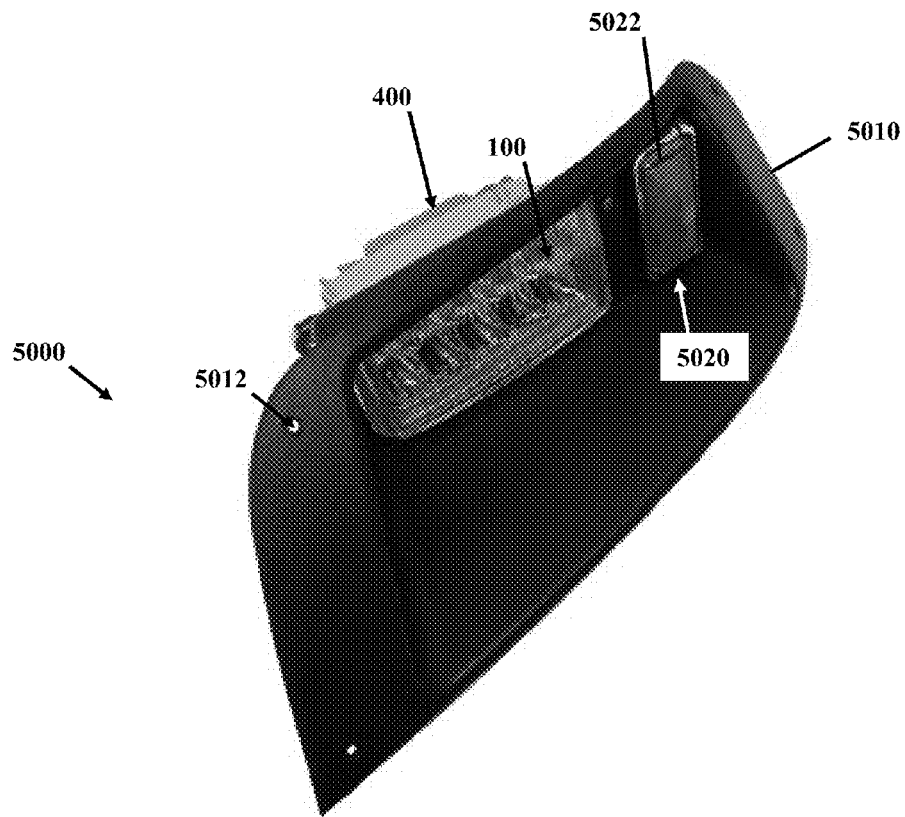
FIG. 51 is an isometric, front-left top view of the driver side front light housing assembly of FIG. 50 with the front light of FIG. 1 and heat sink of FIGS. 5 and 42 to 49, in accordance with another embodiment of the present invention.

FIG. 51 is an isometric, front-left top view of the driver side front light housing assembly of FIG. 50 with the front light of FIG. 1 and heat sink of FIGS. 5 and 42 to 49, in accordance with another embodiment of the present invention.

Figure 52:
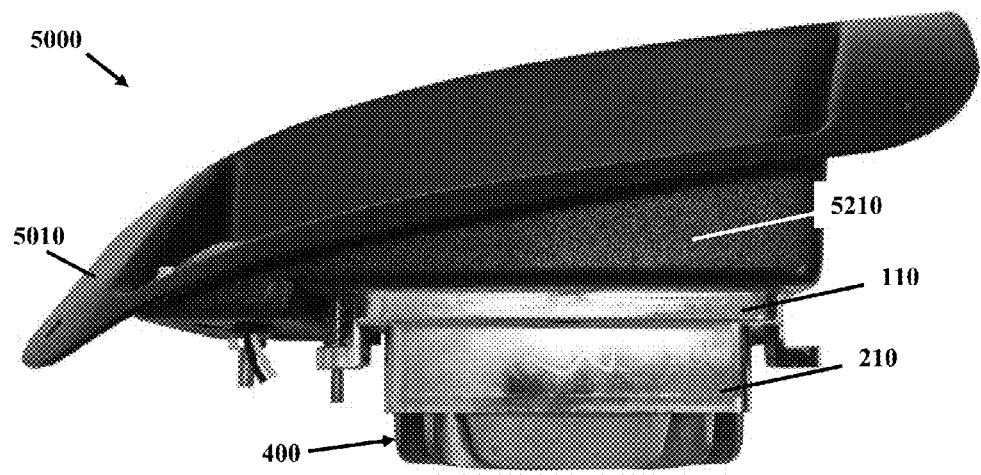
FIG. 52 is a bottom view of the driver side front light housing assembly of FIG. 50 with the front light of FIG. 1 and heat sink of FIGS. 5 and 42 to 49, in accordance with an embodiment of the present invention.

FIG. 52 is a bottom view of the driver side front light housing assembly of FIG. 50 with the front light of FIG. 1 and heat sink of FIGS. 5 and 42 to 49, in accordance with an embodiment of the present invention. In FIG. 52, the heat sink 400 is shown connected to the back portion 210 of the front light assembly 100 and a passenger side front light housing top surface 5210 is shown connected to and extending away from a back side of the passenger side front light housing front surface 5010. In general, the housing assembly 5000 can be formed or molded as a single piece, but it can also be made from independent pieces and glued, fastened or welded together.

Figure 53:
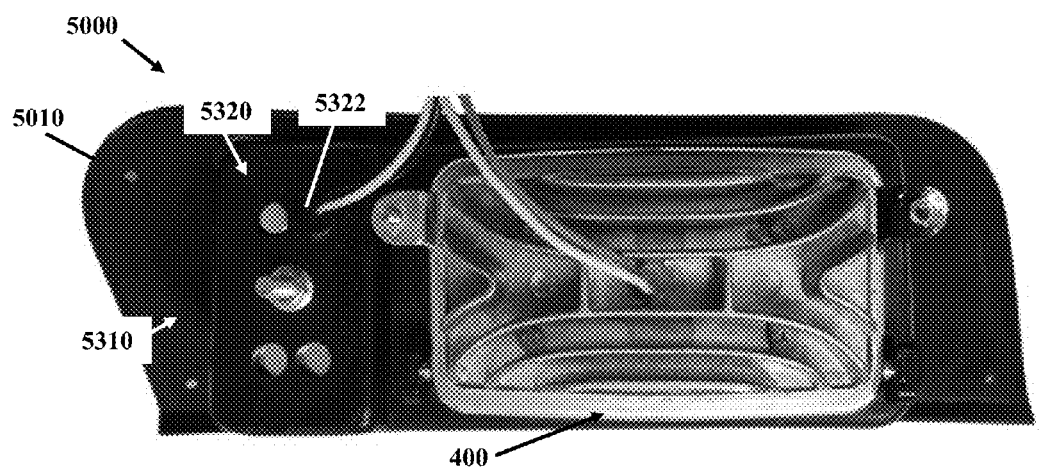
FIG. 53 is a back view of the driver side front light housing assembly of FIG. 50 with the front light of FIG. 1 and heat sink of FIGS. 5 and 42 to 49, in accordance with an embodiment of the present invention.

FIG. 53 is a back view of the driver side front light housing assembly of FIG. 50 with the front light of FIG. 1 and heat sink of FIGS. 5 and 42 to 49, in accordance with an embodiment of the present invention. In FIG. 53, a back side 5310 of the front wall 5010 is shown with the light assembly 100 and a back surface 5320 of the turn signal portion 5020 is shown with a LED light 5322 installed into the turn signal portion 5020.

Figure 54:
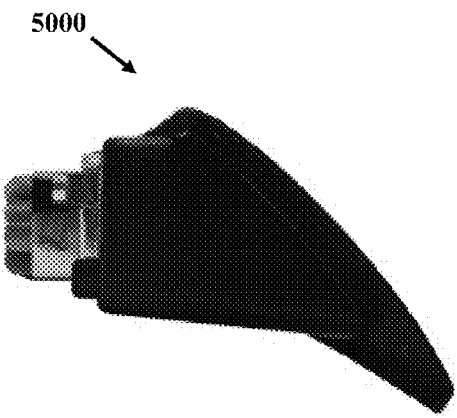
FIG. 54 is a left side view of the driver side front light housing of FIG. 50 with the front light of FIG. 1 and heat sink of FIGS. 5 and 42 to 49, in accordance with an embodiment of the present invention.

FIG. 54 is a left side view of the driver side front light housing of FIG. 50 with the front light of FIG. 1 and heat sink of FIGS. 5 and 42 to 49, in accordance with an embodiment of the present invention.

Figure 55:
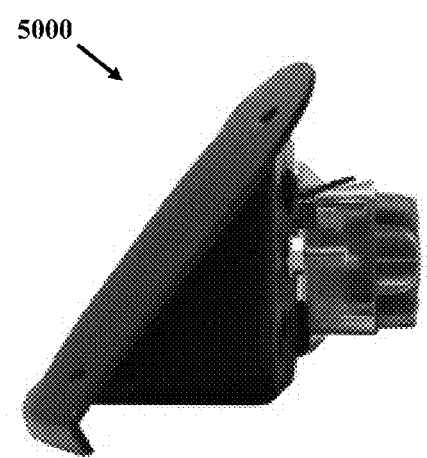
FIG. 55 is right side view of the driver side front light housing of FIG. 50 with the front light of FIG. 1 and heat sink of FIGS. 5 and 42 to 49, in accordance with an embodiment of the present invention.

FIG. 55 is right side view of the driver side front light housing of FIG. 50 with the front light of FIG. 1 and heat sink of FIGS. 5 and 42 to 49, in accordance with an embodiment of the present invention.

Figure 56:
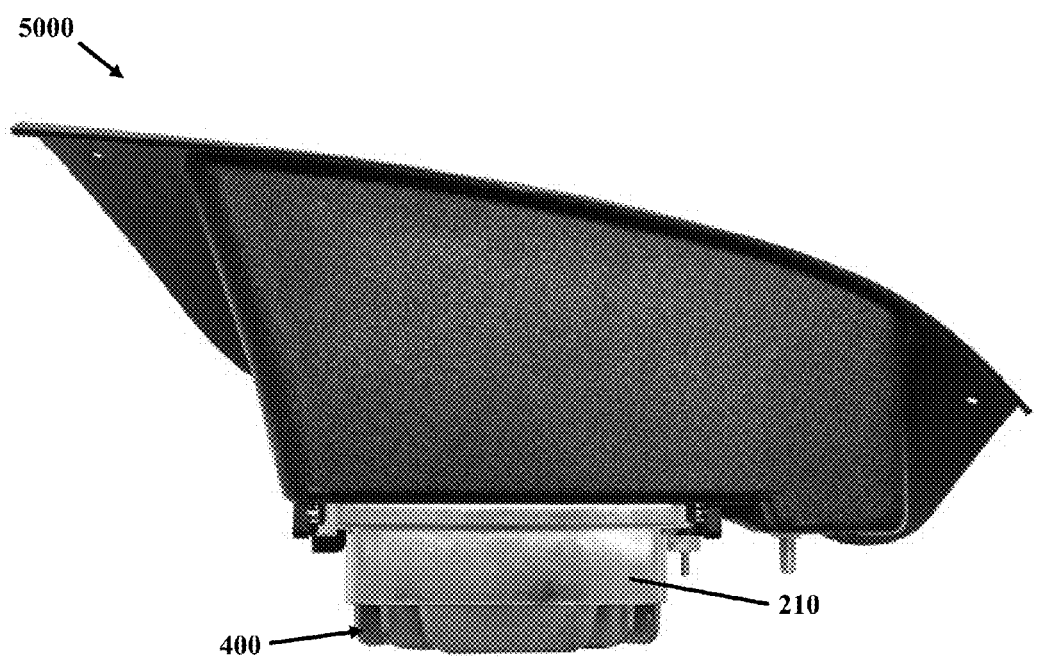
FIG. 56 is bottom view of the driver side front light housing of FIG. 50 with the front light of FIG. 1 and heat sink of FIGS. 5 and 42 to 49, in accordance with an embodiment of the present invention.

FIG. 56 is bottom view of the driver side front light housing of FIG. 50 with the front light of FIG. 1 and heat sink of FIGS. 5 and 42 to 49, in accordance with an embodiment of the present invention.

Figure 57:
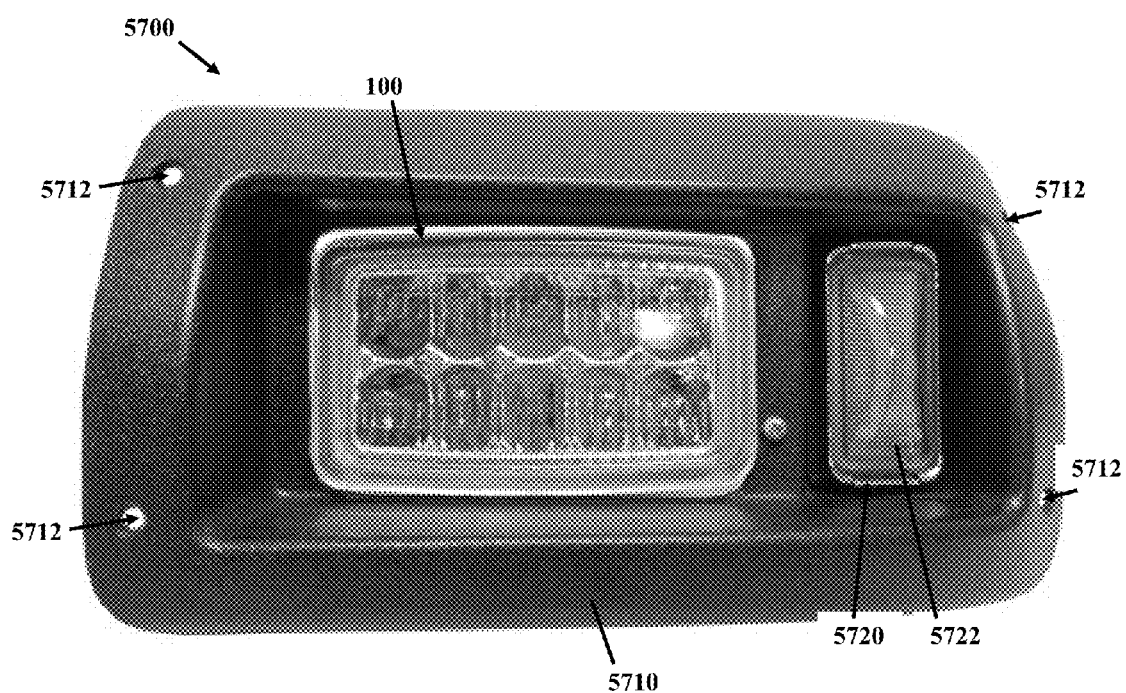
FIG. 57 is a front view of a driver side front light housing assembly with the front light of FIG. 1 and heat sink of FIGS. 5 and 42 to 49, in accordance with another embodiment of the present invention.

FIG. 57 is a front view of a driver side front light housing assembly with the front light of FIG. 1 and heat sink of FIGS. 5 and 42 to 49, in accordance with another embodiment of the present invention. In FIG. 57, a driver side front light housing assembly 5700 is shown with the front light 100 visible and installed on a passenger side front light housing front surface 5710. To the right of the front light 100 is a turn signal portion 5720 covered by a turn signal cover 5722. Four fastener openings 5712 are shown formed, two each, on left and right sides of the front surface 5710.

Figure 58:
FIG. 58 is an isometric, front-left top view of the driver side front light housing assembly of FIG. 57 with the front light of FIG. 1 and heat sink of FIGS. 5 and 42 to 49, in accordance with another embodiment of the present invention.

FIG. 58 is an isometric, front-left top view of the driver side front light housing assembly of FIG. 57 with the front light of FIG. 1 and heat sink of FIGS. 5 and 42 to 49, in accordance with another embodiment of the present invention.

Figure 59:
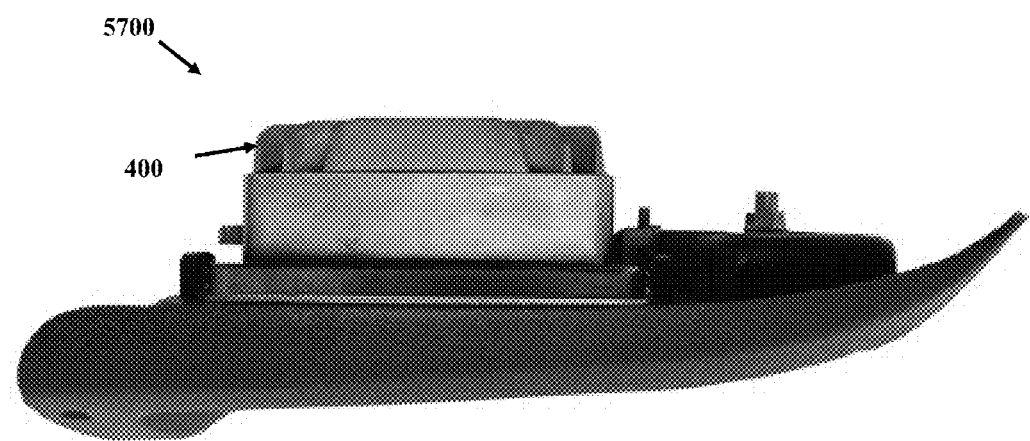
FIG. 59 is a bottom view of the driver side front light housing assembly of FIG. 57 with the front light of FIG. 1 and heat sink of FIGS. 5 and 42 to 49, in accordance with an embodiment of the present invention.

FIG. 59 is a bottom view of the driver side front light housing assembly of FIG. 57 with the front light of FIG. 1 and heat sink of FIGS. 5 and 42 to 49, in accordance with an embodiment of the present invention. In FIG. 59, the heat sink 400 is shown connected to the back portion 210 of the front light assembly 100 and a passenger side front light housing top surface 5910 is shown connected to and extending away from a back side of the passenger side front light housing front surface 5710. In general, the housing assembly 5700 can be formed or molded as a single piece, but it can also be made from independent pieces and glued, fastened or welded together.

Figure 60:
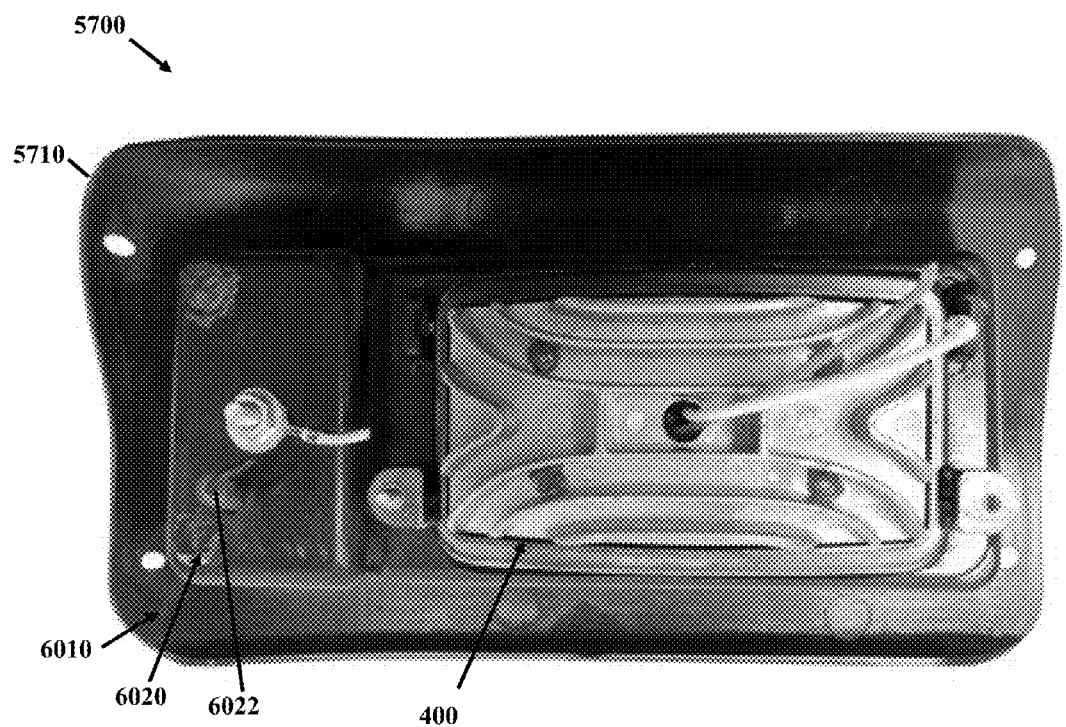
FIG. 60 is a back view of the driver side front light housing assembly of FIG. 57 with the front light of FIG. 1 and heat sink of FIGS. 5 and 42 to 49, in accordance with an embodiment of the present invention.

FIG. 60 is a back view of the driver side front light housing assembly of FIG. 57 with the front light of FIG. 1 and heat sink of FIGS. 5 and 42 to 49, in accordance with an embodiment of the present invention. In FIG. 60, a back side 6010 of the front wall 5710 is shown with the light assembly 100 and a back surface 6020 of the turn signal portion 5720 is shown with a LED light 6022 installed into the turn signal portion 5720.

Figure 61:
FIG. 61 is a left side view of the driver side front light housing of FIG. 57 with the front light of FIG. 1 and heat sink of FIGS. 5 and 42 to 49, in accordance with an embodiment of the present invention.

FIG. 61 is a left side view of the driver side front light housing of FIG. 57 with the front light of FIG. 1 and heat sink of FIGS. 5 and 42 to 49, in accordance with an embodiment of the present invention.

Figure 62:
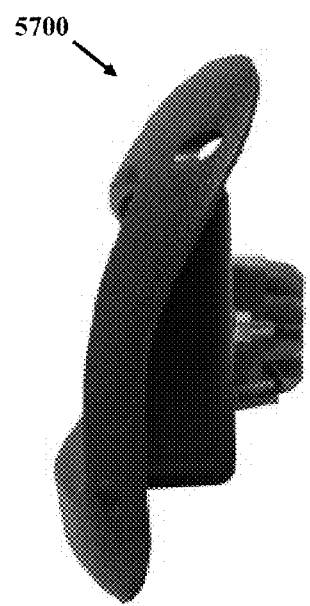
FIG. 62 is right side view of the driver side front light housing of FIG. 57 with the front light of FIG. 1 and heat sink of FIGS. 5 and 42 to 49, in accordance with an embodiment of the present invention.

FIG. 62 is right side view of the driver side front light housing of FIG. 57 with the front light of FIG. 1 and heat sink of FIGS. 5 and 42 to 49, in accordance with an embodiment of the present invention.

Figure 63:
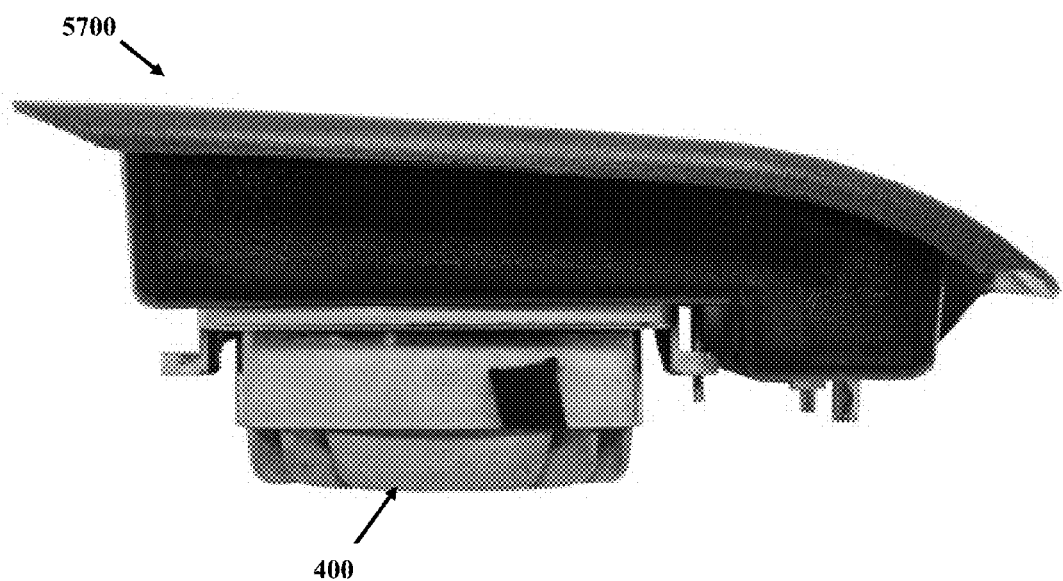
FIG. 63 is bottom view of the driver side front light housing of FIG. 57 with the front light of FIG. 1 and heat sink of FIGS. 5 and 42 to 49, in accordance with an embodiment of the present invention.

FIG. 63 is bottom view of the driver side front light housing of FIG. 57 with the front light of FIG. 1 and heat sink of FIGS. 5 and 42 to 49, in accordance with an embodiment of the present invention.

Figure 64:
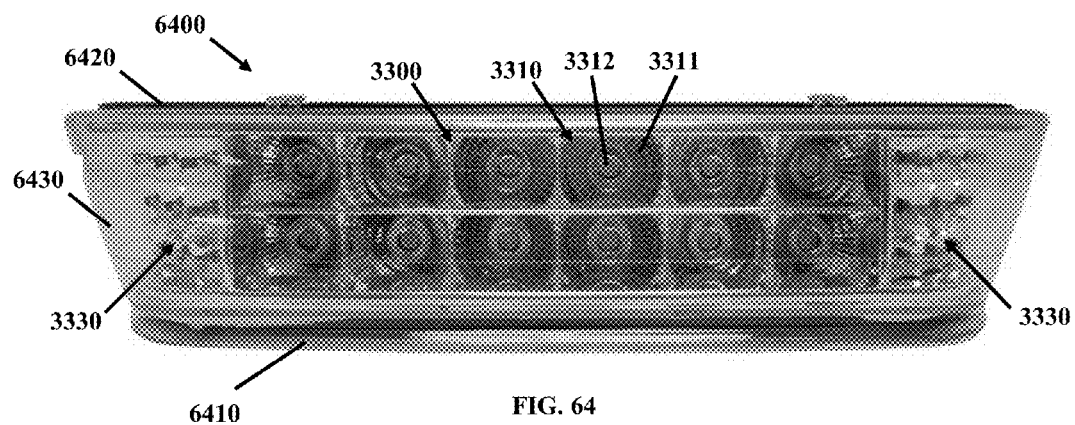
FIG. 64 is a front view of a center front light housing assembly with the front light of FIG. 33 and a heat sink, in accordance with another embodiment of the present invention.

FIG. 64 is a front view of a center front light housing assembly 6400 with the front light of FIG. 33 and a heat sink, in accordance with another embodiment of the present invention. In FIG. 64, the reflective element 3310 is installed in a housing 6420 and covered by a clear cover 6410. The reflective element 3310 includes the two rows of six substantially circular concave reflective surfaces 3311 with the LED 3312 installed at a base of each concave reflective surface 3311. In FIG. 64, the reflective surfaces 3311 have multiple, differently oriented faceted rows to maximize the intensity and/or evenly dissipate/spread the reflected light from the LEDs 3312. At each end of the reflective element 3310 is a turn signal portion 3330.

Figure 65:
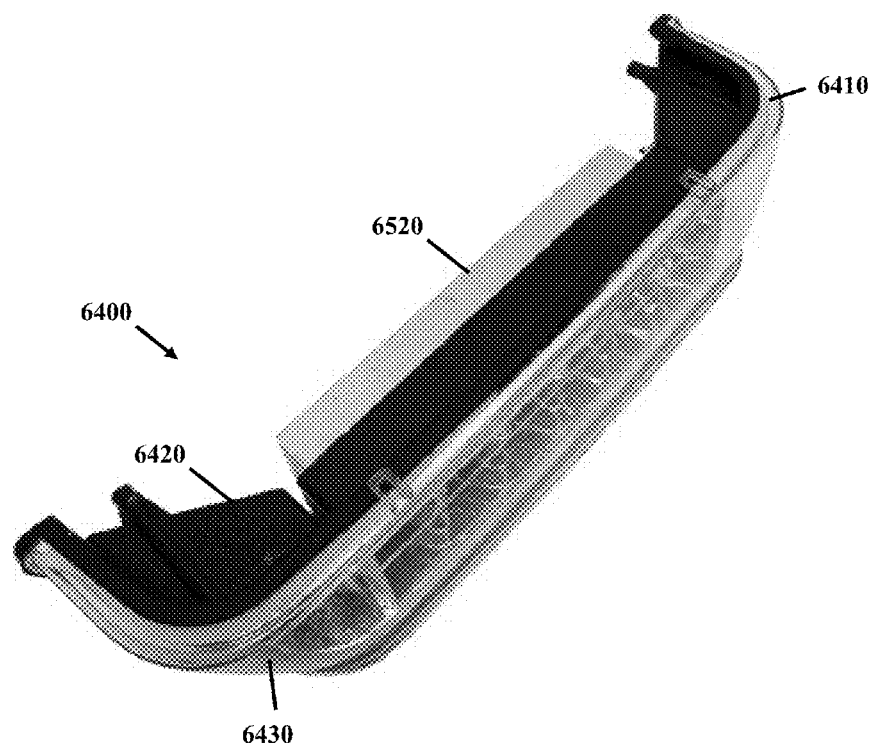
FIG. 65 is an isometric, front-left top view of the center front light housing assembly of FIG. 64 with the front light of FIG. 33 and a heat sink, in accordance with another embodiment of the present invention.

FIG. 65 is an isometric, front-left top view of the center front light housing assembly of FIG. 64 with the front light of FIG. 33 and a heat sink, in accordance with another embodiment of the present invention. In FIG. 65 a heat sink 6520 is seen extending from a back of the center front light housing assembly 6400.

FIG. 66 is a bottom view of the center front light housing assembly of FIG. 64 with the front light of FIG. 33 and a heat sink, in accordance with an embodiment of the present invention.

FIG. 67 is a back view of the center front light housing assembly of FIG. 64 with the front light of FIG. 33 and a heat sink, in accordance with an embodiment of the present invention.

FIG. 68 is a left side view of the center front light housing of FIG. 64 with the front light of FIG. 33 and a heat sink, in accordance with an embodiment of the present invention.

FIG. 69 is right side view of the center front light housing of FIG. 64 with the front light of FIG. 33 and a heat sink, in accordance with an embodiment of the present invention.

Figure 70:
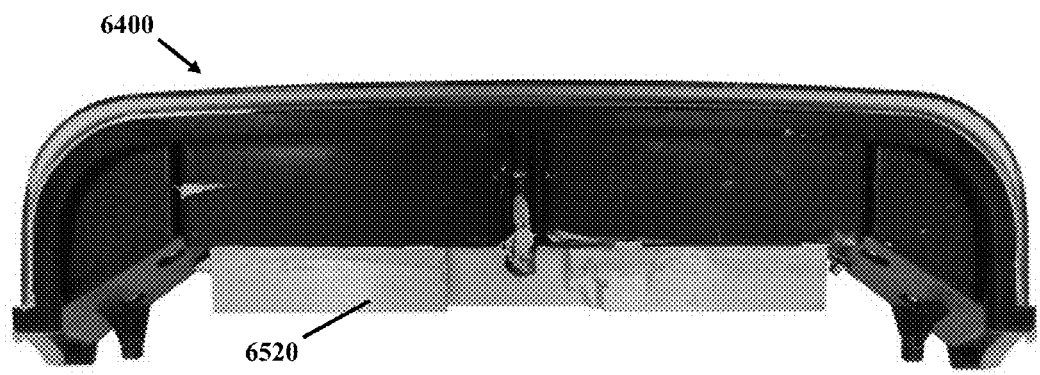
FIG. 70 is bottom view of the center front light housing of FIG. 64 with the front light of FIG. 33 and a heat sink, in accordance with an embodiment of the present invention.

FIG. 70 is bottom view of the center front light housing of FIG. 64 with the front light of FIG. 33 and a heat sink, in accordance with an embodiment of the present invention.

Figure 71:
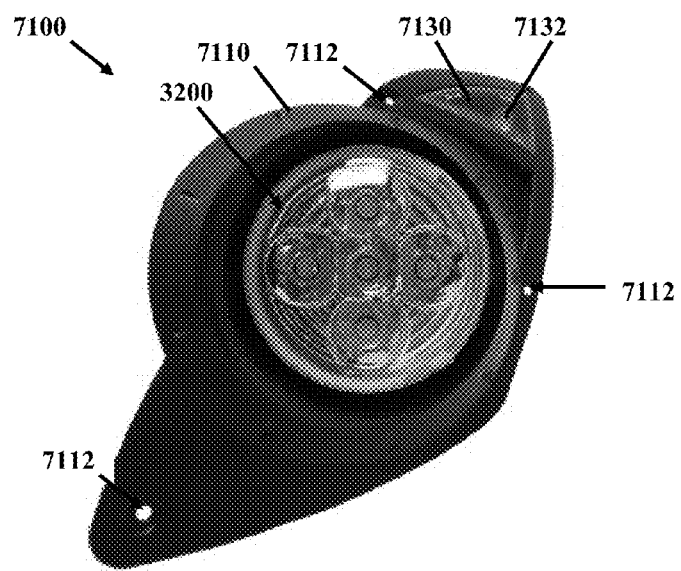
FIG. 71 is a front view of a driver side front light housing assembly with the front light of FIG. 32 and a heat sink of FIGS. 78 to 84, in accordance with another embodiment of the present invention.

FIG. 71 is a front view of a driver side front light housing assembly with the front light of FIG. 32 and a heat sink of FIGS. 78 to 84, in accordance with another embodiment of the present invention. In FIG. 71, a driver side front light housing assembly 7100 is shown with the front light 3200 visible and installed on a driver side front light housing front surface 7110. To the right of the front light 3200 is a turn signal portion 7130 covered by a turn signal cover 7132. Four fastener openings 7112 are shown formed, two each, on left and right sides of the front surface 7110.

Figure 72:
FIG. 72 is an isometric, front-left top view of the driver side front light housing assembly of FIG. 71 with the front light of FIG. 32 and a heat sink of FIGS. 78 to 84, in accordance with another embodiment of the present invention.

FIG. 72 is an isometric, front-left top view of the driver side front light housing assembly of FIG. 71 with the front light of FIG. 32 and a heat sink of FIGS. 78 to 84, in accordance with another embodiment of the present invention.

Figure 73:
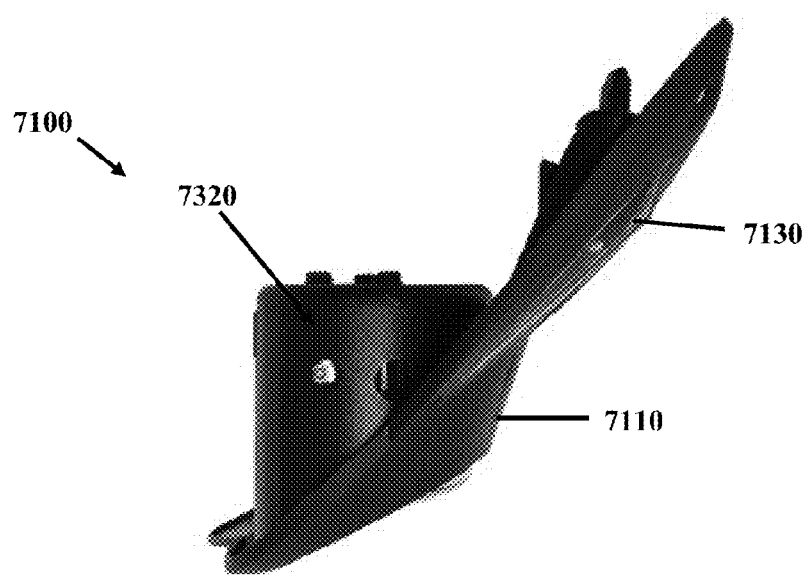
FIG. 73 is a bottom view of the driver side front light housing assembly of FIG. 71 with the front light of FIG. 32 and a heat sink of FIGS. 78 to 84, in accordance with an embodiment of the present invention.

FIG. 73 is a bottom view of the driver side front light housing assembly of FIG. 71 with the front light of FIG. 32 and a heat sink of FIGS. 78 to 84, in accordance with an embodiment of the present invention. In FIG. 73, a heat sink cover 7320 is shown connected to and extending away from a back side of the passenger side front light housing front surface 7110. In general, the housing assembly 7300 can be formed or molded as a single piece, but it can also be made from independent pieces and glued, fastened or welded together.

Figure 74:
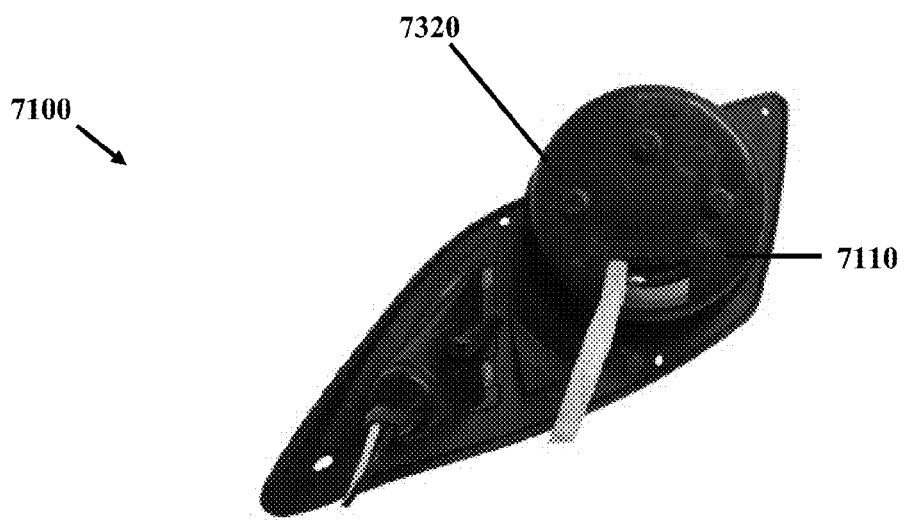
FIG. 74 is a back view of the driver side front light housing assembly of FIG. 71 with the front light of FIG. 32 and a heat sink of FIGS. 78 to 84, in accordance with an embodiment of the present invention.

FIG. 74 is a back view of the driver side front light housing assembly of FIG. 71 with the front light of FIG. 32 and a heat sink of FIGS. 78 to 84, in accordance with an embodiment of the present invention.

Figure 75:
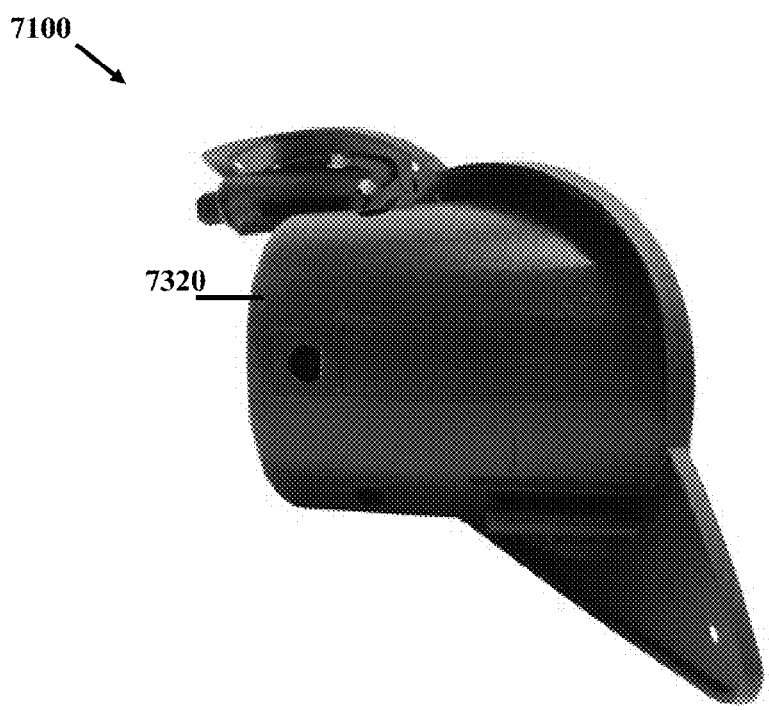
FIG. 75 is a left side view of the driver side front light housing of FIG. 71 with the front light of FIG. 32 and a heat sink of FIGS. 78 to 84, in accordance with an embodiment of the present invention.

FIG. 75 is a left side view of the driver side front light housing of FIG. 71 with the front light of FIG. 32 and a heat sink of FIGS. 78 to 84, in accordance with an embodiment of the present invention.

Figure 76:
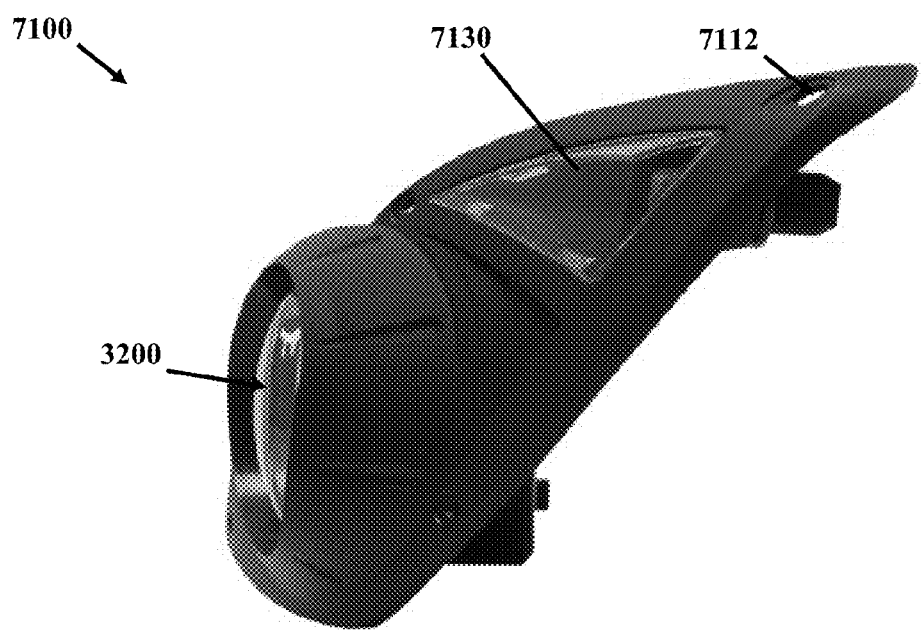
FIG. 76 is right side view of the driver side front light housing of FIG. 71 with the front light of FIG. 32 and a heat sink of FIGS. 78 to 84, in accordance with an embodiment of the present invention.

FIG. 76 is right side view of the driver side front light housing of FIG. 71 with the front light of FIG. 32 and a heat sink of FIGS. 78 to 84, in accordance with an embodiment of the present invention.

Figure 77:
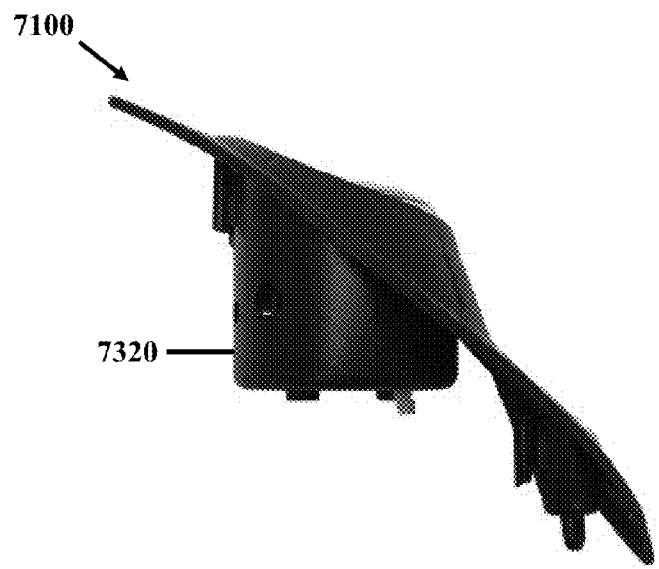
FIG. 77 is bottom view of the driver side front light housing of FIG. 71 with the front light of FIG. 32 and a heat sink of FIGS. 78 to 84, in accordance with an embodiment of the present invention.

FIG. 77 is bottom view of the driver side front light housing of FIG. 71 with the front light of FIG. 32 and a heat sink of FIGS. 78 to 84, in accordance with an embodiment of the present invention.

Figure 78:
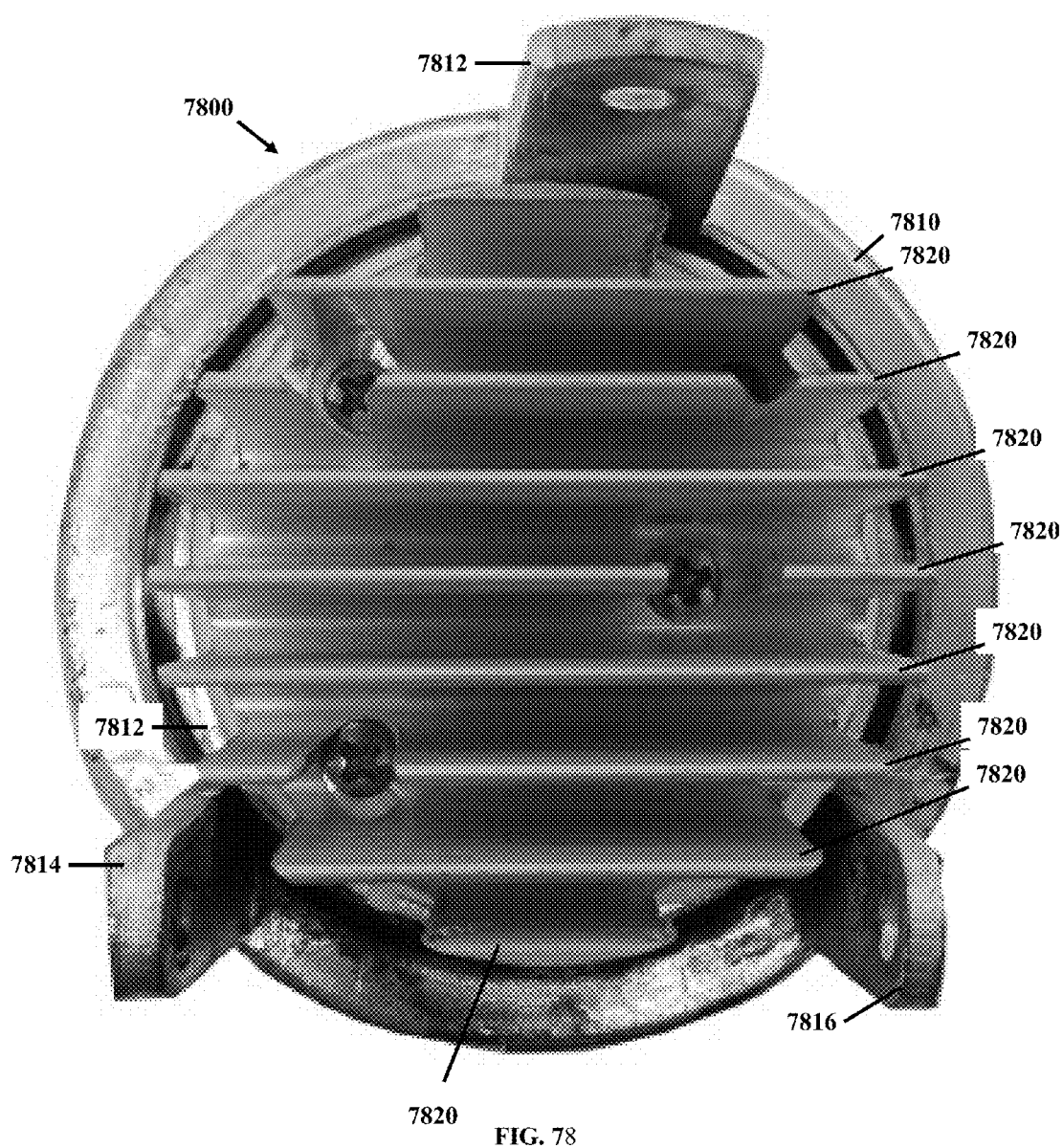
FIG. 78 is a front view of a circular heat sink connected to the front light of FIG. 32, in accordance with another embodiment of the present invention.

FIG. 78 is a front view of a circular heat sink connected to the front light 3200 of FIGS. 32 and 73, in accordance with another embodiment of the present invention. In FIG. 78, a circular heat sink 7800 includes an annular ring 7810 around a flat circular body 7812 from which nine fins 7820 extend perpendicularly away from the flat circular body 7812. Three flat, fastening posts with rounded ends 7812, 7814, 7816 are connected to and extend perpendicularly away from the annular ring 7810. Fastener openings are formed in the rounded ends. Three fasteners, for example, screws 7830 connect the circular heat sink 7800 to the front light 3200.

Figure 79:
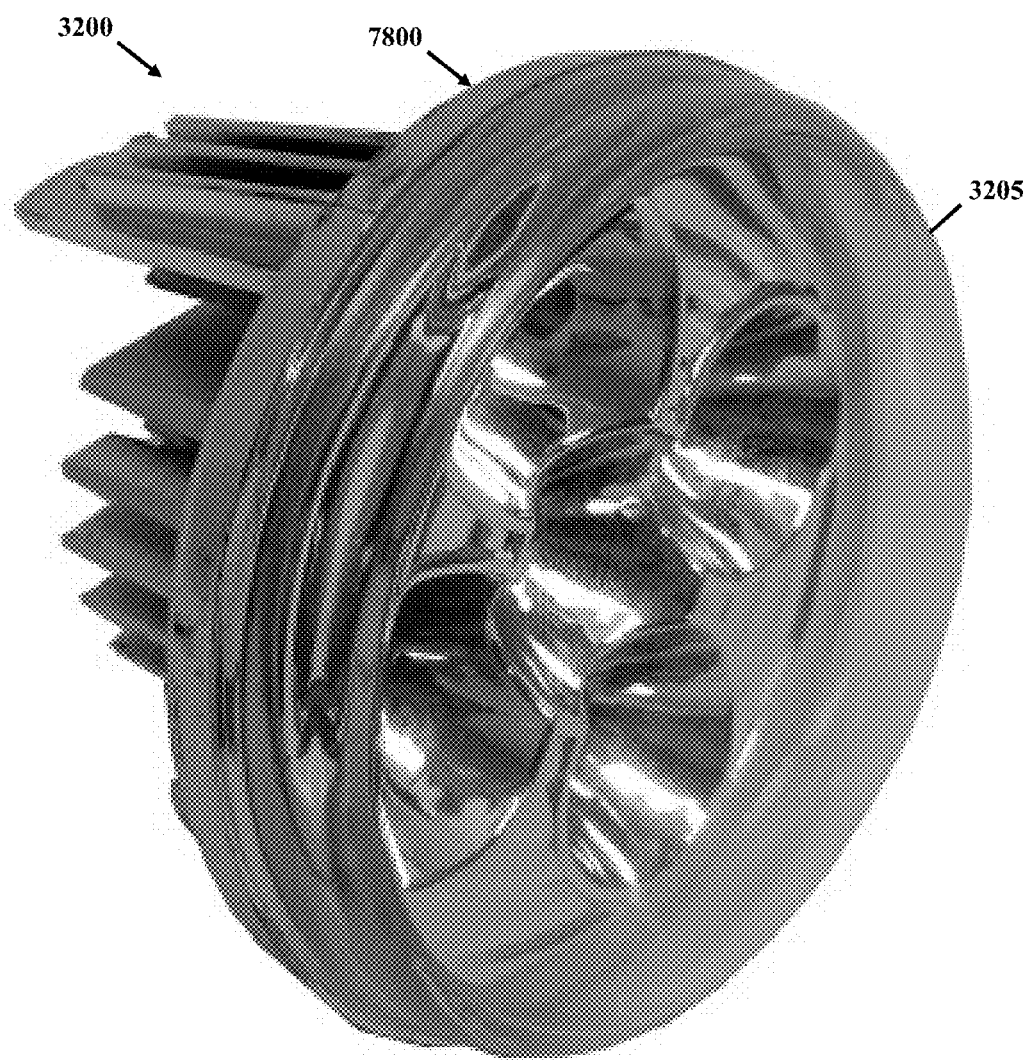
FIG. 79 is an isometric front view of the heat sink and light of FIG. 78, in accordance with another embodiment of the present invention.

FIG. 79 is an isometric front view of the heat sink and light of FIGS. 32 and 78, in accordance with another embodiment of the present invention.

Figure 80:
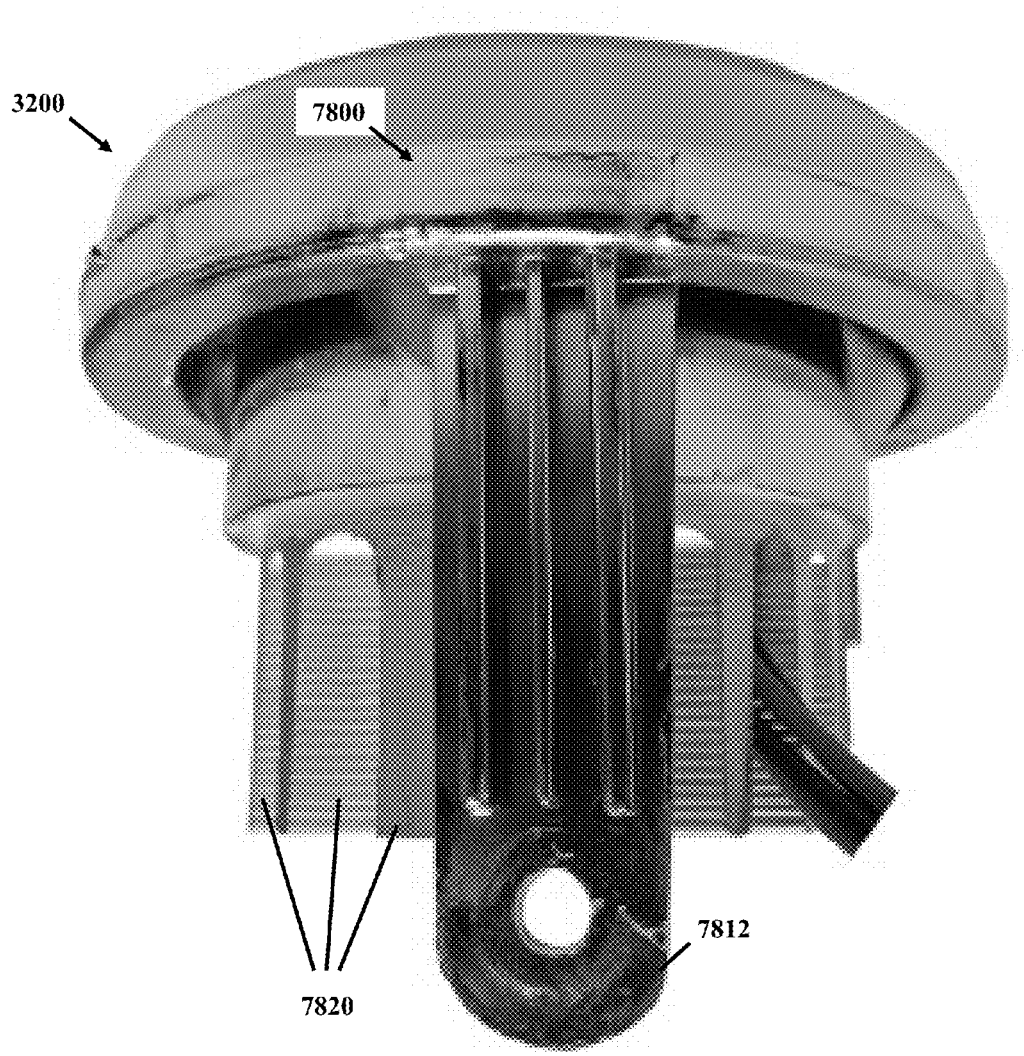
FIG. 80 is a top view of the heat sink and light of FIG. 78, in accordance with another embodiment of the present invention.

FIG. 80 is a top view of the heat sink and light of FIGS. 32 and 78, in accordance with another embodiment of the present invention.

Figure 81:
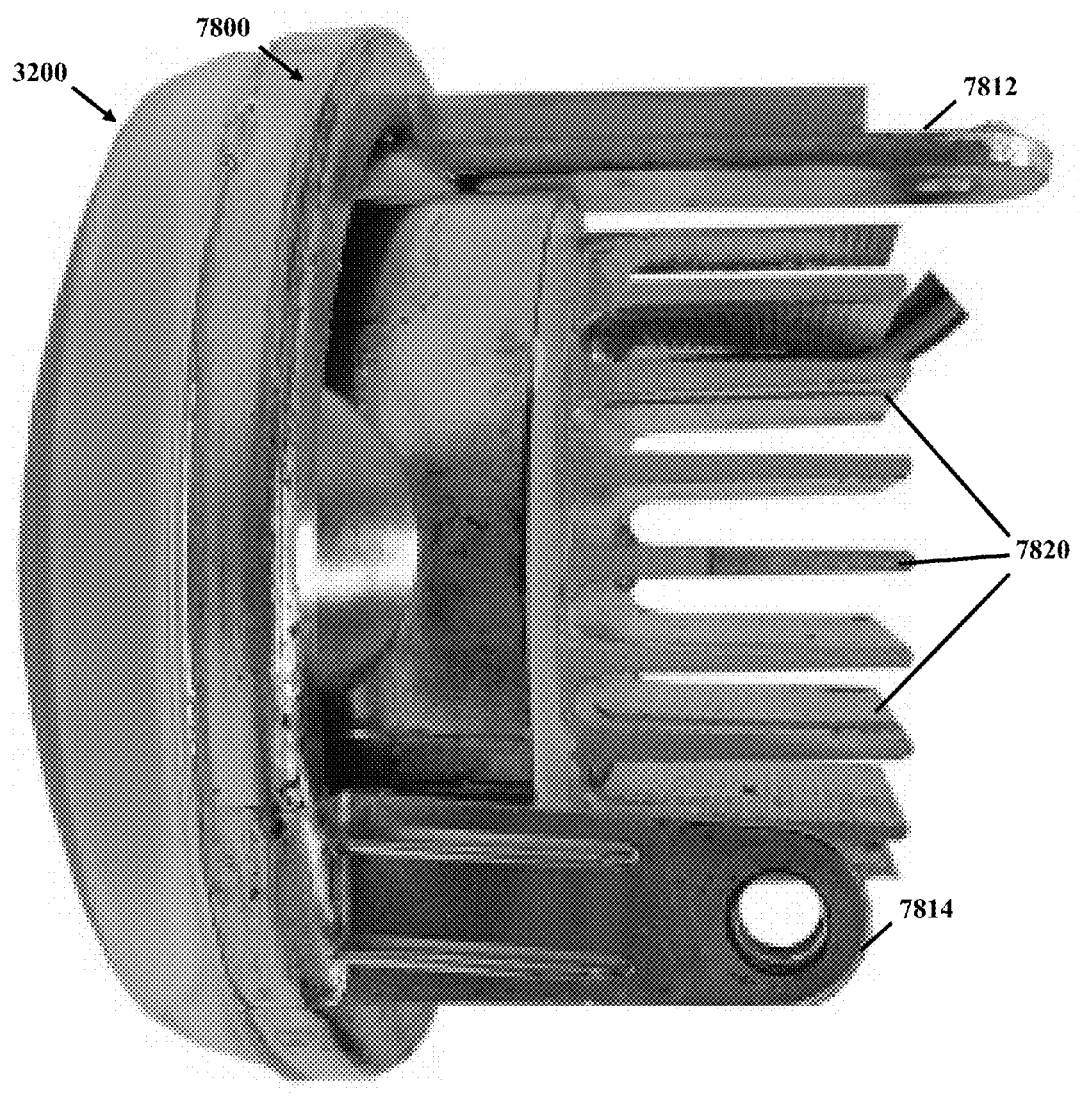
FIG. 81 is a left side view of the heat sink and light of FIG. 78, in accordance with another embodiment of the present invention.

FIG. 81 is a left side view of the heat sink and light of FIG. 78, in accordance with another embodiment of the present invention.

Figure 82:
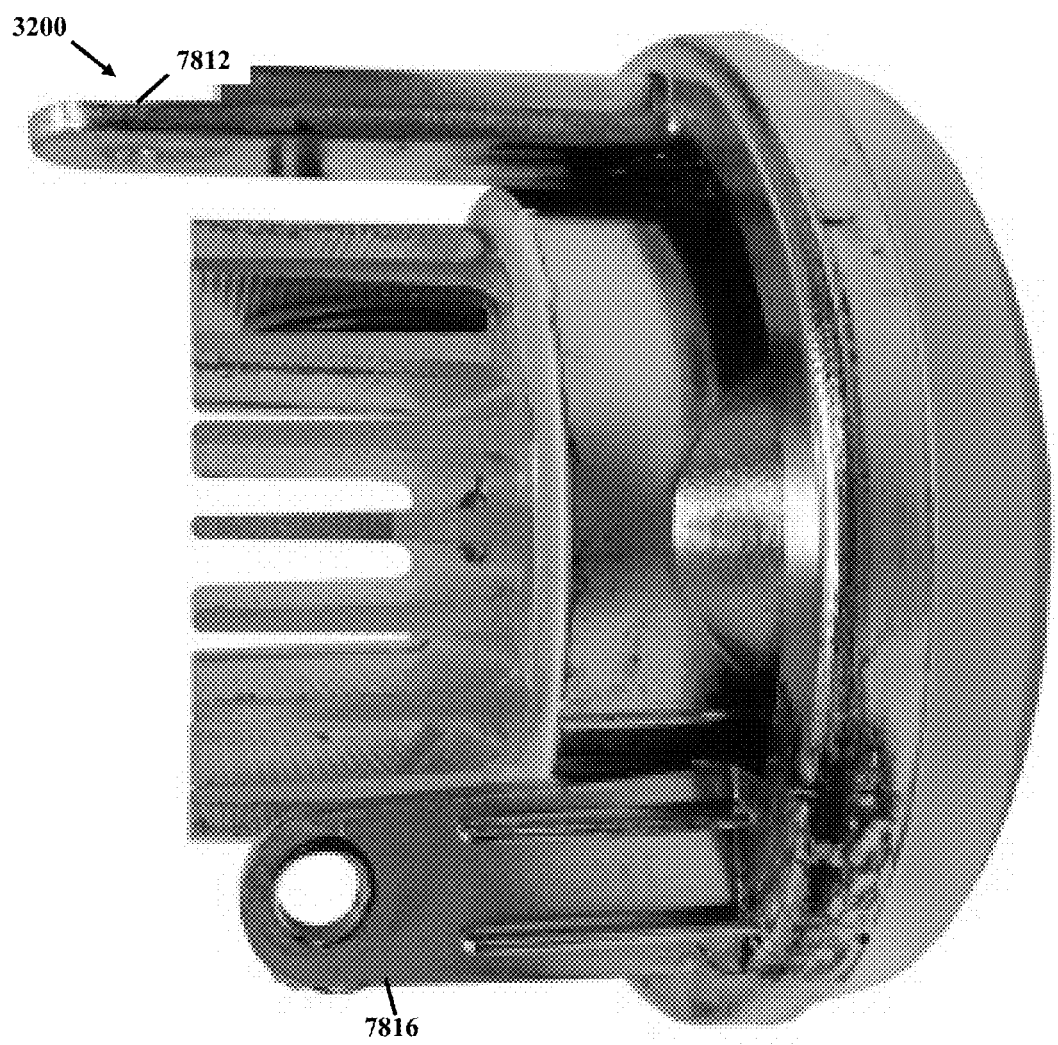
FIG. 82 is right side view of the heat sink and light of FIG. 78, in accordance with another embodiment of the present invention.

FIG. 82 is right side view of the heat sink and light of FIG. 78, in accordance with another embodiment of the present invention.

Figure 83:
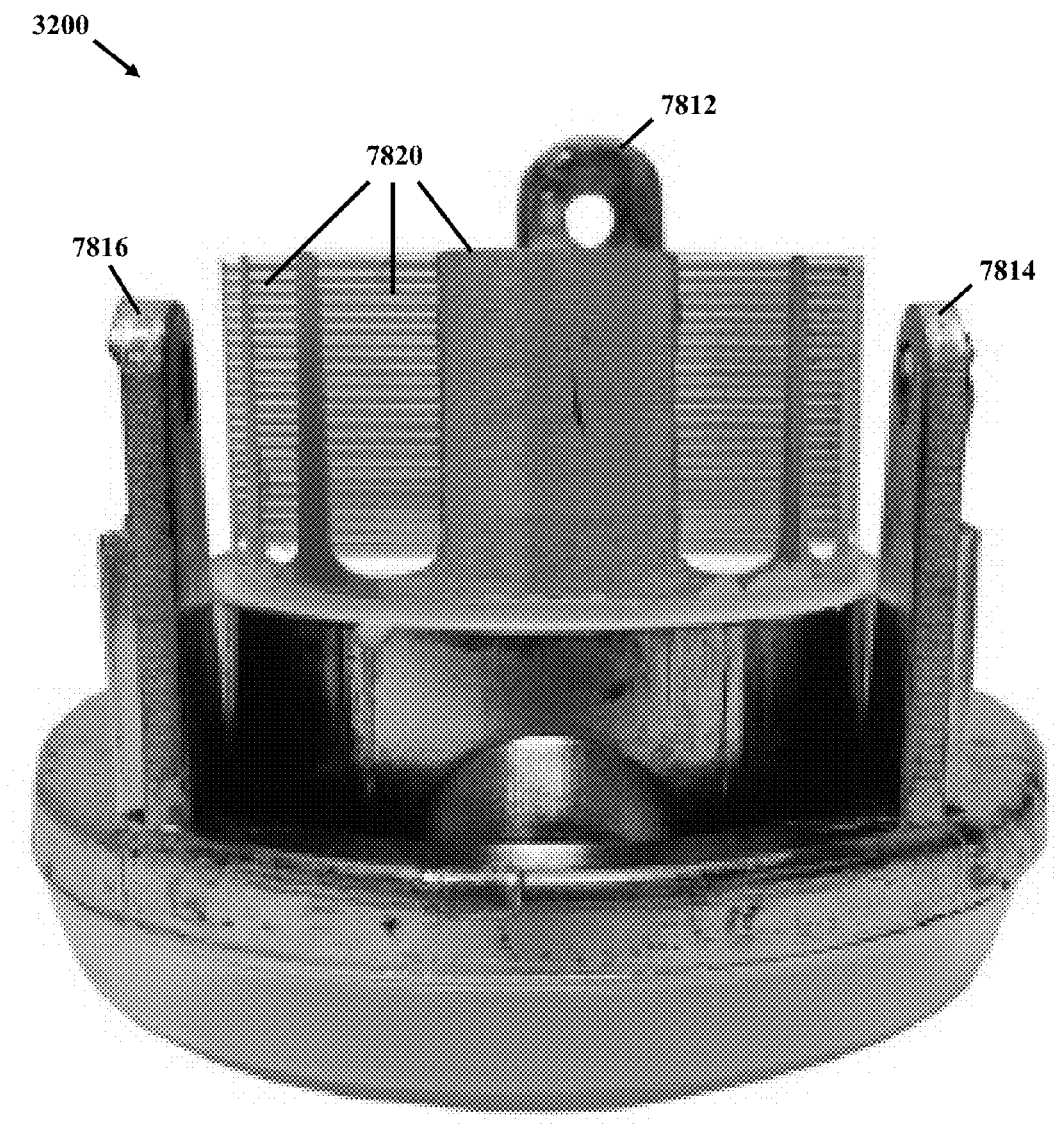
FIG. 83 is a bottom view of the heat sink and light of FIG. 78, in accordance with another embodiment of the present invention.

FIG. 83 is a bottom view of the heat sink and light of FIG. 78, in accordance with another embodiment of the present invention.

Figure 84:
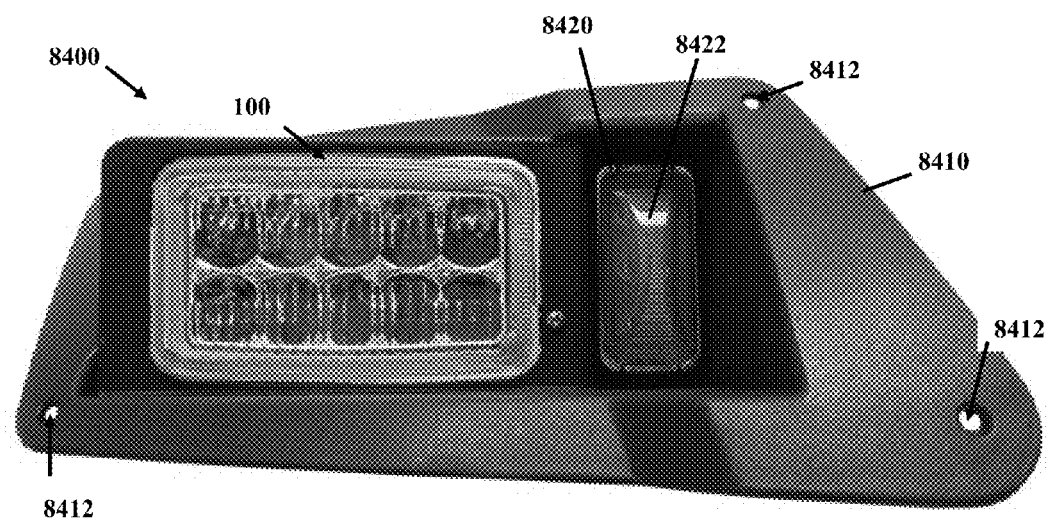
FIG. 84 is a front view of a passenger side front light housing assembly with the front light of FIG. 1 and heat sink of FIGS. 5 and 42 to 49, in accordance with another embodiment of the present invention.

FIG. 84 is a front view of a passenger side front light housing assembly with the front light of FIG. 1 and heat sink of FIGS. 5 and 42 to 49, in accordance with another embodiment of the present invention. In FIG. 84, a passenger side front light housing assembly 8400 is shown with the front light 100 visible and installed on a passenger side front light housing front surface 8410. To the right of the front light 100 is a turn signal portion 8420 covered by a turn signal cover 8422. Four fastener openings 8412 are shown formed, two each, on left and right sides of the front surface 8410.

Figure 85:
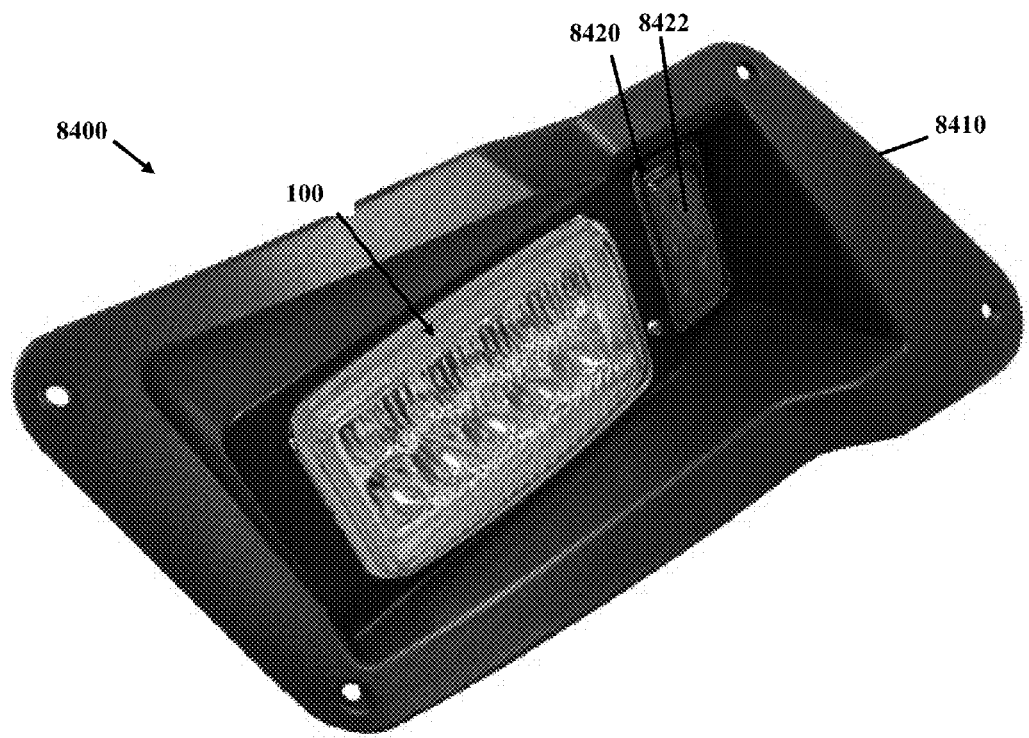
FIG. 85 is an isometric, front-left top view of the passenger side front light housing assembly of FIG. 84 with the front light of FIG. 1 and heat sink of FIGS. 5 and 42 to 49, in accordance with another embodiment of the present invention.

FIG. 85 is an isometric, front-left top view of the passenger side front light housing assembly of FIG. 84 with the front light of FIG. 1 and heat sink of FIGS. 5 and 42 to 49, in accordance with another embodiment of the present invention.

Figure 86:
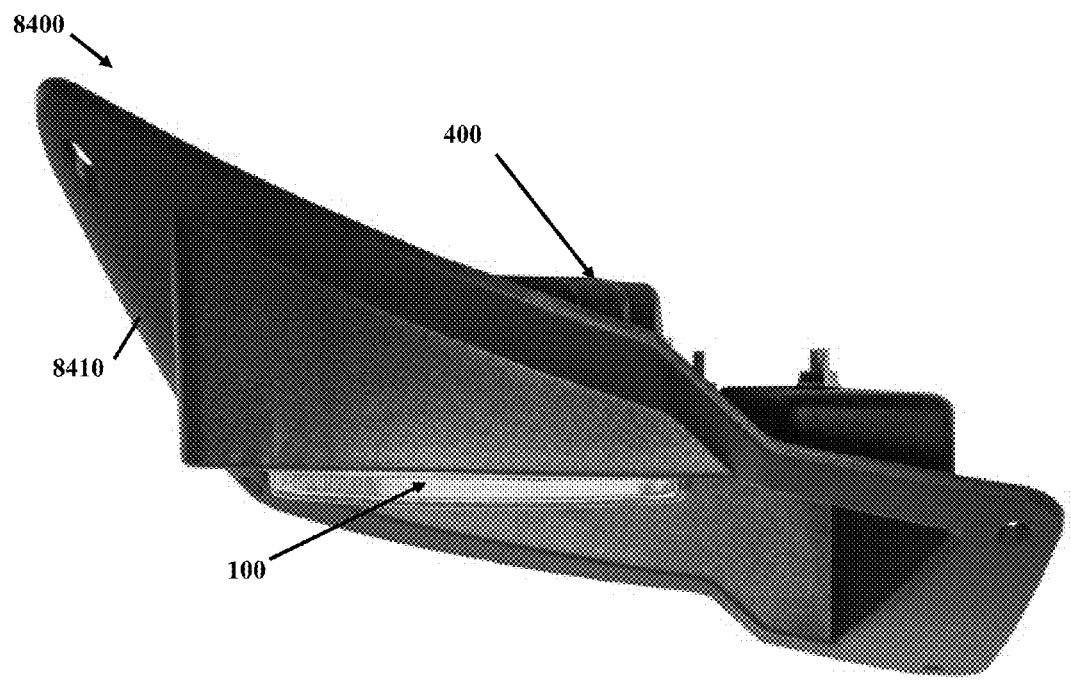
FIG. 86 is a bottom view of the passenger side front light housing assembly of FIG. 84 with the front light of FIG. 1 and heat sink of FIGS. 5 and 42 to 49, in accordance with an embodiment of the present invention.

FIG. 86 is a bottom view of the passenger side front light housing assembly of FIG. 84 with the front light of FIG. 1 and heat sink of FIGS. 5 and 42 to 49, in accordance with an embodiment of the present invention. In FIG. 86, the heat sink 400 is shown connected to the back portion 210 of the front light assembly 100 and a passenger side front light housing top surface 8610 is shown connected to and extending away from a back side of the passenger side front light housing front surface 8410. In general, the housing assembly 8400 can be formed or molded as a single piece, but it can also be made from independent pieces and glued, fastened or welded together.

Figure 87:
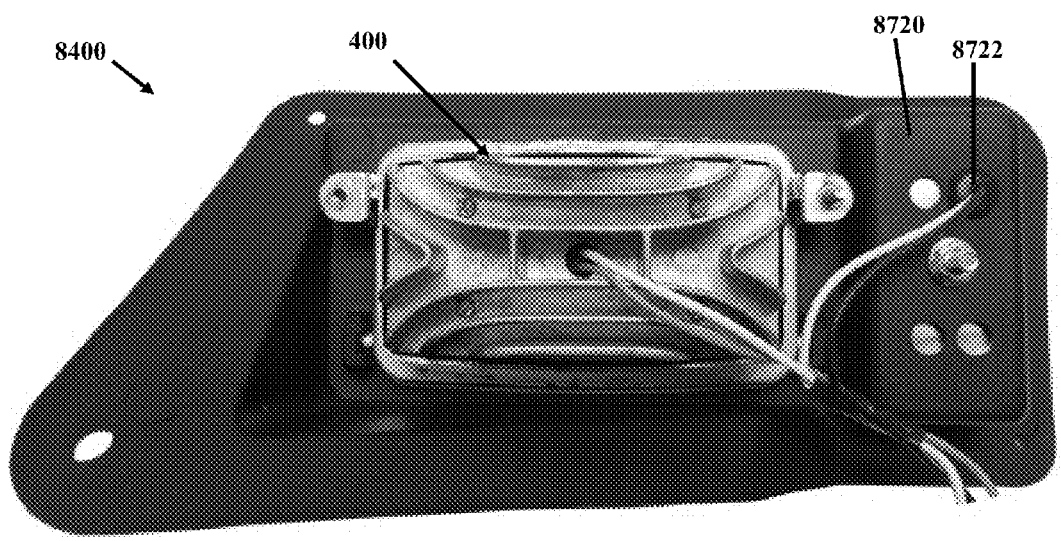
FIG. 87 is a back view of the passenger side front light housing assembly of FIG. 84 with the front light of FIG. 1 and heat sink of FIGS. 5 and 42 to 49, in accordance with an embodiment of the present invention.

FIG. 87 is a back view of the passenger side front light housing assembly of FIG. 84 with the front light of FIG. 1 and heat sink of FIGS. 5 and 42 to 49, in accordance with an embodiment of the present invention. In FIG. 87, a back side 8710 of the front wall 8410 is shown with the light assembly 100 and a back surface 8720 of the turn signal portion 8420 is shown with a LED light 8722 installed into the turn signal portion 8420.

Figure 88:
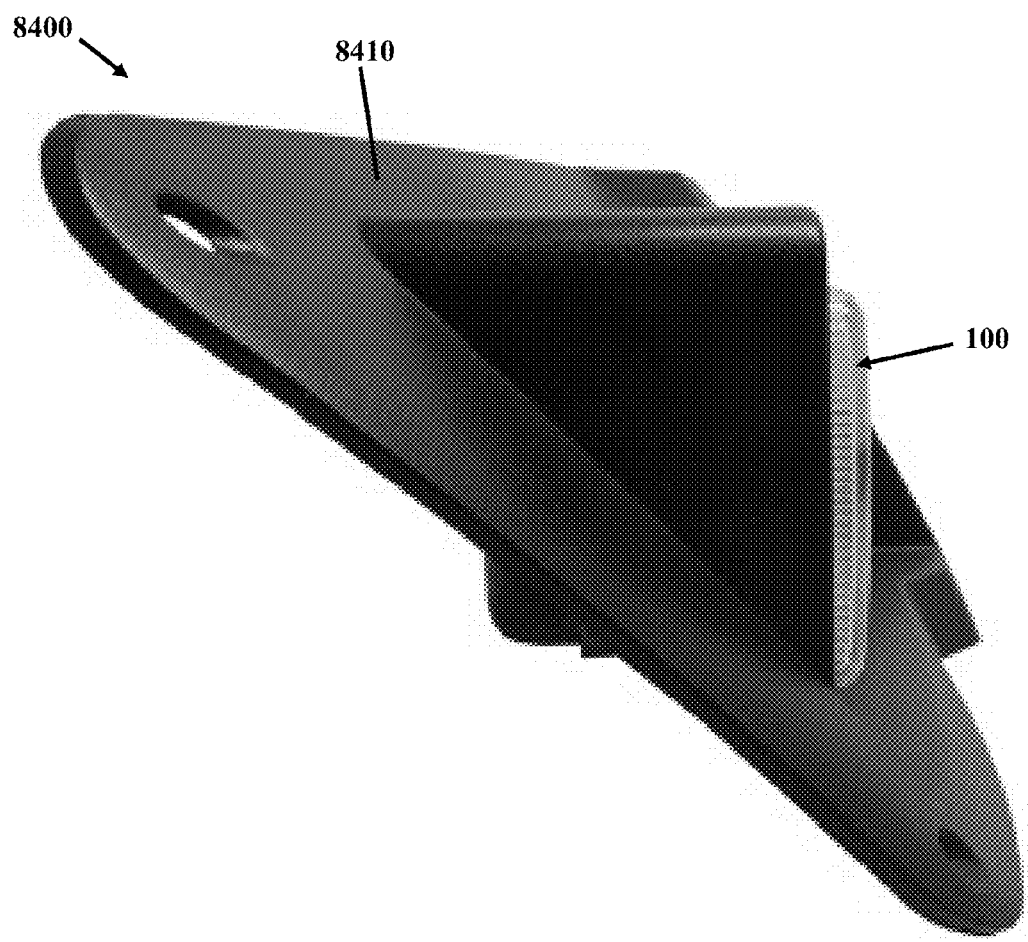
FIG. 88 is a left side view of the passenger side front light housing of FIG. 84 with the front light of FIG. 1 and heat sink of FIGS. 5 and 42 to 49, in accordance with an embodiment of the present invention.

FIG. 88 is a left side view of the passenger side front light housing of FIG. 84 with the front light of FIG. 1 and heat sink of FIGS. 5 and 42 to 49, in accordance with an embodiment of the present invention.

Figure 89:
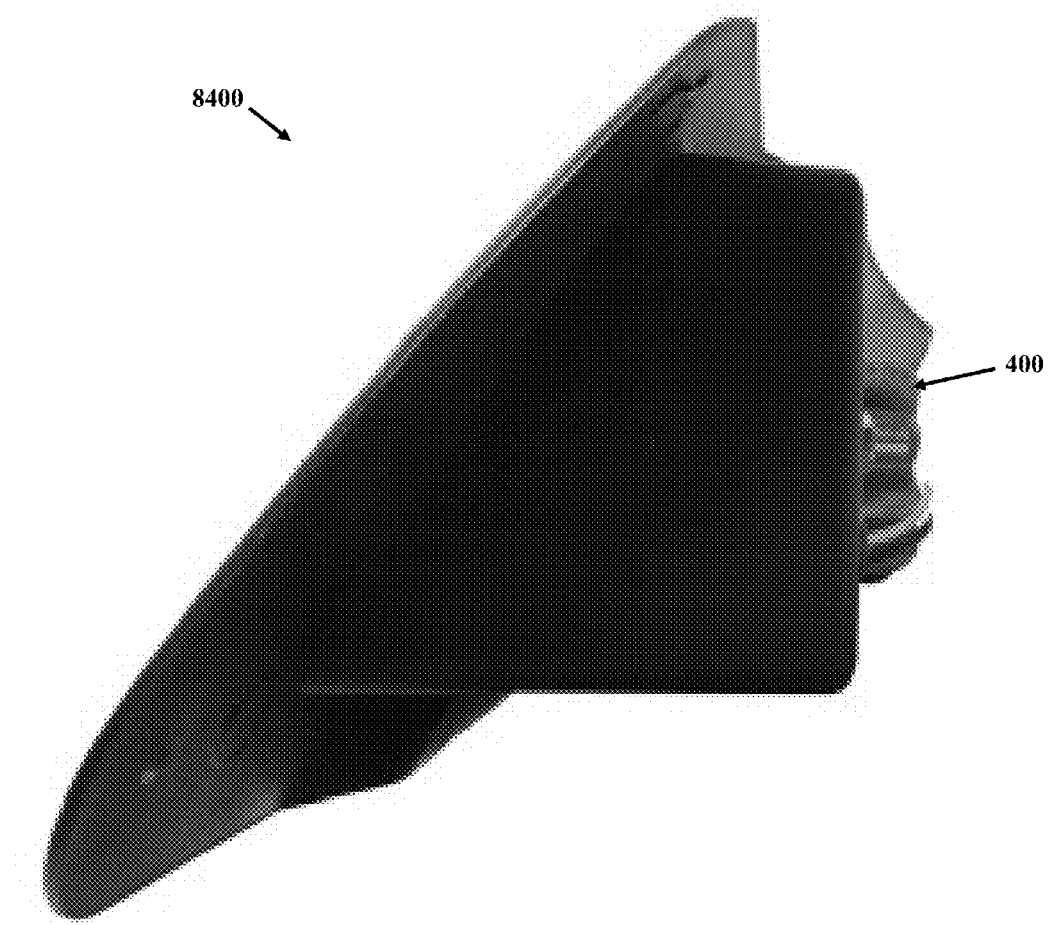
FIG. 89 is right side view of the passenger side front light housing of FIG. 84 with the front light of FIG. 1 and heat sink of FIGS. 5 and 42 to 49, in accordance with an embodiment of the present invention.

FIG. 89 is right side view of the passenger side front light housing of FIG. 84 with the front light of FIG. 1 and heat sink of FIGS. 5 and 42 to 49, in accordance with an embodiment of the present invention.

Figure 90:
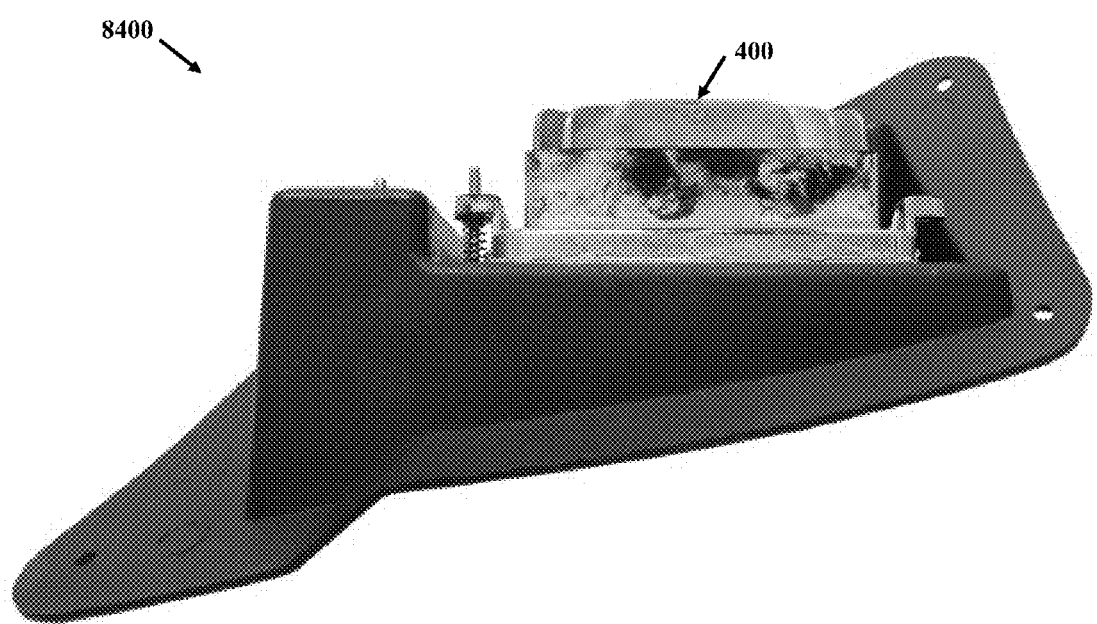
FIG. 90 is bottom view of the passenger side front light housing of FIG. 84 with the front light of FIG. 1 and heat sink of FIGS. 5 and 42 to 49, in accordance with an embodiment of the present invention.

FIG. 90 is bottom view of the passenger side front light housing of FIG. 84 with the front light of FIG. 1 and heat sink of FIGS. 5 and 42 to 49, in accordance with an embodiment of the present invention.

Figure 91:
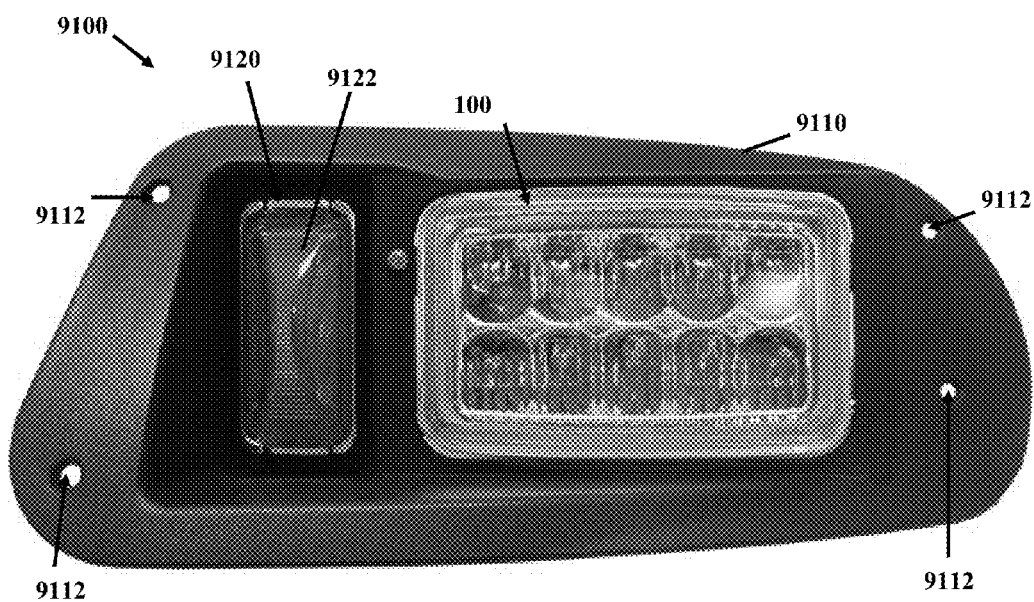
FIG. 91 is a front view of a center front light housing assembly with the front light of FIG. 1 and heat sink of FIGS. 5 and 42 to 49, in accordance with another embodiment of the present invention.

FIG. 91 is a front view of a driver side front light housing assembly with the front light of FIG. 1 and heat sink of FIGS. 5 and 42 to 49, in accordance with another embodiment of the present invention. In FIG. 91, a driver side front light housing assembly 9100 is shown with the front light 100 visible and installed on a passenger side front light housing front surface 9110. To the right of the front light 100 is a turn signal portion 9120 covered by a turn signal cover 9122. Four fastener openings 9112 are shown formed, two each, on left and right sides of the front surface 9110.

Figure 92:
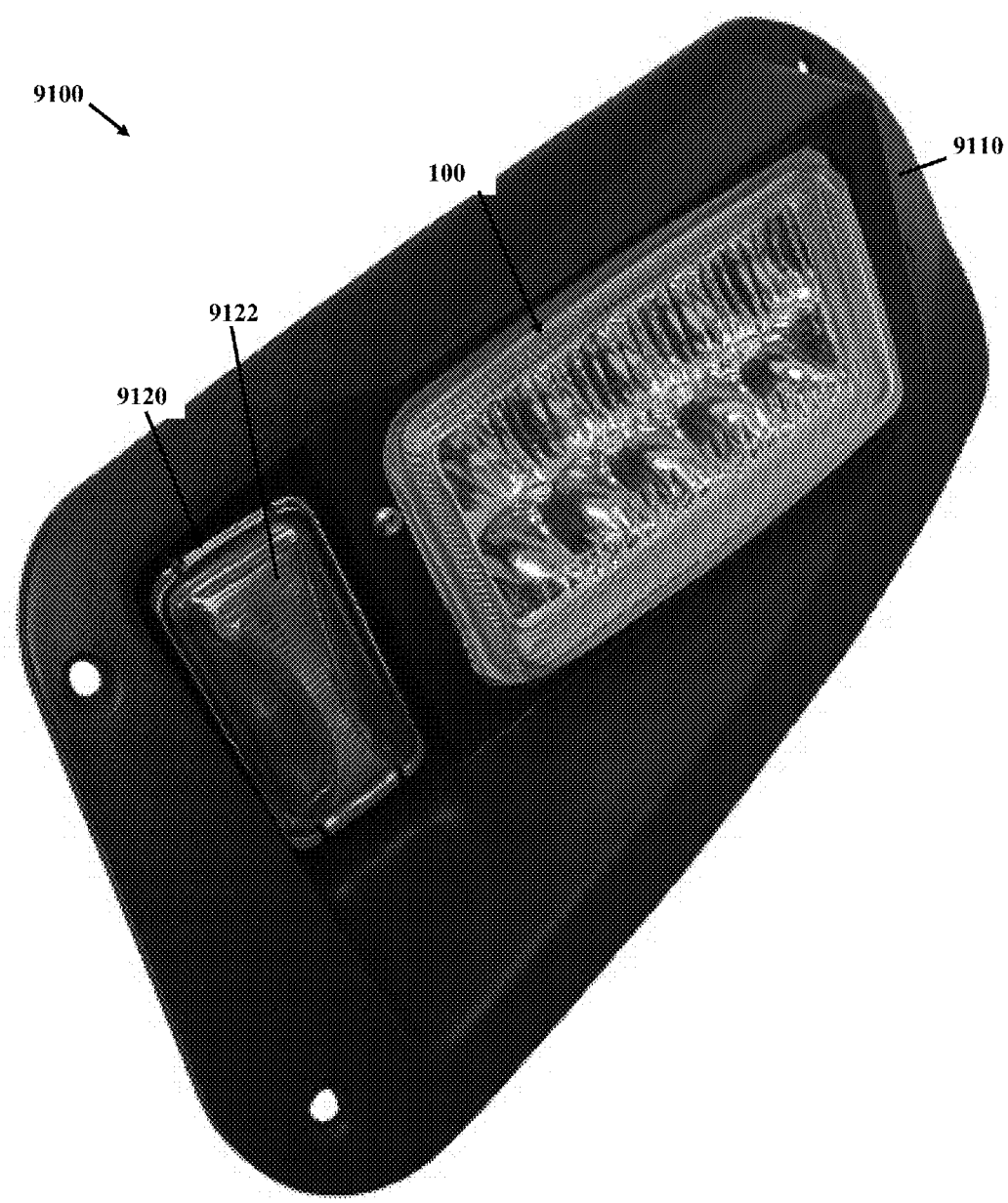
FIG. 92 is an isometric, front-left top view of the center front light housing assembly of FIG. 91 with the front light of FIG. 1 and heat sink of FIGS. 5 and 42 to 49, in accordance with another embodiment of the present invention.

FIG. 92 is an isometric, front-left top view of the driver side front light housing assembly of FIG. 91 with the front light of FIG. 1 and heat sink of FIGS. 5 and 42 to 49, in accordance with another embodiment of the present invention.

Figure 93:
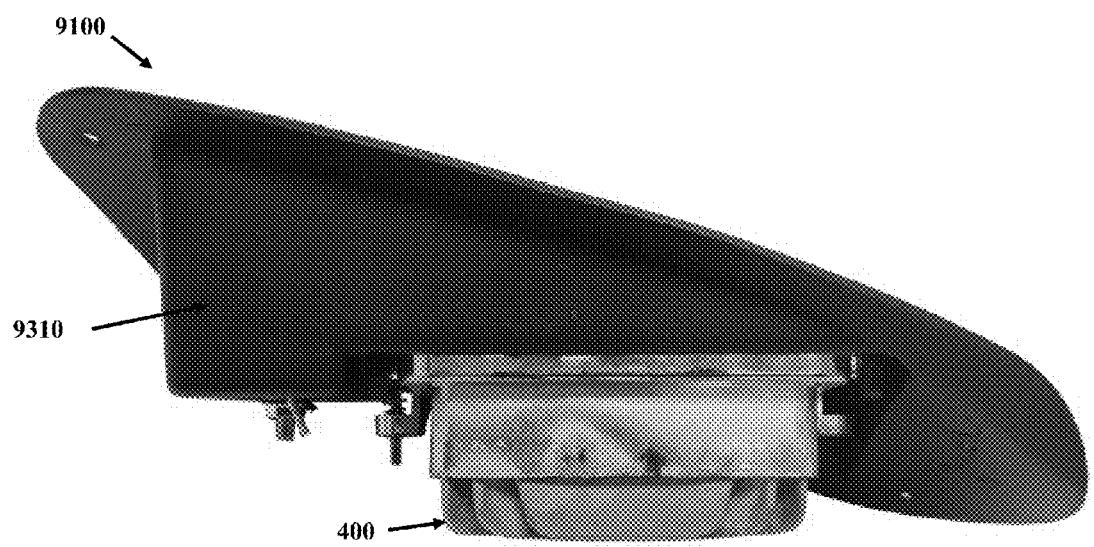
FIG. 93 is a bottom view of the center front light housing assembly of FIG. 91 with the front light of FIG. 1 and heat sink of FIGS. 5 and 42 to 49, in accordance with an embodiment of the present invention.

FIG. 93 is a top view of the driver side front light housing assembly of FIG. 91 with the front light of FIG. 1 and heat sink of FIGS. 5 and 42 to 49, in accordance with an embodiment of the present invention. In FIG. 93, the heat sink 400 is shown connected to the back portion 210 of the front light assembly 100 and a passenger side front light housing top surface 9310 is shown connected to and extending away from a back side of the passenger side front light housing front surface 9110. In general, the housing assembly 9100 can be formed or molded as a single piece, but it can also be made from independent pieces and glued, fastened or welded together.

Figure 94:
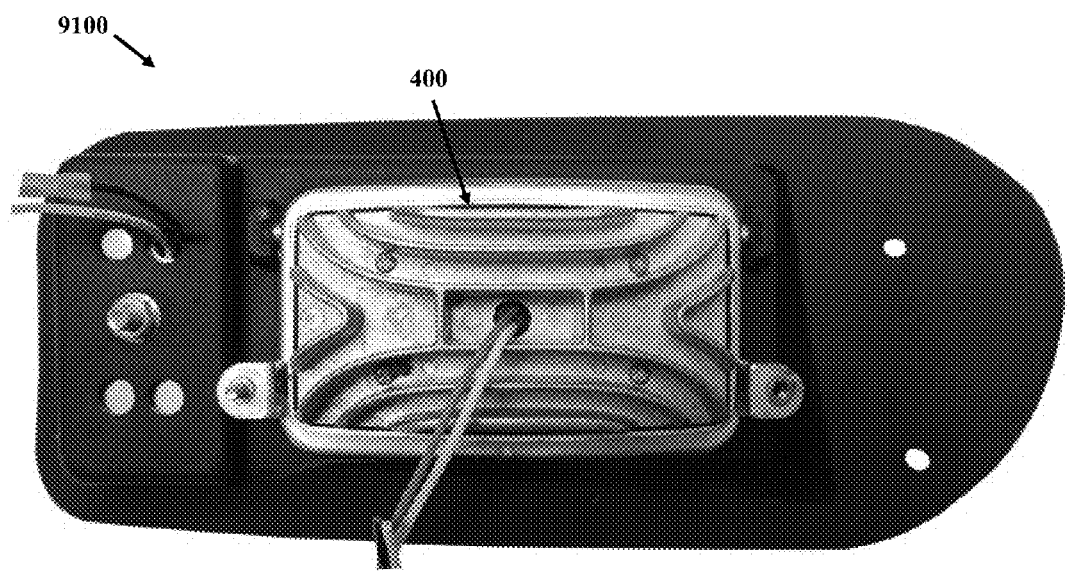
FIG. 94 is a back view of the center front light housing assembly of FIG. 91 with the front light of FIG. 1 and heat sink of FIGS. 5 and 42 to 49, in accordance with an embodiment of the present invention.

FIG. 94 is a back view of the driver side front light housing assembly of FIG. 91 with the front light of FIG. 1 and heat sink of FIGS. 5 and 42 to 49, in accordance with an embodiment of the present invention. In FIG. 94, a back side 9410 of the front wall 9110 is shown with the light assembly 100 and a back surface 9420 of the turn signal portion 9120 is shown with a LED light 9422 installed into the turn signal portion 9120.

Figure 95:
FIG. 95 is a left side view of the center front light housing of FIG. 91 with the front light of FIG. 1 and heat sink of FIGS. 5 and 42 to 49, in accordance with an embodiment of the present invention.

FIG. 95 is a left side view of the driver side front light housing of FIG. 91 with the front light of FIG. 1 and heat sink of FIGS. 5 and 42 to 49, in accordance with an embodiment of the present invention.

Figure 96:
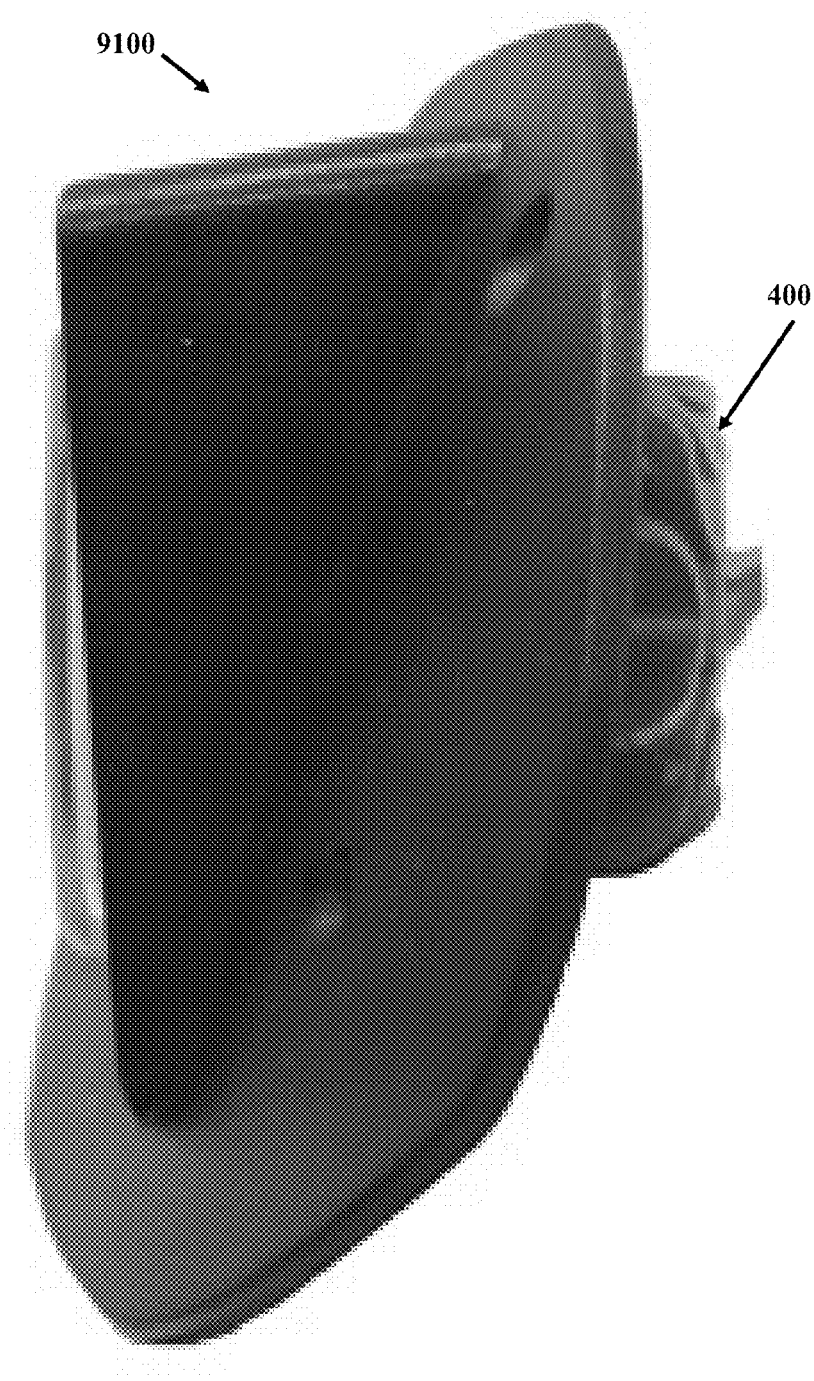
FIG. 96 is right side view of the center front light housing of FIG. 91 with the front light of FIG. 1 and heat sink of FIGS. 5 and 42 to 49, in accordance with an embodiment of the present invention.

FIG. 96 is right side view of the driver side front light housing of FIG. 91 with the front light of FIG. 1 and heat sink of FIGS. 5 and 42 to 49, in accordance with an embodiment of the present invention.

Figure 97:
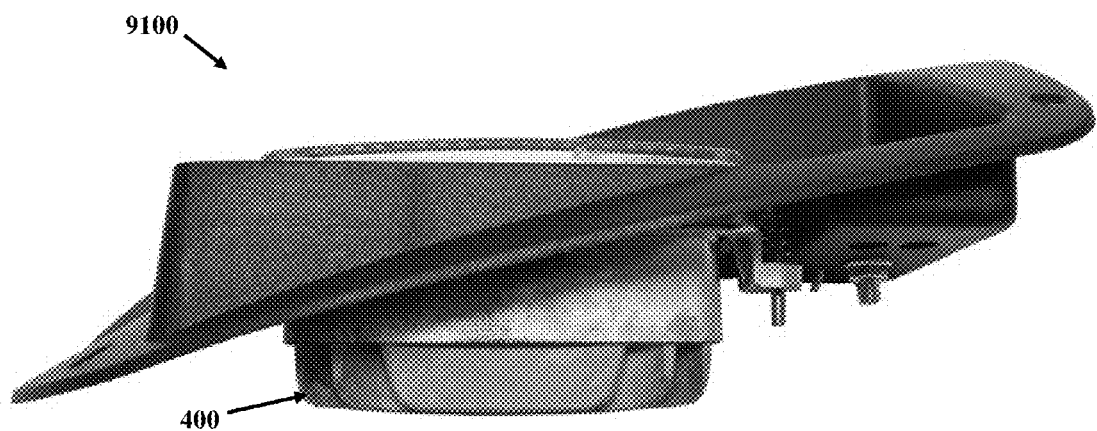
FIG. 97 is bottom view of the center front light housing of FIG. 92 with the front light of FIG. 1 and heat sink of FIGS. 5 and 42 to 49, in accordance with an embodiment of the present invention.

FIG. 97 is bottom view of the driver side front light housing of FIG. 91 with the front light of FIG. 1 and heat sink of FIGS. 5 and 42 to 49, in accordance with an embodiment of the present invention.

Figure 98:
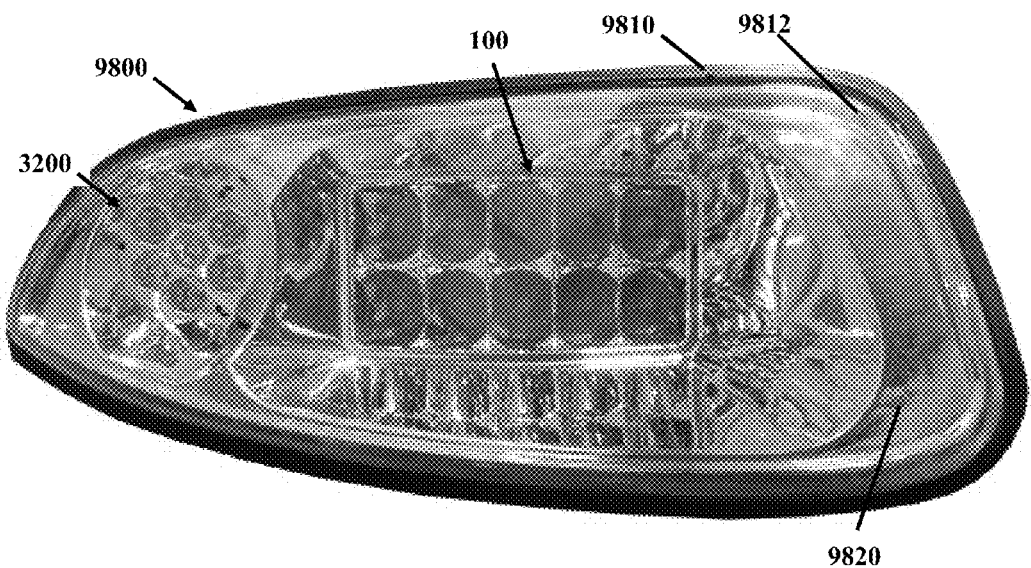
FIG. 98 is a front view of a passenger side front light housing assembly with the front light of FIG. 1 and heat sink of FIGS. 5 and 42 to 49 with a clear lens over the LED lights, in accordance with another embodiment of the present invention.

FIG. 98 is a front view of a passenger side front light housing assembly with the front light of FIG. 1, turn signal of FIG. 32 and heat sink of FIGS. 5 and 42 to 49 with a clear lens over the LED lights, in accordance with another embodiment of the present invention. In FIG. 98, a passenger side front light housing assembly 9800 is shown with the front light 100 visible and installed on a passenger side front light housing front surface 9810. To the left of the front light 100 is the seven LED turn signal light 3200, both of which are covered by a clear lens cover 9812. In this embodiment, an inside surface of the housing is a reflective surface 9820.

Figure 99:
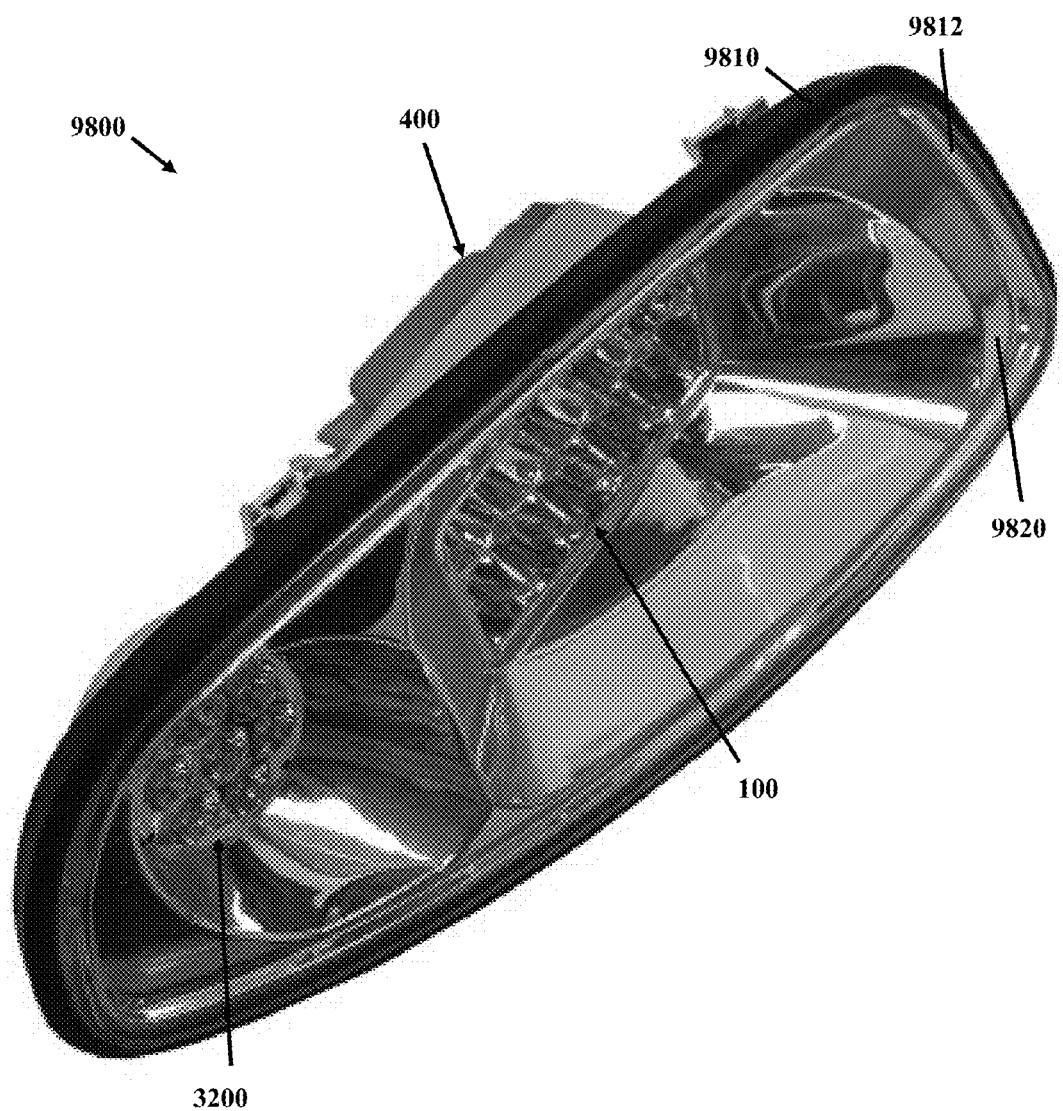
FIG. 99 is an isometric, front-left top view of the passenger side front light housing assembly of FIG. 98 with the front light of FIG. 1 and heat sink of FIGS. 5 and 42 to 49 with a clear lens over the LED lights, in accordance with another embodiment of the present invention.

FIG. 99 is an isometric, front-left top view of the passenger side front light housing assembly of FIG. 98 with the front light of FIG. 1 and heat sink of FIGS. 5 and 42 to 49 with a clear lens over the LED lights, in accordance with another embodiment of the present invention.

Figure 100:
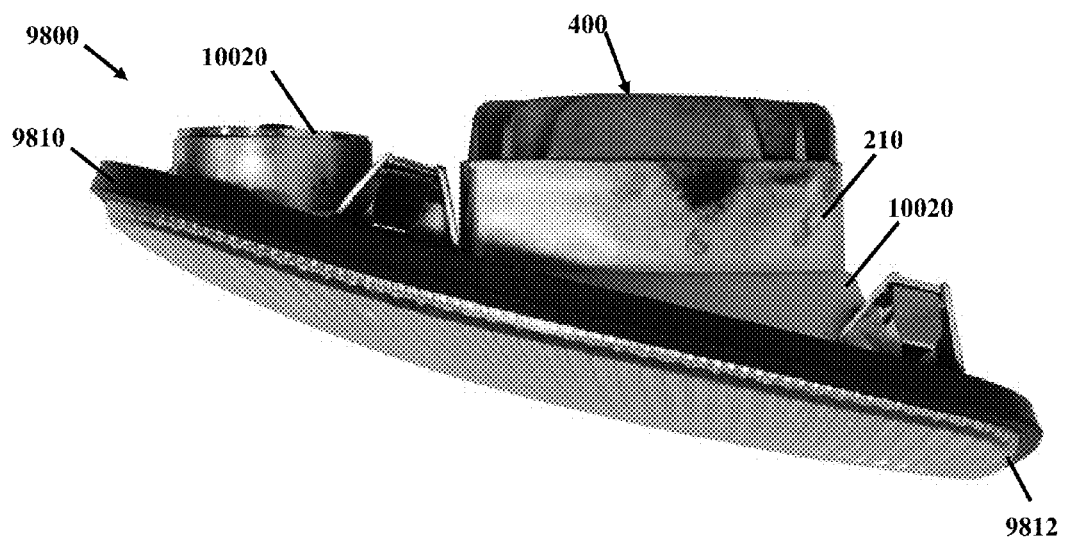
FIG. 100 is a bottom view of the passenger side front light housing assembly of FIG. 98 with the front light of FIG. 1 and heat sink of FIGS. 5 and 42 to 49, in accordance with an embodiment of the present invention.

FIG. 100 is a top view of the passenger side front light housing assembly of FIG. 98 with the front light of FIG. 1 and heat sink of FIGS. 5 and 42 to 49, in accordance with an embodiment of the present invention. In FIG. 100, the heat sink 400 is shown connected to the back portion 210 of the front light assembly 100 and a passenger side front light housing top surface 10010 is shown connected to and extending away from a back side of the passenger side front light housing front surface 9810. In general, the housing assembly 9800 can be formed or molded as a single piece, but it can also be made from independent pieces and glued, fastened or welded together.

Figure 101:
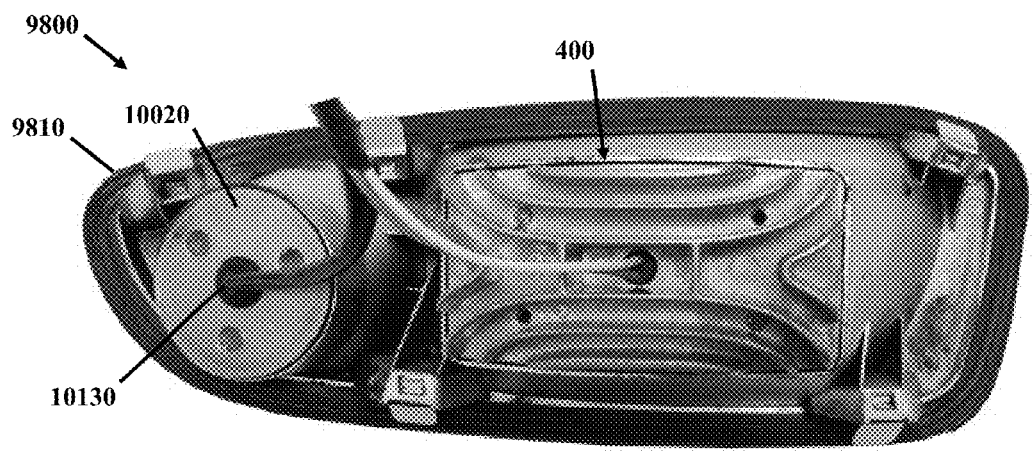
FIG. 101 is a back view of the passenger side front light housing assembly of FIG. 98 with the front light of FIG. 1 and heat sink of FIGS. 5 and 42 to 49, in accordance with an embodiment of the present invention.

FIG. 101 is a back view of the passenger side front light housing assembly of FIG. 98 with the front light of FIG. 1 and heat sink of FIGS. 5 and 42 to 49, in accordance with an embodiment of the present invention. In FIG. 101, a back side 10110 of the front wall 9810 is shown with the light assembly 100 and a back surface 10120 of the turn signal portion 10020 is shown with a LED power wire 10130 installed into the turn signal portion 9820.

Figure 102:
FIG. 102 is a left side view of the passenger side front light housing of FIG. 98 with the front light of FIG. 1 and heat sink of FIGS. 5 and 42 to 49, in accordance with an embodiment of the present invention.

FIG. 102 is a left side view of the passenger side front light housing of FIG. 98 with the front light of FIG. 1 and heat sink of FIGS. 5 and 42 to 49, in accordance with an embodiment of the present invention. In FIG. 102, the clear lens cover 9812 has been replaced with a ribbed lens cover 10212.

Figure 103:
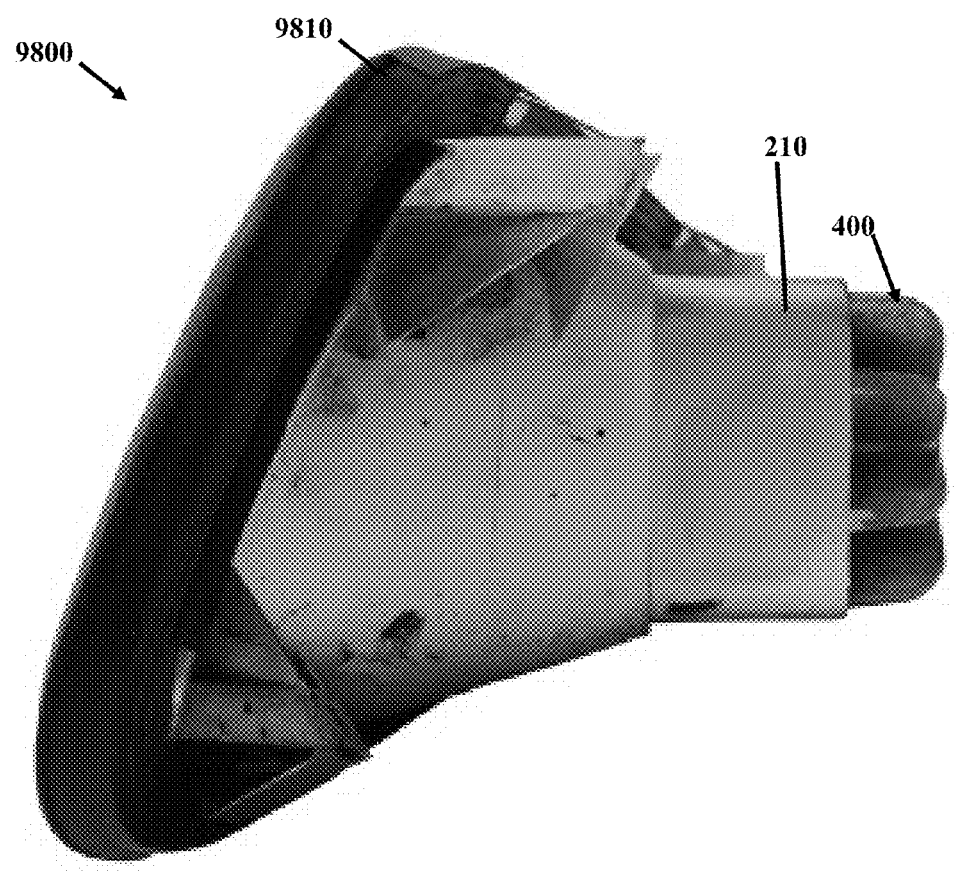
FIG. 103 is right side view of the passenger side front light housing of FIG. 98 with the front light of FIG. 1 and heat sink of FIGS. 5 and 42 to 49, in accordance with an embodiment of the present invention.

FIG. 103 is right side view of the passenger side front light housing of FIG. 98 with the front light of FIG. 1 and heat sink of FIGS. 5 and 42 to 49, in accordance with an embodiment of the present invention.

Figure 104:
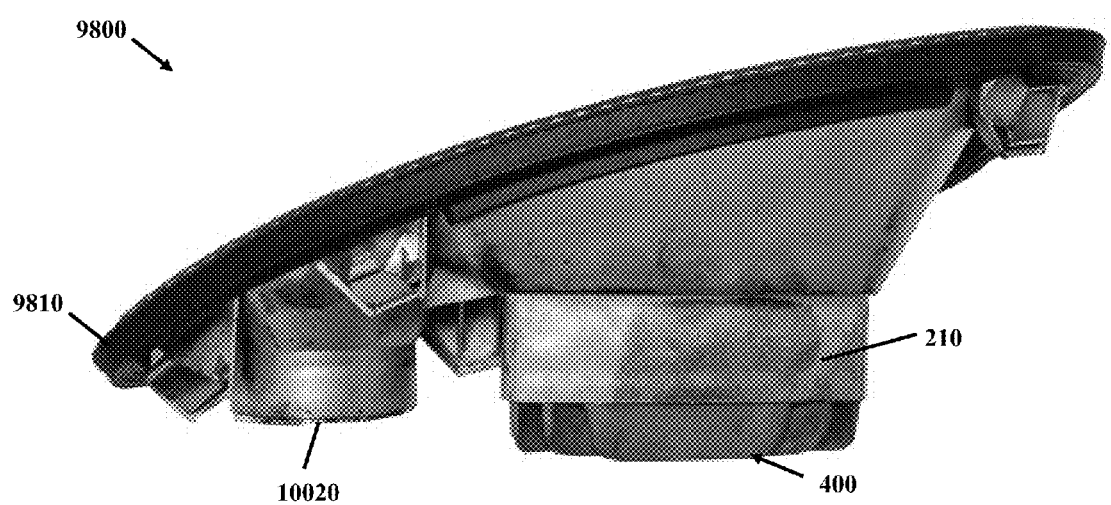
FIG. 104 is bottom view of the passenger side front light housing of FIG. 98 with the front light of FIG. 1 and heat sink of FIGS. 5 and 42 to 49, in accordance with an embodiment of the present invention.

FIG. 104 is bottom view of the passenger side front light housing of FIG. 98 with the front light of FIG. 1 and heat sink of FIGS. 5 and 42 to 49, in accordance with an embodiment of the present invention.

While the invention(s) has/have been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the invention(s) described herein.

What is claimed is:

1. A head light assembly comprising:
   a housing;
   a headlight component having a plurality of rows of a plurality of LED lights fixedly installed in the housing with each LED light being positioned within a reflector;
   a heat sink fixedly connected to a back of the light component and thermally connected to each LED light in the plurality of rows of the plurality of LED lights, the heat sink having a substantially flat base with a substantially rectangular shape and rounded corners, a plurality of fins extending perpendicularly from the substantially flat base and forming a generally symmetrical pattern having a central rectangular portion located around a center of the flat base, two sets of three spaced-apart and longitudinally aligned concave shaped fins on each side of and extending away from the central rectangular portion located around the center of the flat base, and a pair of substantially "V"-shaped fins opposite each other on opposite ends of the base and the pair of substantially "V"-shaped fins are substantially aligned with a center longitudinal axis of the heat sink;
   a lens sealingly covering the light component; and
   each LED light in the plurality of rows of the plurality of LED lights being electrically connected to a first wire to receive power.

2. The head light assembly of claim 1, wherein the housing further includes a turn signal light component comprising:
   a turn signal light housing;
   at least one LED light fixedly installed in the turn signal light component and being electrically connected to a second wire to receive power to turn the at least one LED light on and off; and
   a turn signal lens sealingly covering the at least one LED light.

3. The head light assembly of claim 1, wherein each reflector is a smooth reflector.

4. The head light assembly of claim 1, wherein each reflector is a multifaceted reflector.

5. The head light assembly of claim 2, wherein the turn signal light component at least one LED light is positioned within a reflector.

6. The head light assembly of claim 1, wherein each set of the three spaced-apart and longitudinally aligned concave shaped fins comprises an inside fin, a middle fin and an outer fin.

7. The head light assembly of claim 6, wherein the heat sink further comprises a central opening formed in substantially a center of the central rectangular portion, and four fastener openings formed in a substantially rectangular pattern centered around the central opening and between the inside fin and the middle fin.

8. A head light assembly comprising:
   a housing;
   a headlight component including a light component with a plurality of rows of a plurality of LED lights fixedly installed in the housing with each LED light being positioned within a reflector, each LED light in the plurality of rows of the plurality of LED lights being electrically connected to wires to receive power;
   a first heat sink fixedly connected to a back of the light component and thermally connected to each LED light in the plurality of rows of the plurality of LED lights, the heat sink having a substantially flat base with a substantially rectangular shape and rounded corners, a plurality of fins extending perpendicularly from the substantially flat base and forming a generally symmetrical pattern having a central rectangular portion located around a center of the flat base, two sets of three spaced-apart and longitudinally aligned concave shaped fins on each side of and extending away from the central rectangular portion located around the center of the flat base, and a pair of substantially "V"-shaped fins opposite each other on opposite ends of the base and the pair of substantially "V"-shaped fins are substantially aligned with a center longitudinal axis of the heat sink;
   a turn signal component including seven LED lights;
   a second heat sink thermally connected to the seven LED lights in the turn signal component; and
   a lens sealingly covering both the headlight component and the turn signal component.

9. The head light kit of claim 8, wherein the light component includes two rows of five LED lights and reflectors.

10. The head light kit of claim 9, wherein the reflectors are smooth.

11. The head light kit of claim 8, wherein the turn signal component includes six LED lights and reflectors arranged around a single central LED light and reflector.

12. A head light assembly comprising:
   a housing;
   a headlight component including a light component with a plurality of LED lights fixedly installed in the housing with each LED light being positioned within a reflector, each LED light in the plurality of LED lights being electrically connected to a first wire to receive power;

a first heat sink fixedly connected to a back of the light component and thermally connected to each LED light in the plurality of LED lights also in the housing, the heat sink having a substantially flat base with a substantially rectangular shape and rounded corners, a plurality of fins extending perpendicularly from the substantially flat base and forming a generally symmetrical pattern having a central rectangular portion located around a center of the flat base, two sets of three spaced-apart and longitudinally aligned concave shaped fins on each side of and extending away from the central rectangular portion located around the center of the flat base, and a pair of substantially "V"-shaped fins opposite each other on opposite ends of the base and the pair of substantially "V"-shaped fins are substantially aligned with a center longitudinal axis of the heat sink;

a clear headlight lens sealingly covering the headlight component;

a turn signal component installed adjacent the headlight component in the housing including at least one LED light being electrically connected to a second wire to receive power; and a colored turn signal lens sealingly covering the turn signal component.

13. The head light of claim 12, wherein the turn signal component further comprises a substantially rectangular turn signal light housing.

14. The head light of claim 12, wherein the colored turn signal lens further comprises a raised lens.

15. A head light assembly comprising:

a housing;

a headlight component including a light component with a plurality of LED lights fixedly installed in the housing with each LED light being positioned within a reflector, each LED light in the plurality of LED lights being electrically connected to a first wire to receive power;

a first heat sink fixedly connected to a back of the light component and thermally connected to each LED light in the plurality of LED lights also in the housing, the first heat sink having a substantially flat base with a substantially rectangular shape and rounded corners, a plurality of fins extending perpendicularly from the substantially flat base and forming a generally symmetrical pattern having a central rectangular portion located around a center of the flat base, two sets of three spaced-apart and longitudinally aligned concave shaped fins on each side of and extending away from the central rectangular portion located around the center of the flat base, and a pair of substantially "V"-shaped fins opposite each other on opposite ends of the base and the pair of substantially "V"-shaped fins are substantially aligned with a center longitudinal axis of the heat sink;

a turn signal component installed adjacent the headlight component in the housing including at least one LED light being electrically connected to a second wire to receive power; and a single lens sealingly covering the headlight and the turn signal components.

16. The head light of claim 15, wherein the turn signal component is substantially circular and the plurality of LED lights includes seven LED lights.

17. The head light of claim 15, wherein the seven LED lights are arranged with six LED lights and reflectors positioned around a single central LED light and reflector.

18. The head light of claim 15, wherein the single lens is clear.

19. The head light of claim 15, wherein the single lens is ribbed.

* * * * *